United States Patent
Hayakawa

[11] Patent Number: 6,061,180
[45] Date of Patent: May 9, 2000

[54] ZOOM LENS

[75] Inventor: Shingo Hayakawa, Yokohama, Japan

[73] Assignee: Canon Kabushiki Kaisha, Tokyo, Japan

[21] Appl. No.: 08/957,162

[22] Filed: Oct. 24, 1997

[30] Foreign Application Priority Data

| Oct. 29, 1996 | [JP] | Japan | 8-303700 |
| Dec. 25, 1996 | [JP] | Japan | 8-356272 |
| Apr. 1, 1997 | [JP] | Japan | 9-082736 |

[51] Int. Cl.⁷ ............ G02B 27/64; G02B 15/14
[52] U.S. Cl. ............ 359/557; 359/684; 359/685; 359/690
[58] Field of Search ............ 359/684, 685, 359/690, 757, 758, 557

[56] References Cited

U.S. PATENT DOCUMENTS

| 4,110,006 | 8/1978 | Ikemori | 359/684 |
| 4,702,567 | 10/1987 | Kato et al. | 359/685 |
| 4,830,477 | 5/1989 | Takahashi et al. | 359/685 |
| 4,848,883 | 7/1989 | Maruyama | 359/684 |
| 4,974,950 | 12/1990 | Yamazaki et al. | 359/557 |
| 5,121,978 | 6/1992 | Maruyama | 359/557 |
| 5,189,557 | 2/1993 | Endo | 359/684 |
| 5,303,087 | 4/1994 | Hayakawa et al. | 359/708 |
| 5,442,486 | 8/1995 | Sato | 359/684 |
| 5,502,594 | 3/1996 | Suzuki et al. | 359/557 |
| 5,579,171 | 11/1996 | Suzuki et al. | 359/557 |
| 5,581,404 | 12/1996 | Misaka et al. | 359/557 |
| 5,598,299 | 1/1997 | Hayakawa | 359/557 |
| 5,627,677 | 5/1997 | Suzuki | 359/684 |
| 5,642,224 | 6/1997 | Suzuki | 359/685 |
| 5,654,826 | 8/1997 | Suzuki | 359/690 |
| 5,696,632 | 12/1997 | Ohtake | 359/684 |
| 5,715,088 | 2/1998 | Suzuki | 359/690 |
| 5,731,897 | 3/1998 | Suzuki | 359/690 |
| 5,835,272 | 11/1998 | Kodama | 359/684 |

FOREIGN PATENT DOCUMENTS

| 60-39613 | 3/1985 | Japan . |
| 63-189819 | 8/1988 | Japan . |
| 2-35406 | 2/1990 | Japan . |
| 5-119260 | 5/1993 | Japan . |
| 8-136862 | 5/1996 | Japan . |

*Primary Examiner*—Georgia Epps
*Assistant Examiner*—Evelyn A. Lester
*Attorney, Agent, or Firm*—Fitzpatrick, Cella, Harper & Scinto

[57] ABSTRACT

A zoom lens includes, in order from as object side, a first lens unit having a positive refractive power, a second lens unit having a negative refractive power, a third lens unit having a positive refractive power, a fourth lens having a positive or negative refractive power, a fifth lens unit having a negative refractive power, and a sixth lens unit having a positive refractive power, and a sixth lens unit having a positive refractive power, wherein the separations between the lens units are varied to effect zooming. Further, the fifth lens unit is arranged to move in directions substantially perpendicular to the optical axis to compensate vibrations.

21 Claims, 38 Drawing Sheets

FIG. 2(a)1
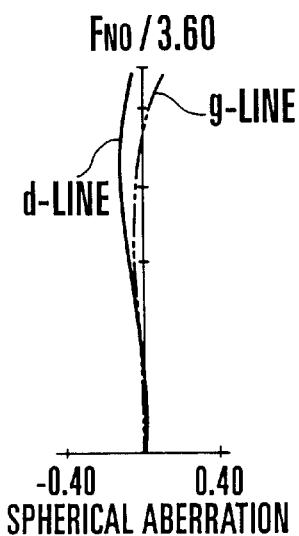
SPHERICAL ABERRATION
FIG. 2(a)2
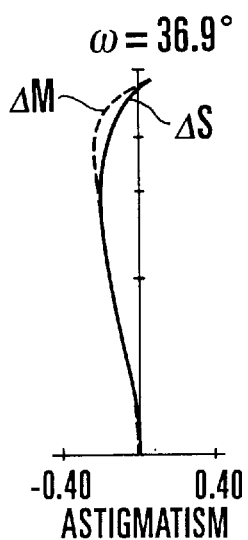
ASTIGMATISM
FIG. 2(a)3
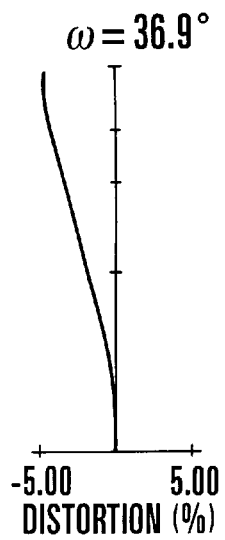
DISTORTION (%)
FIG. 2(a)4
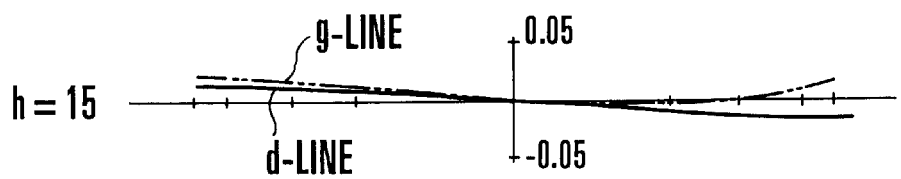
FIG. 2(a)5
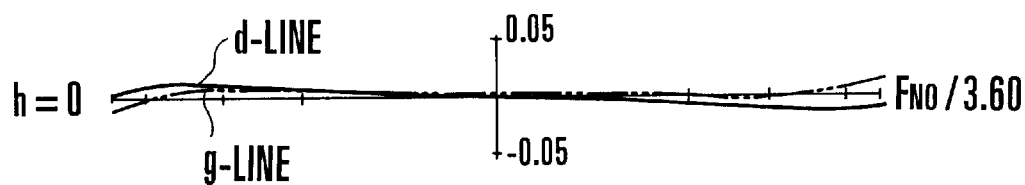

FIG.2(b)1 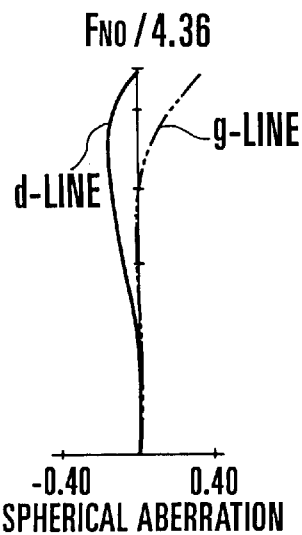
FIG.2(b)2 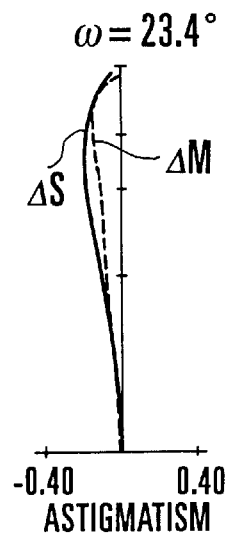
FIG.2(b)3 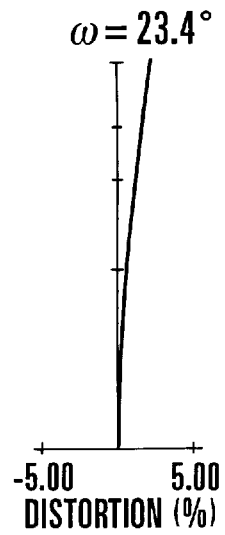
FIG.2(b)4 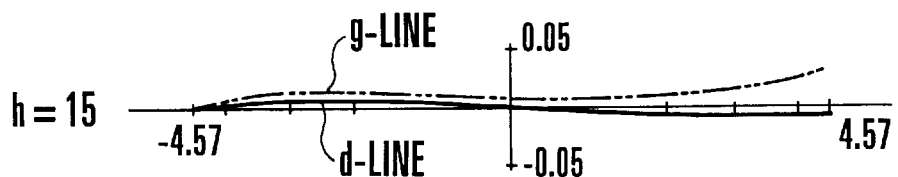
FIG.2(b)5 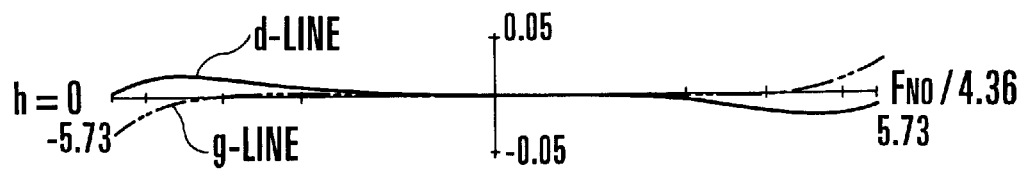

FIG.2(c)1
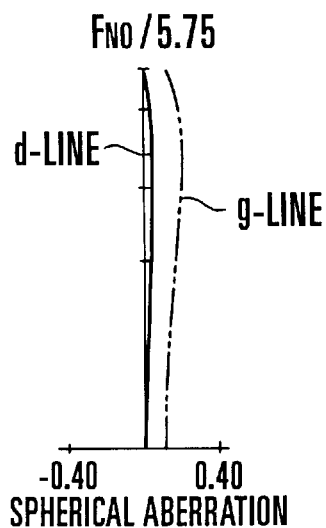
FIG.2(c)2
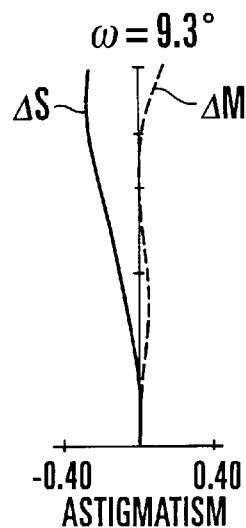
FIG.2(c)3
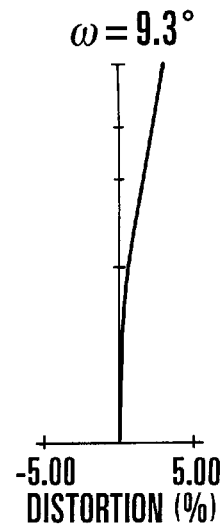
FIG.2(c)4
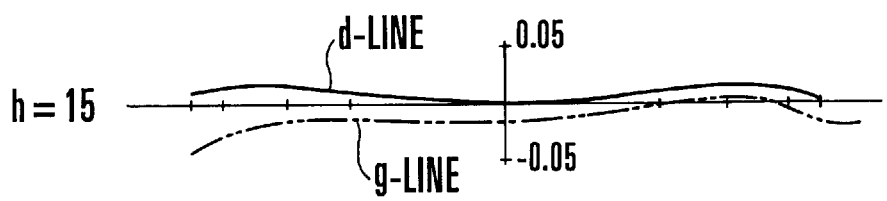
FIG.2(c)5
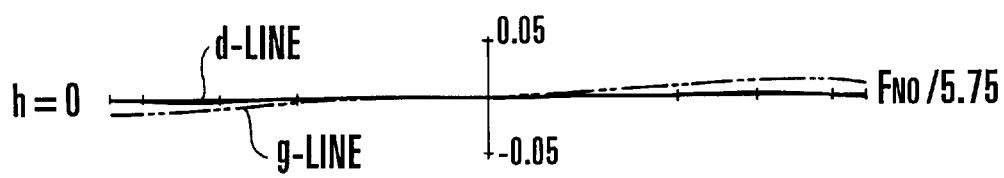

FIG. 3(a)1
h = 15
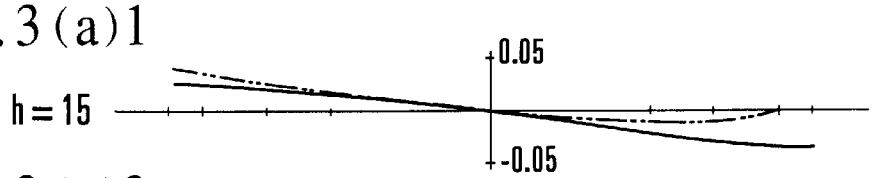
FIG. 3(a)2
h = 0
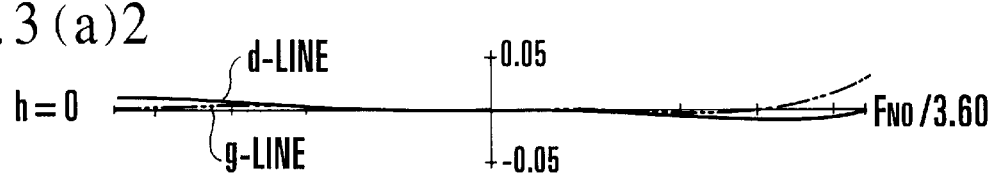
F$_{NO}$ /3.60
FIG. 3(a)3
h = -15
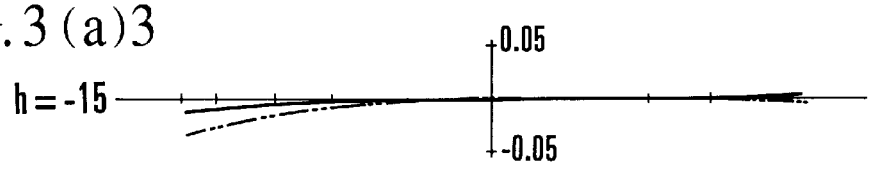
FIG. 3(b)1
h = 15
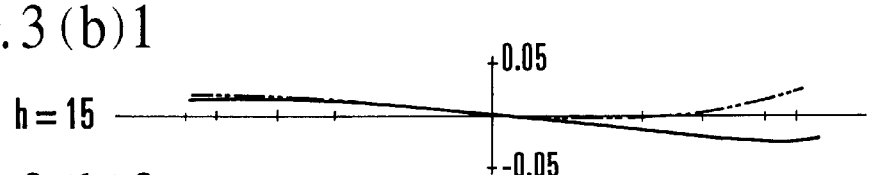
FIG. 3(b)2
h = 0
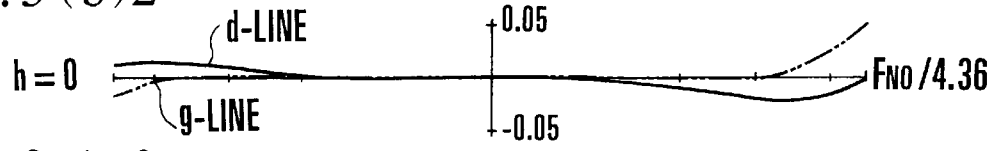
F$_{NO}$ /4.36
FIG. 3(b)3
h = -15
FIG. 3(c)1
h = 15
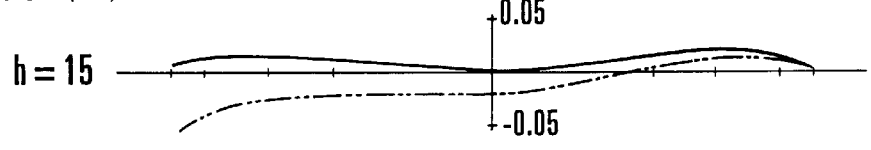
FIG. 3(c)2
h = 0
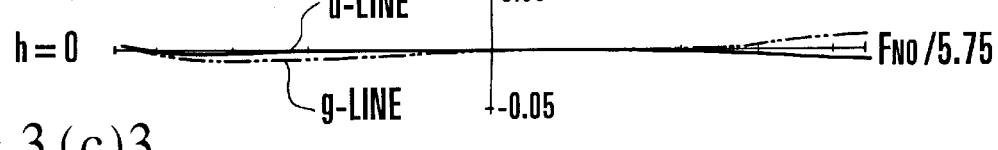
F$_{NO}$ /5.75
FIG. 3(c)3
h = -15

I  II    III IV V   VI

FIG.5(a)1  FIG.5(a)2  FIG.5(a)3
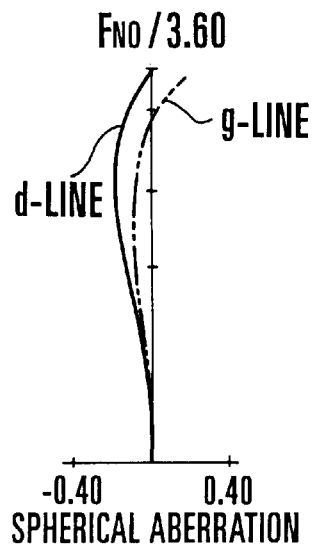
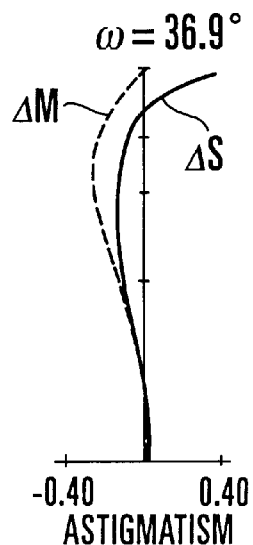
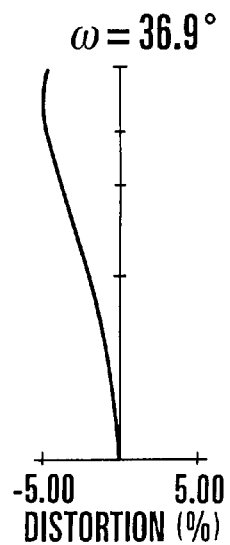
FIG.5(a)4
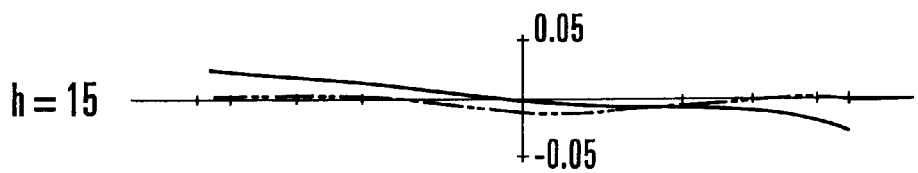
FIG.5(a)5
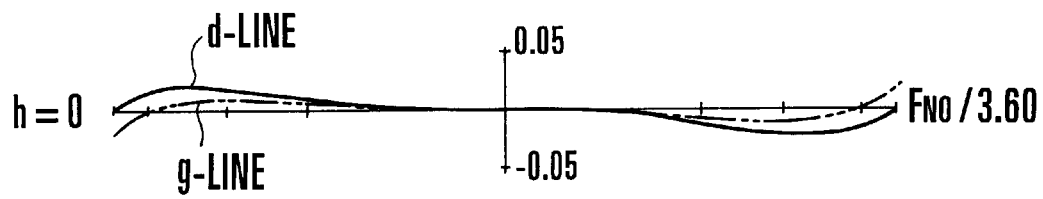

FIG.5(b)1
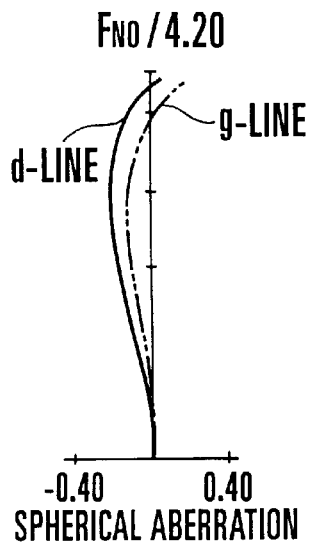
Fno/4.20
g-LINE
d-LINE
-0.40   0.40
SPHERICAL ABERRATION
FIG.5(b)2
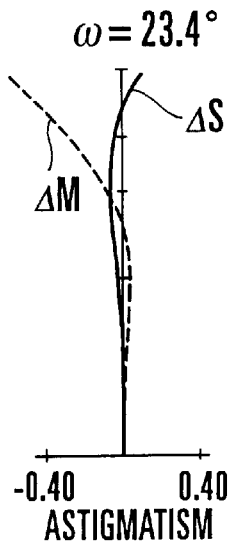
ω=23.4°
ΔS
ΔM
-0.40   0.40
ASTIGMATISM
FIG.5(b)3
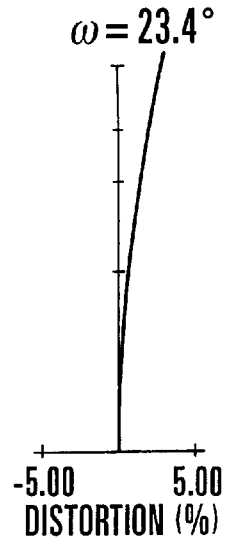
ω=23.4°
-5.00   5.00
DISTORTION (%)
FIG.5(b)4
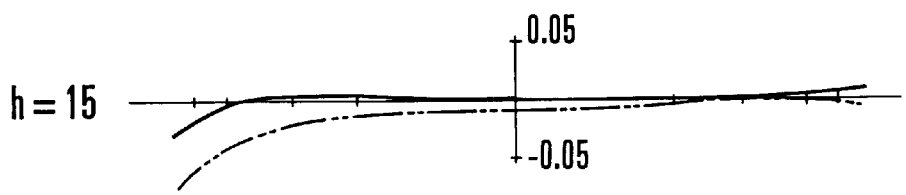
h=15
FIG.5(b)5
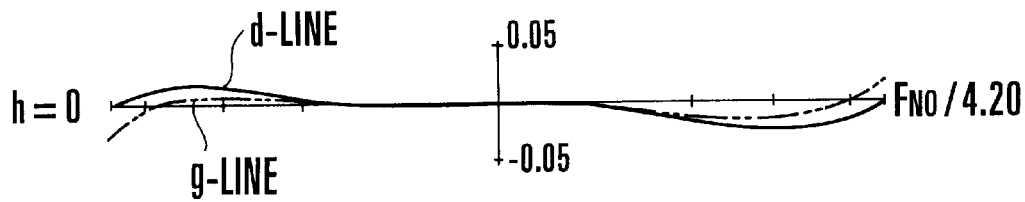
h=0
d-LINE
g-LINE
Fno/4.20

FIG.5(c)1
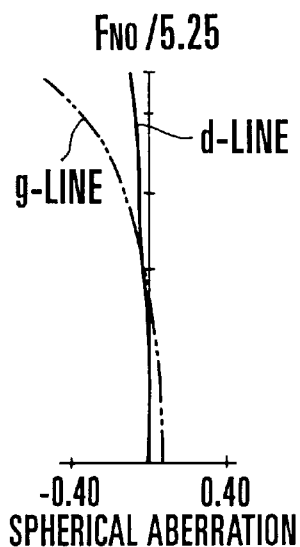
FIG.5(c)2
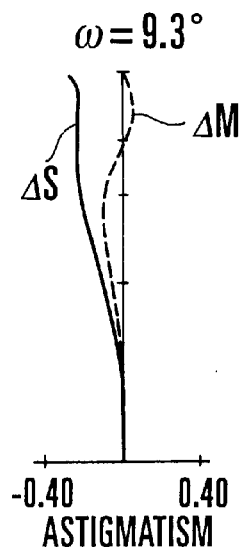
FIG.5(c)3
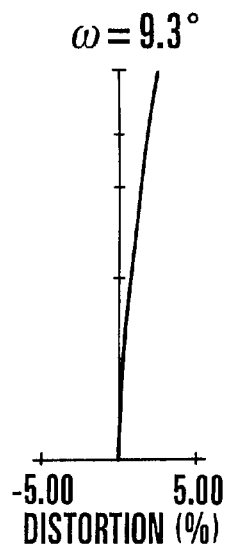
FIG.5(c)4
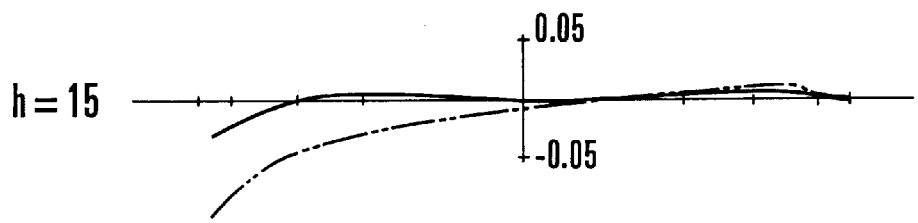
FIG.5(c)5
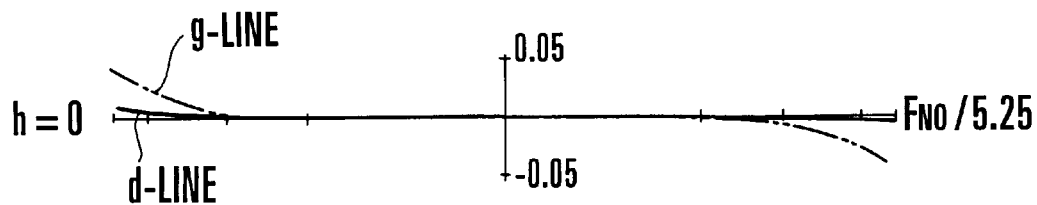

FIG.6(a)1
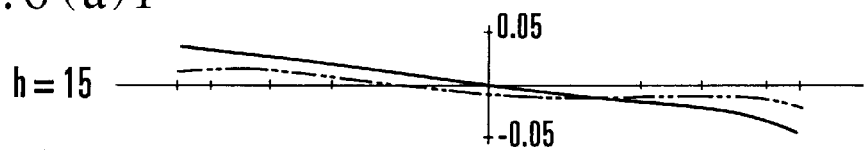
FIG.6(a)2
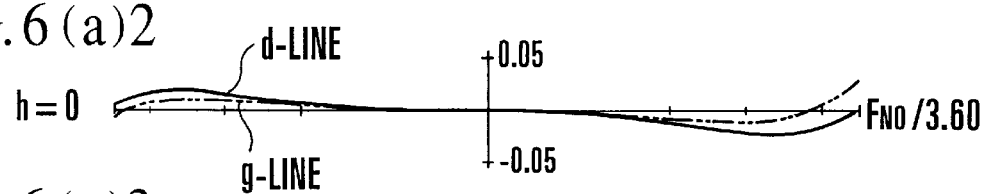
FIG.6(a)3
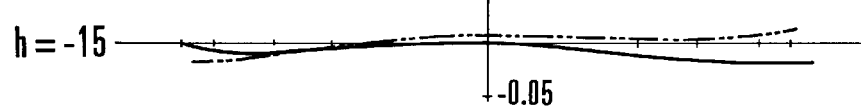
FIG.6(b)1
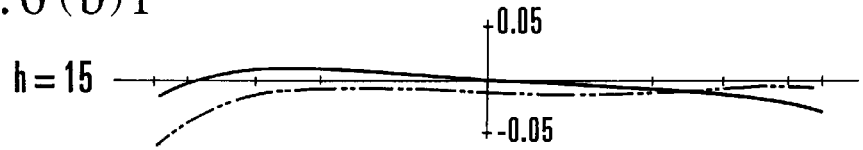
FIG.6(b)2
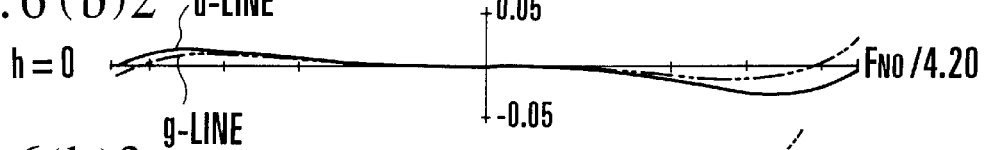
FIG.6(b)3
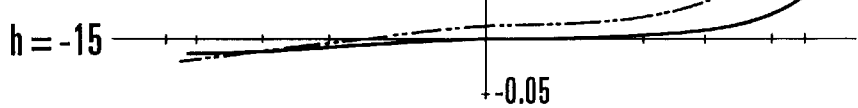
FIG.6(c)1
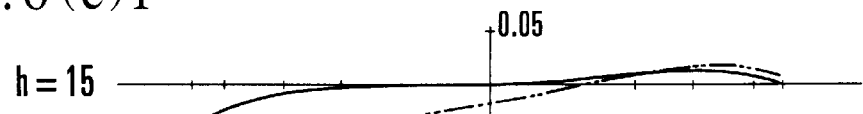
FIG.6(c)2
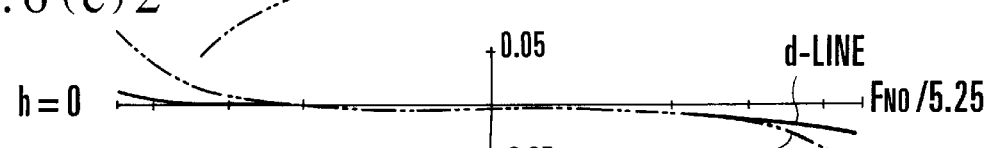
FIG.6(c)3
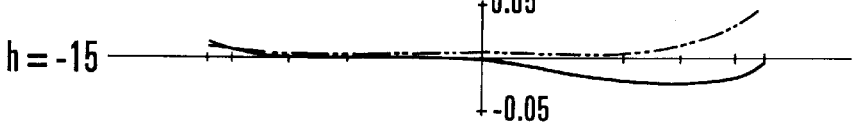

I  II  III IV V  VI

FIG. 8(a)1
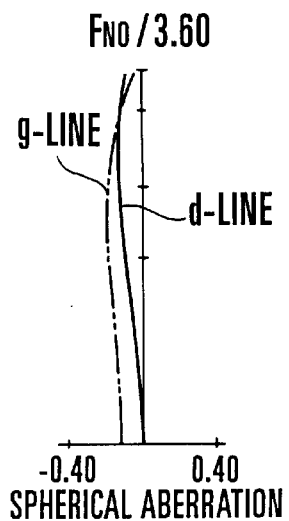
FIG. 8(a)2
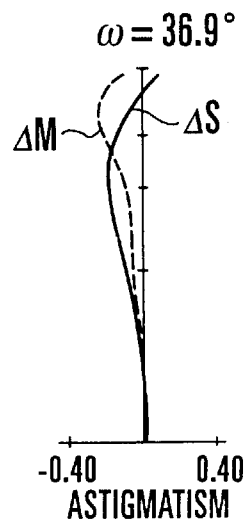
FIG. 8(a)3
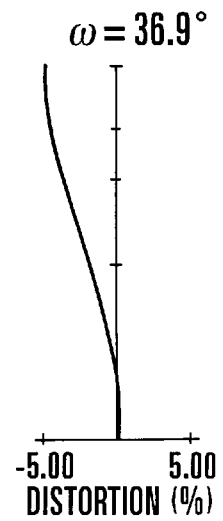
FIG. 8(a)4
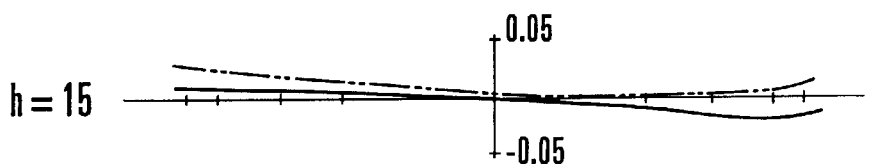
FIG. 8(a)5
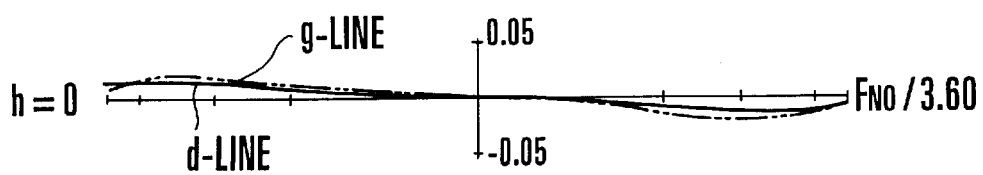

FIG. 8(b)1
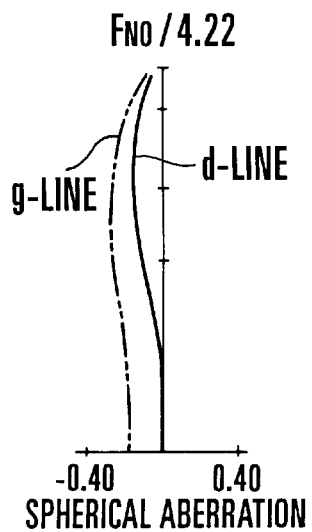
FIG. 8(b)2
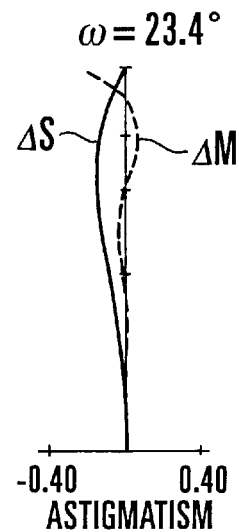
FIG. 8(b)3
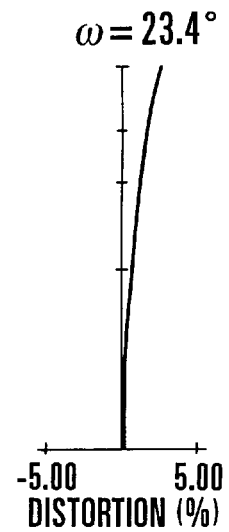
FIG. 8(b)4
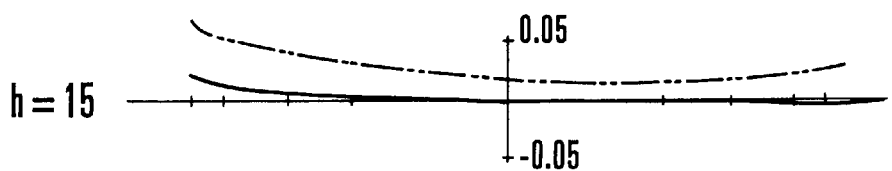
FIG. 8(b)5
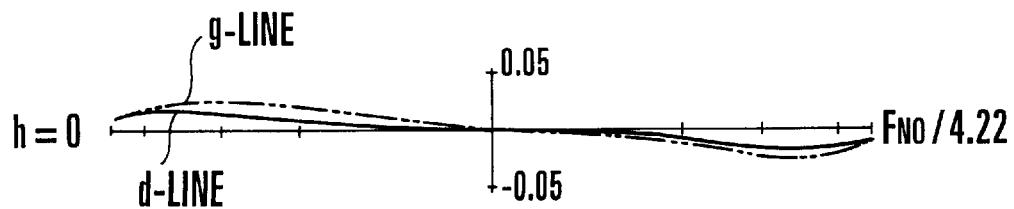

FIG. 8(c)1  FIG. 8(c)2  FIG. 8(c)3
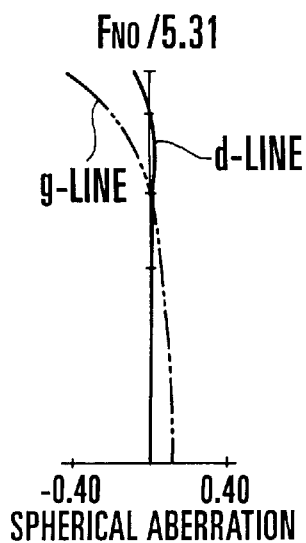
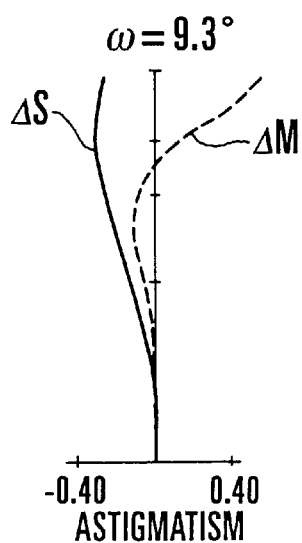
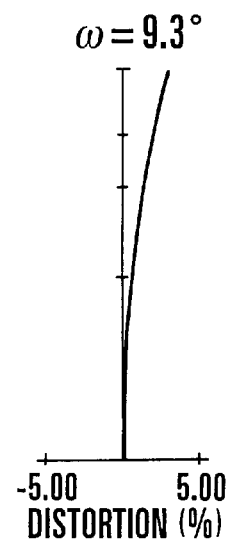
FIG. 8(c)4
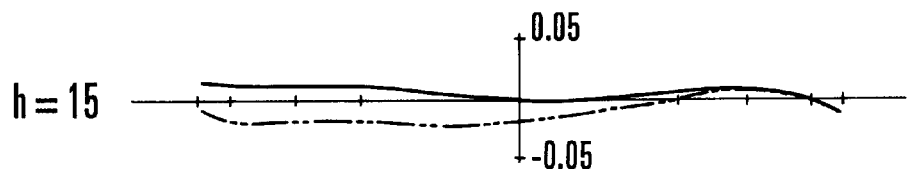
FIG. 8(c)5
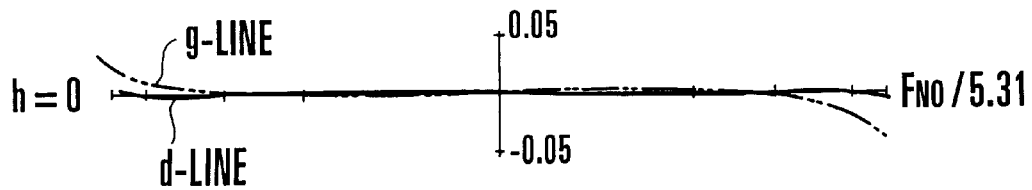

FIG.9(a)1
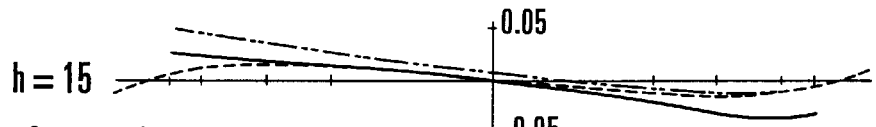
FIG.9(a)2
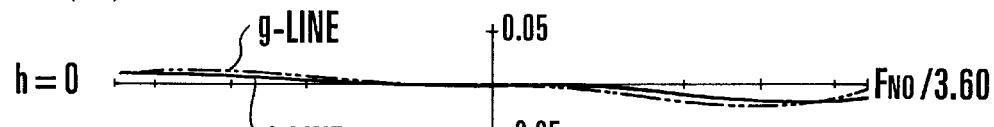
FIG.9(a)3
FIG.9(b)1
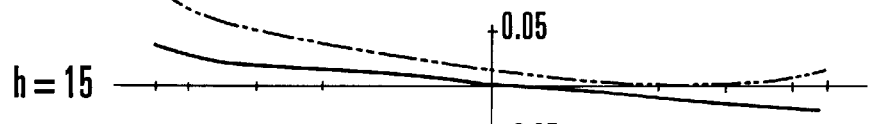
FIG.9(b)2
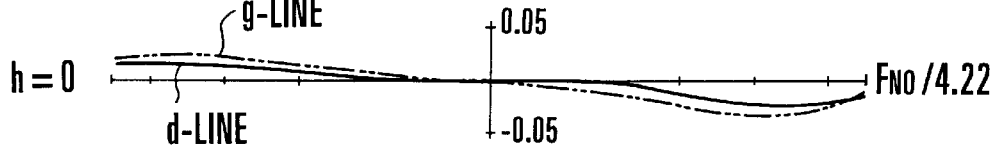
FIG.9(b)3
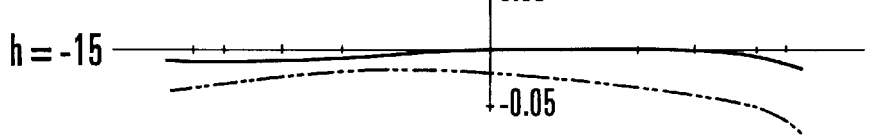
FIG.9(c)1
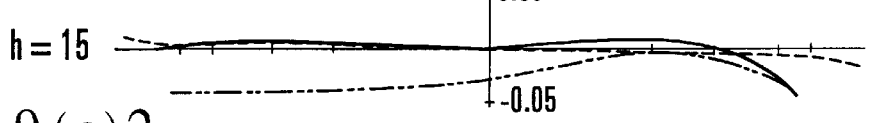
FIG.9(c)2
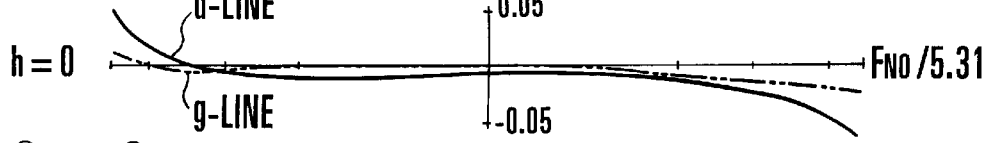
FIG.9(c)3
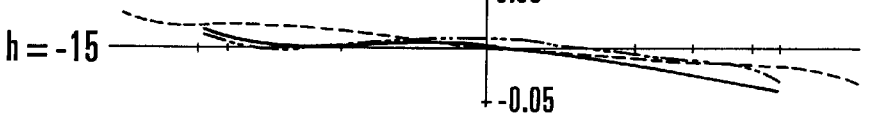

FIG.11(a)1  FIG.11(a)2  FIG.11(a)3
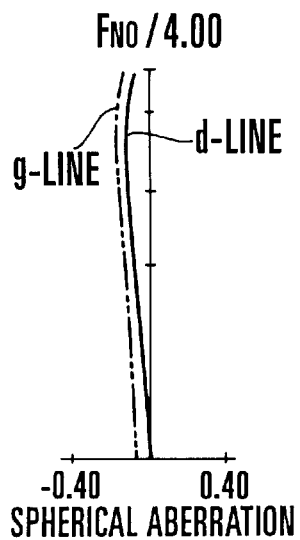 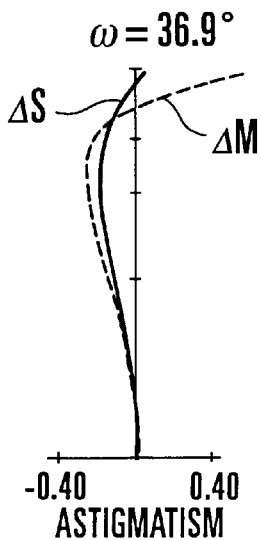 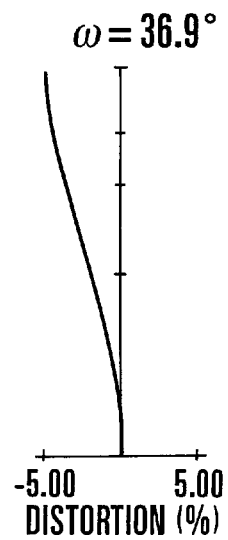
FIG.11(a)4
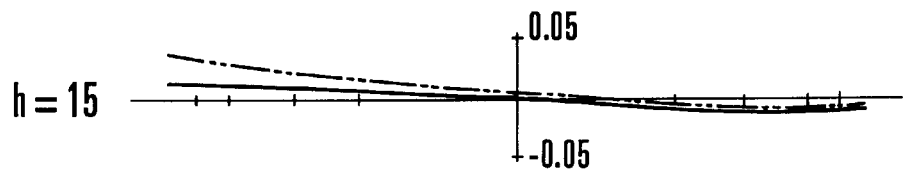
FIG.11(a)5
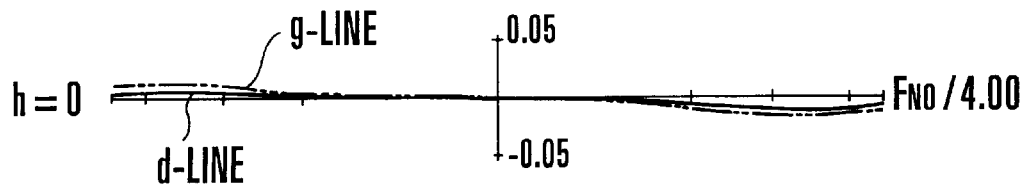

FIG. 11(b)1
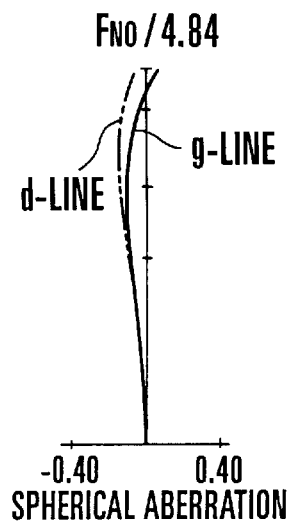
$F_{NO}/4.84$
SPHERICAL ABERRATION
FIG. 11(b)2
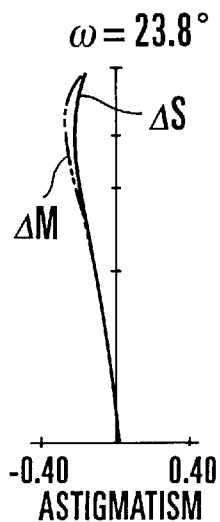
$\omega = 23.8°$
ASTIGMATISM
FIG. 11(b)3
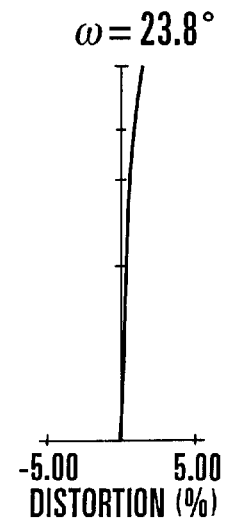
$\omega = 23.8°$
DISTORTION (%)
FIG. 11(b)4
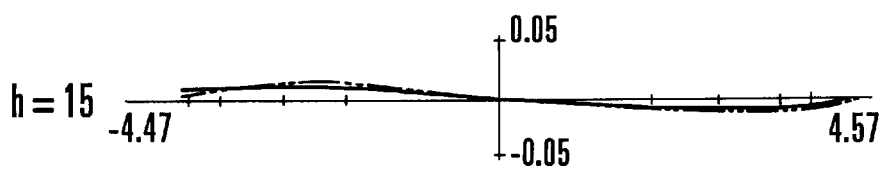
FIG. 11(b)5
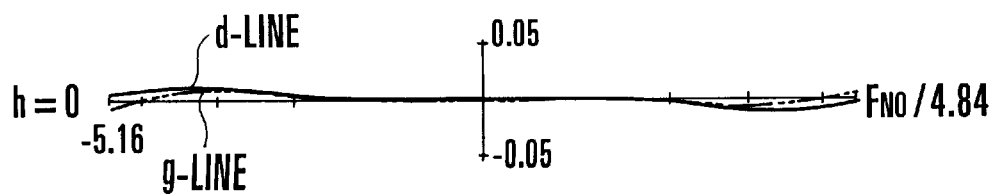

FIG. 11(c)1     FIG. 11(c)2     FIG. 11(c)3
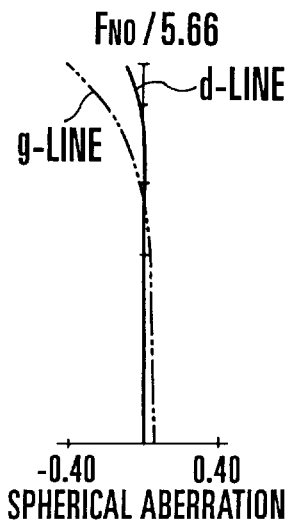
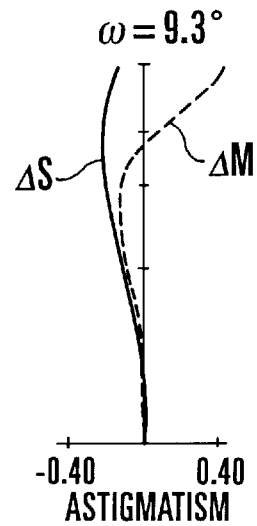
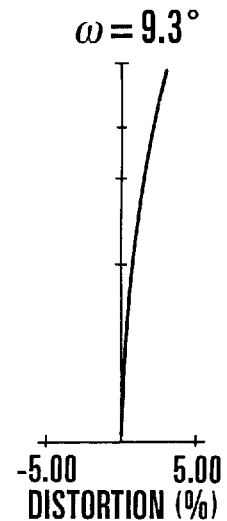
FIG. 11(c)4
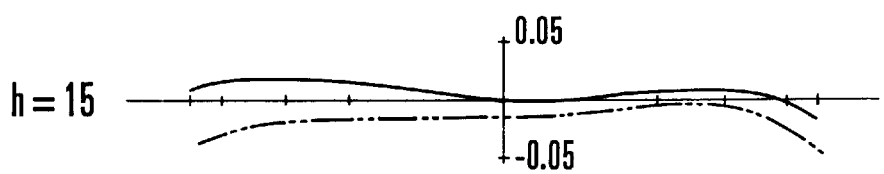
FIG. 11(c)5
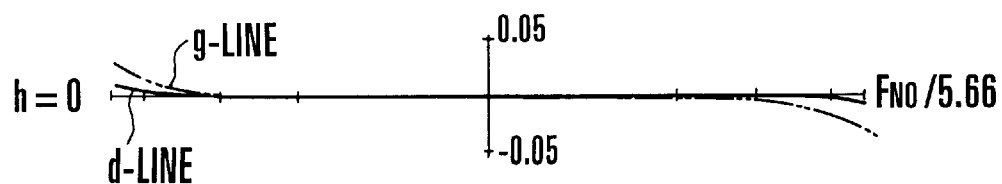

FIG. 12(a)1
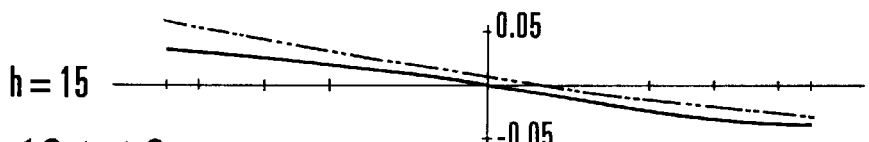
FIG. 12(a)2
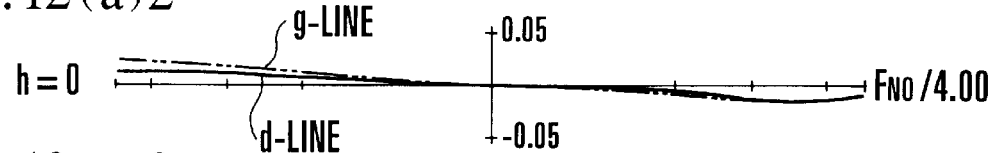
FIG. 12(a)3
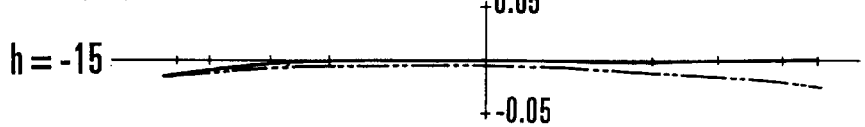
FIG. 12(b)1
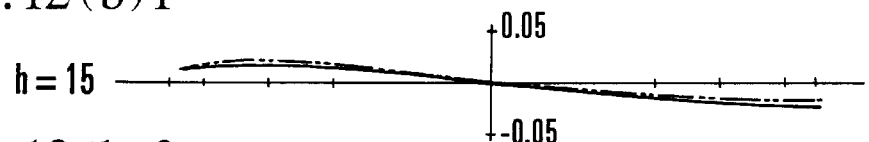
FIG. 12(b)2
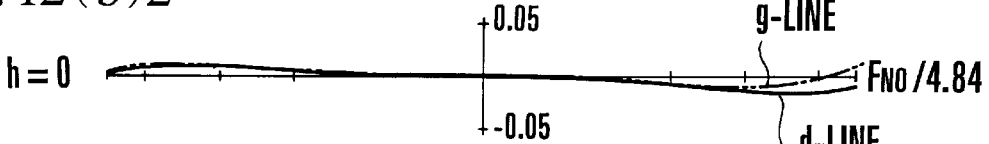
FIG. 12(b)3
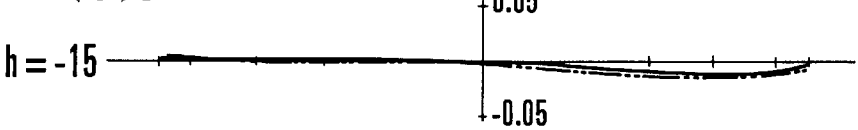
FIG. 12(c)1
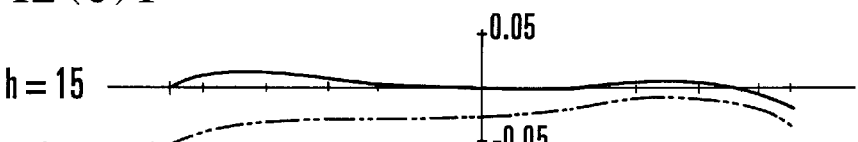
FIG. 12(c)2
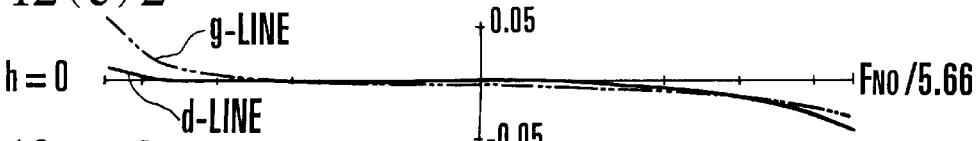
FIG. 12(c)3
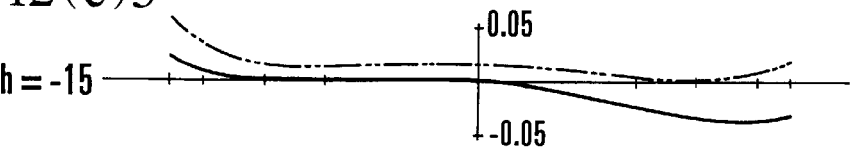

F I G. 13
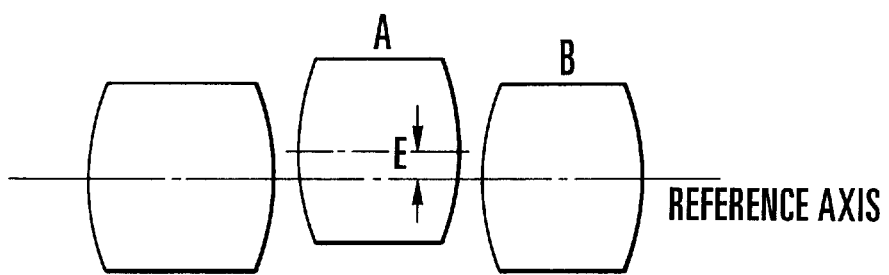

I II III IV V VI

FIG.15(a)1
F_NO /3.6
d-LINE
g-LINE
-0.40   0.40
SPHERICAL ABERRATION
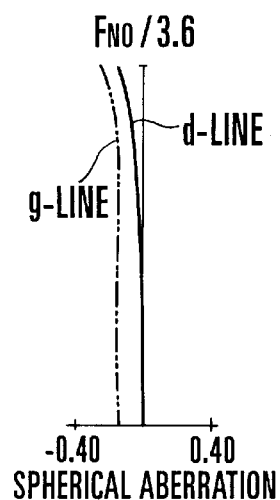
FIG.15(a)2
ω=37.4°
ΔM   ΔS
-0.40   0.40
ASTIGMATISM
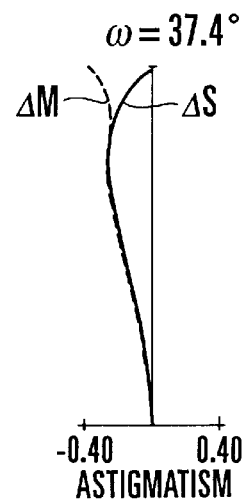
FIG.15(a)3
ω=37.4°
-5.00   5.00
DISTORTION (%)
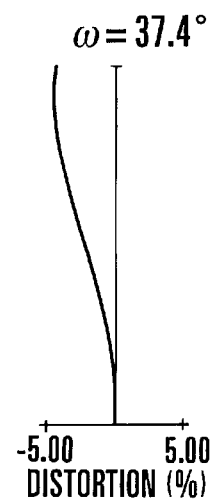
FIG.15(b)1
F_NO /4.6
d-LINE
g-LINE
-0.40   0.40
SPHERICAL ABERRATION
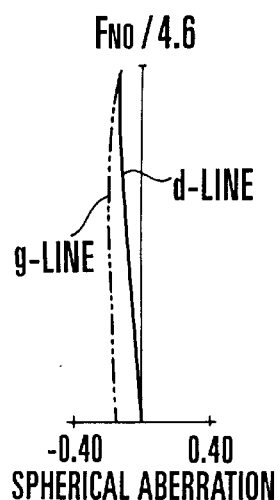
FIG.15(b)2
ω=20.0°
ΔS   ΔM
-0.40   0.40
ASTIGMATISM
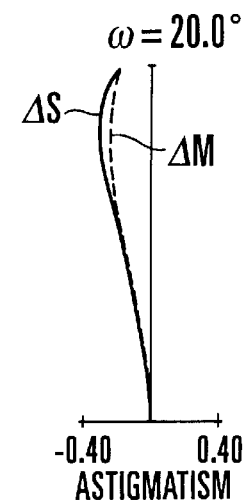
FIG.15(b)3
ω=20.0°
-5.00   5.00
DISTORTION (%)
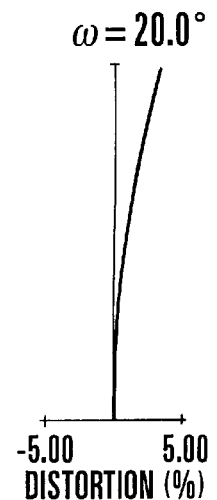
FIG.15(c)1
F_NO /5.7
d-LINE
g-LINE
-0.40   0.40
SPHERICAL ABERRATION
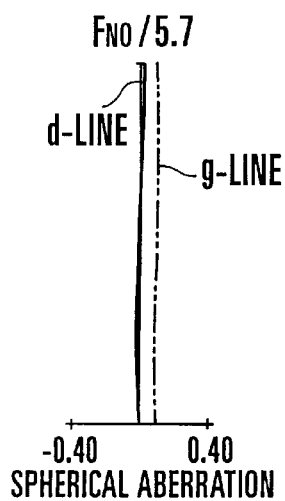
FIG.15(c)2
ω=9.3°
ΔS   ΔM
-0.40   0.40
ASTIGMATISM
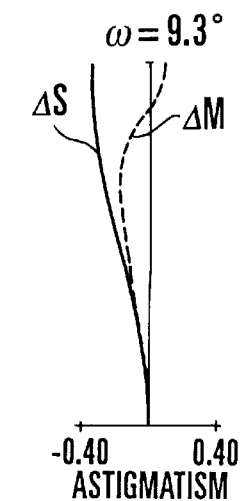
FIG.15(c)3
ω=9.3°
-5.00   5.00
DISTORTION (%)
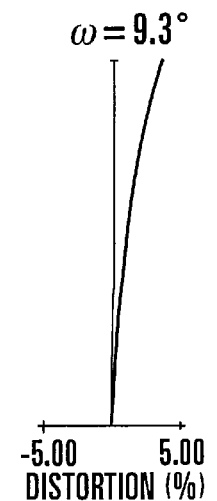

I II III IV V VI

FIG. 17(a)1
Fno /3.6
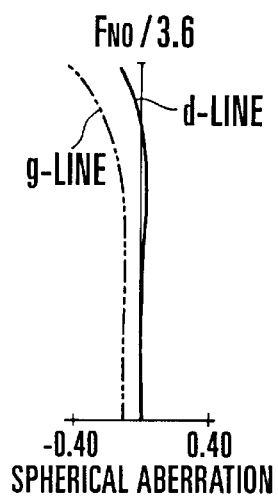
-0.40  0.40
SPHERICAL ABERRATION
FIG. 17(a)2
ω = 37.1°
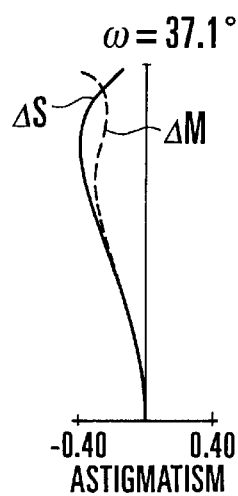
-0.40  0.40
ASTIGMATISM
FIG. 17(a)3
ω = 37.1°
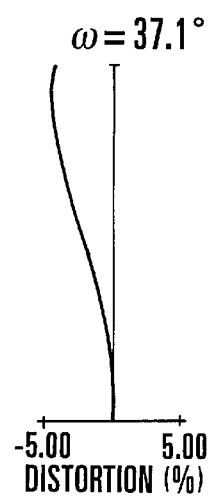
-5.00  5.00
DISTORTION (%)
FIG. 17(b)1
Fno /4.6
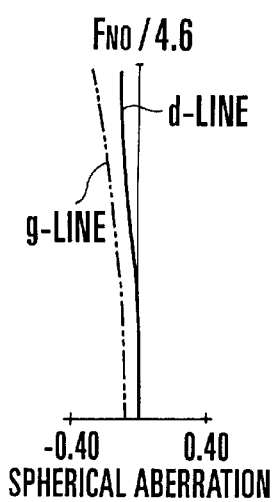
-0.40  0.40
SPHERICAL ABERRATION
FIG. 17(b)2
ω = 20.1°
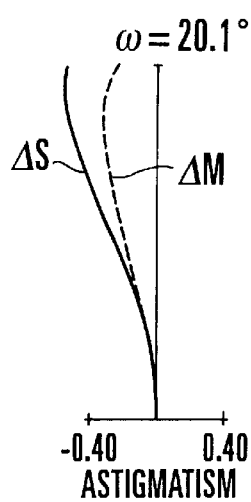
-0.40  0.40
ASTIGMATISM
FIG. 17(b)3
ω = 20.1°
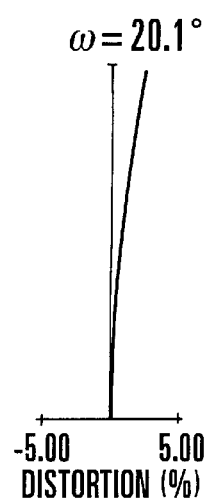
-5.00  5.00
DISTORTION (%)
FIG. 17(c)1
Fno /5.7
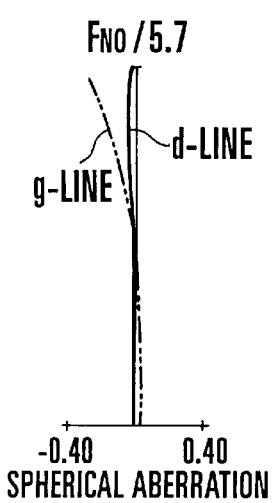
-0.40  0.40
SPHERICAL ABERRATION
FIG. 17(c)2
ω = 9.3°
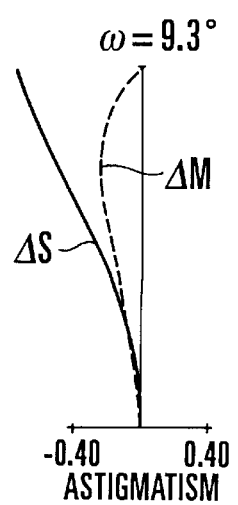
-0.40  0.40
ASTIGMATISM
FIG. 17(c)3
ω = 9.3°
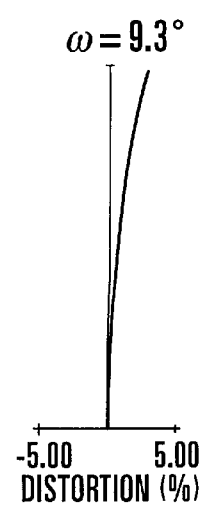
-5.00  5.00
DISTORTION (%)

I  II  III IV V  VI

FIG. 19(a)1
F_NO/3.6
g-LINE
d-LINE
-0.40  0.40
SPHERICAL ABERRATION
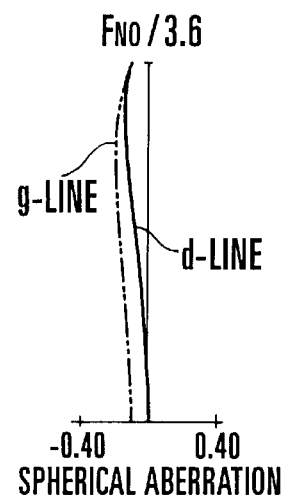
FIG. 19(a)2
ω = 37.0°
ΔM
ΔS
-0.40  0.40
ASTIGMATISM
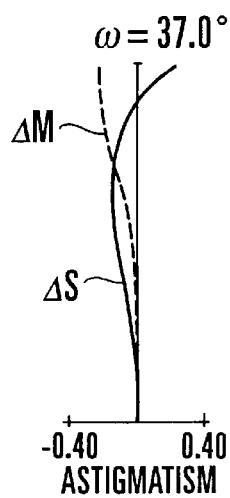
FIG. 19(a)3
ω = 37.0°
-5.00  5.00
DISTORTION (%)
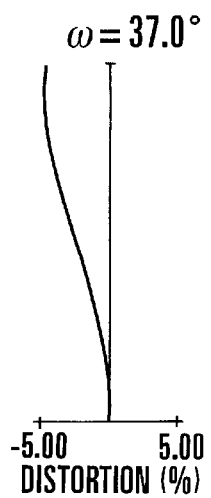
FIG. 19(b)1
F_NO/4.5
d-LINE
g-LINE
-0.40  0.40
SPHERICAL ABERRATION
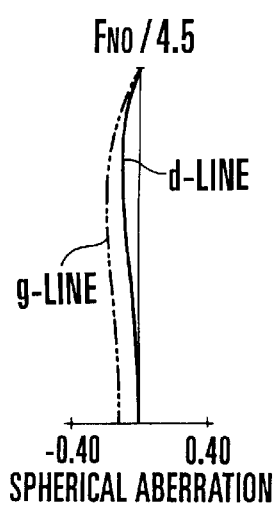
FIG. 19(b)2
ω = 20.0°
ΔM
ΔS
-0.40  0.40
ASTIGMATISM
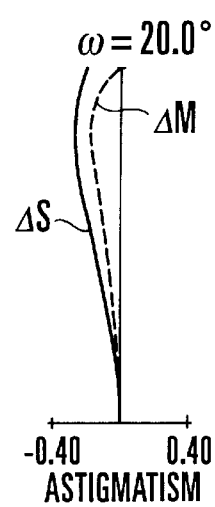
FIG. 19(b)3
ω = 20.0°
-5.00  5.00
DISTORTION (%)
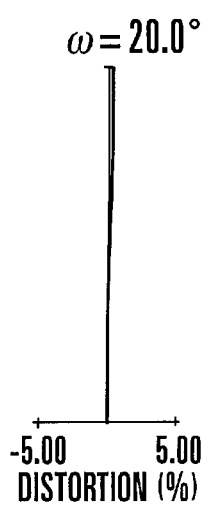
FIG. 19(c)1
F_NO/5.6
g-LINE
d-LINE
-0.40  0.40
SPHERICAL ABERRATION
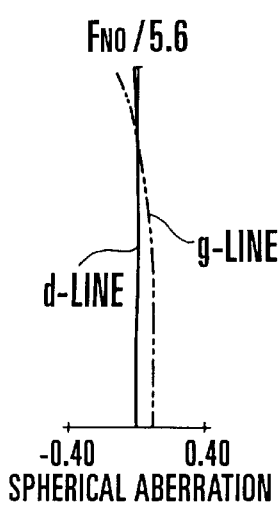
FIG. 19(c)2
ω = 9.3°
ΔM
ΔS
-0.40  0.40
ASTIGMATISM
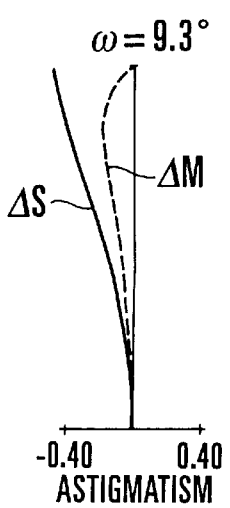
FIG. 19(c)3
ω = 9.3°
-5.00  5.00
DISTORTION (%)
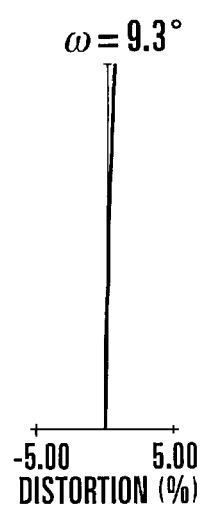

I II III IV V VI

FIG.21(a)1
Fno/3.6
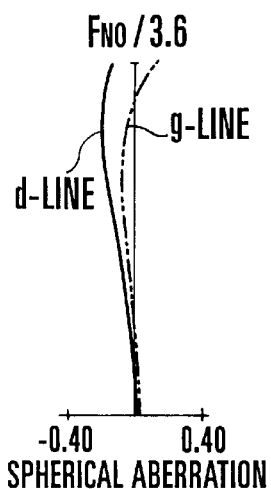
SPHERICAL ABERRATION
FIG.21(a)2
ω = 36.9°
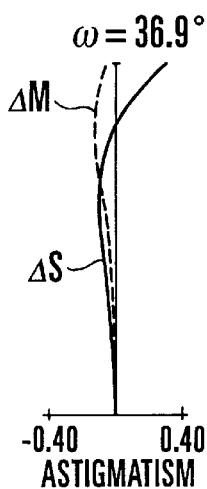
ASTIGMATISM
FIG.21(a)3
ω = 36.9°
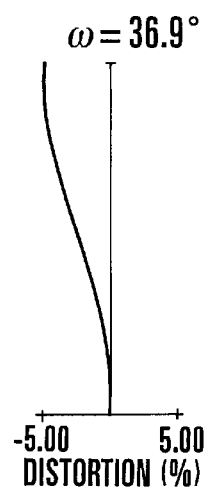
DISTORTION (%)
FIG.21(b)1
Fno/4.5
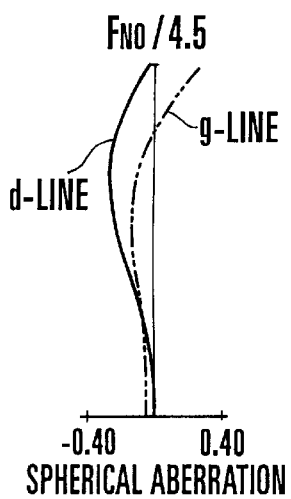
SPHERICAL ABERRATION
FIG.21(b)2
ω = 20.9°
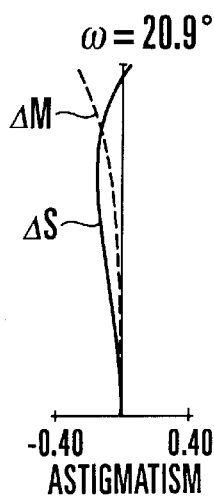
ASTIGMATISM
FIG.21(b)3
ω = 20.9°
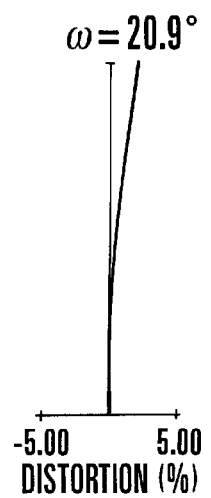
DISTORTION (%)
FIG.21(c)1
Fno/5.6
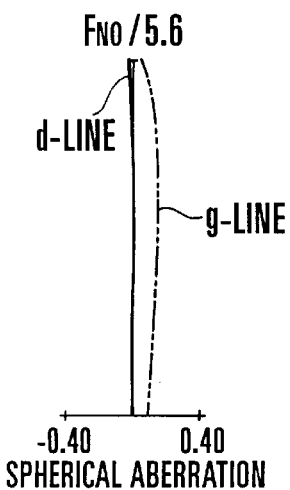
SPHERICAL ABERRATION
FIG.21(c)2
ω = 9.3°
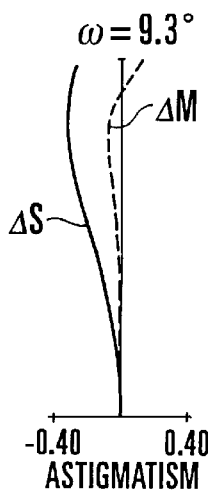
ASTIGMATISM
FIG.21(c)3
ω = 9.3°
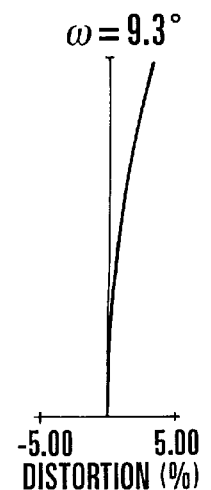
DISTORTION (%)

I　II　　III IV V　VI

FIG.27(a)1
Fno/3.6
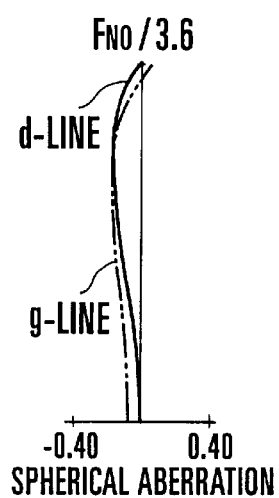
-0.40  0.40
SPHERICAL ABERRATION
FIG.27(a)2
ω = 36.9°
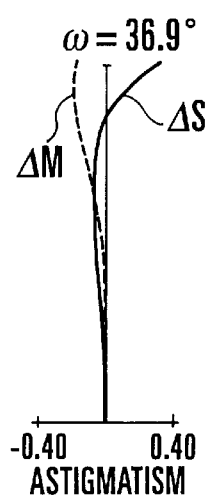
-0.40  0.40
ASTIGMATISM
FIG.27(a)3
ω = 36.9°
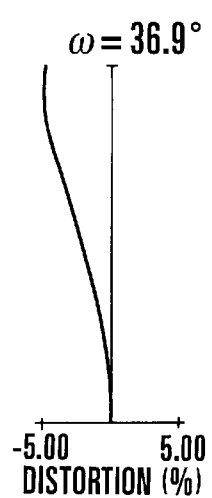
-5.00  5.00
DISTORTION (%)
FIG.27(b)1
Fno/4.4
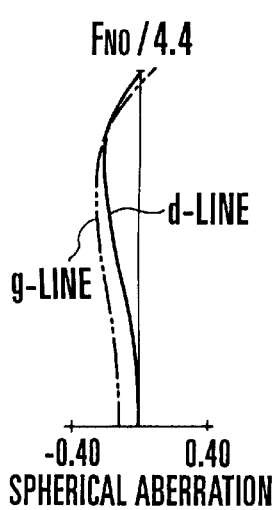
-0.40  0.40
SPHERICAL ABERRATION
FIG.27(b)2
ω = 23.4°
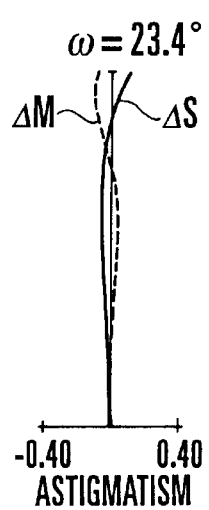
-0.40  0.40
ASTIGMATISM
FIG.27(b)3
ω = 23.4°
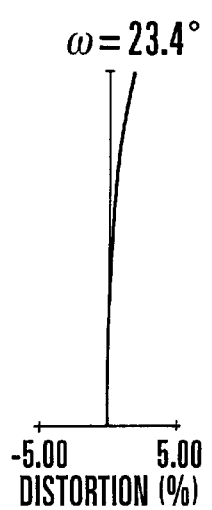
-5.00  5.00
DISTORTION (%)
FIG.27(c)1
Fno/5.6
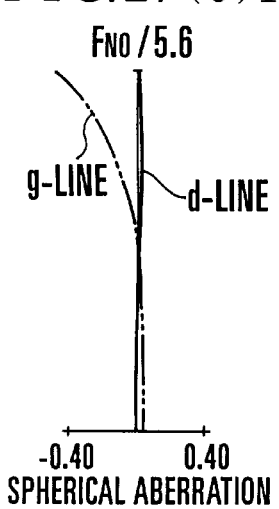
-0.40  0.40
SPHERICAL ABERRATION
FIG.27(c)2
ω = 9.3°
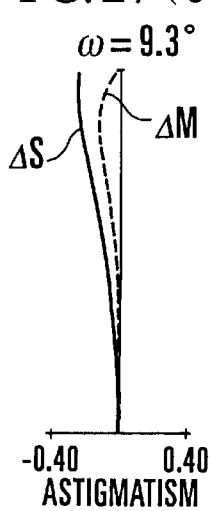
-0.40  0.40
ASTIGMATISM
FIG.27(c)3
ω = 9.3°
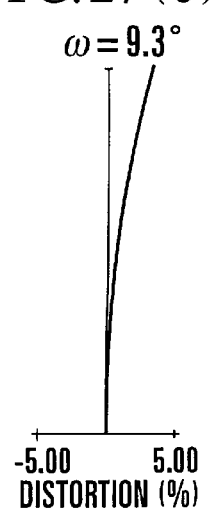
-5.00  5.00
DISTORTION (%)

FIG. 28(a)1
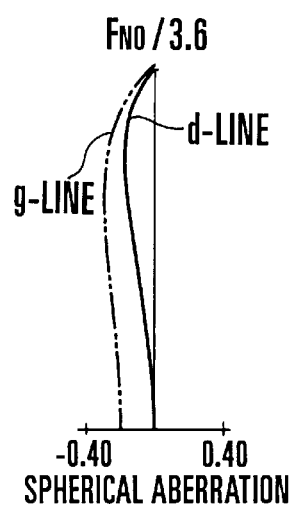
FIG. 28(a)2
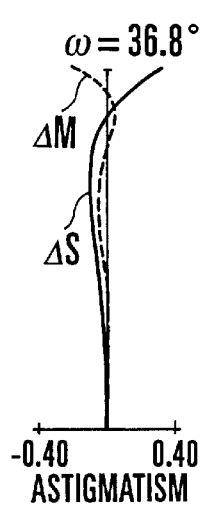
FIG. 28(a)3
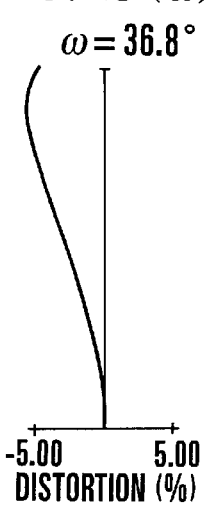
FIG. 28(b)1
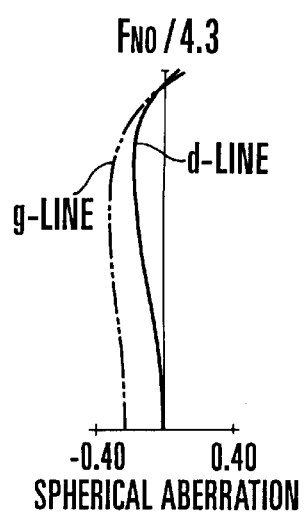
FIG. 28(b)2
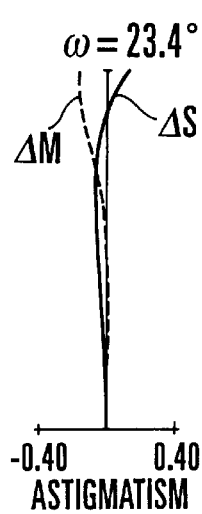
FIG. 28(b)3
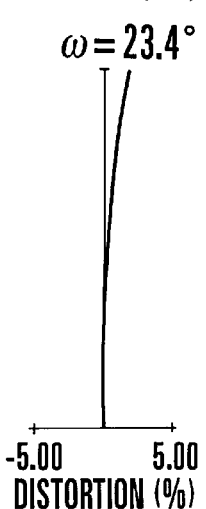
FIG. 28(c)1
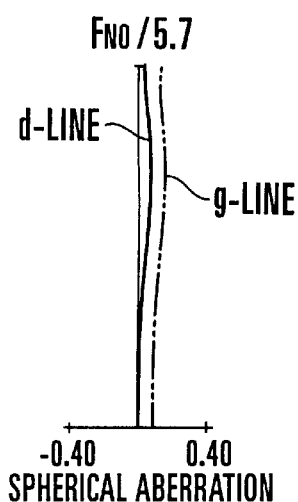
FIG. 28(c)2
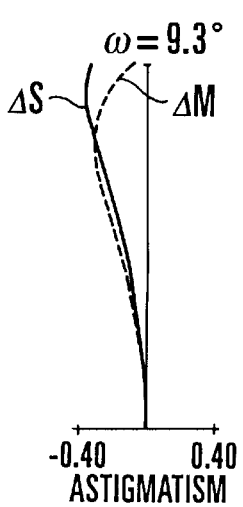
FIG. 28(c)3
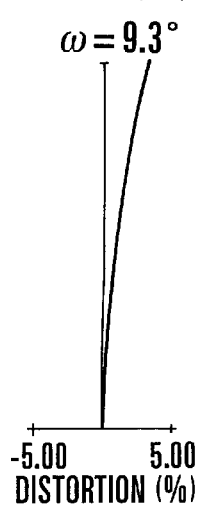

FIG. 29(a)1
F_NO/3.6
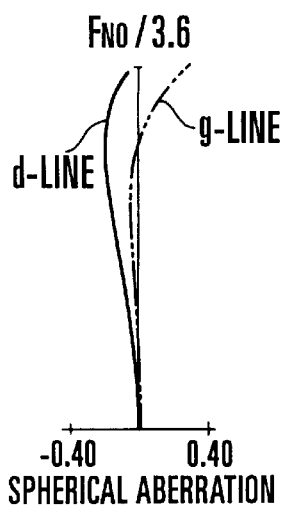
-0.40  0.40
SPHERICAL ABERRATION
FIG. 29(a)2
ω = 36.8°
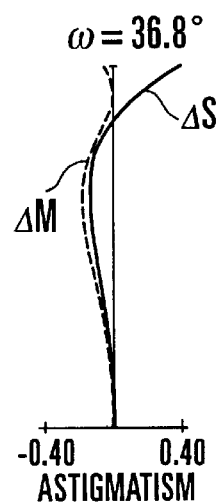
-0.40  0.40
ASTIGMATISM
FIG. 29(a)3
ω = 36.8°
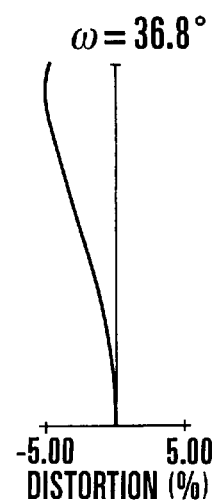
-5.00  5.00
DISTORTION (%)
FIG. 29(b)1
F_NO/4.3
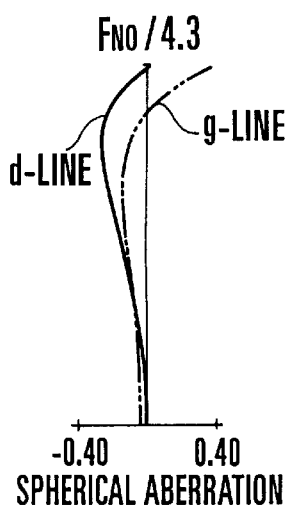
-0.40  0.40
SPHERICAL ABERRATION
FIG. 29(b)2
ω = 23.4°
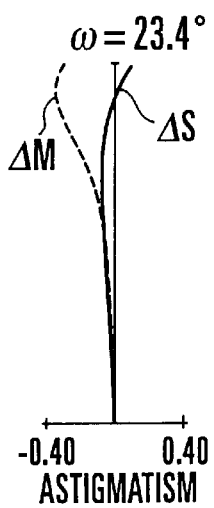
-0.40  0.40
ASTIGMATISM
FIG. 29(b)3
ω = 23.4°
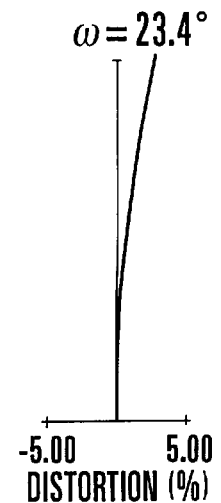
-5.00  5.00
DISTORTION (%)
FIG. 29(c)1
F_NO/5.5
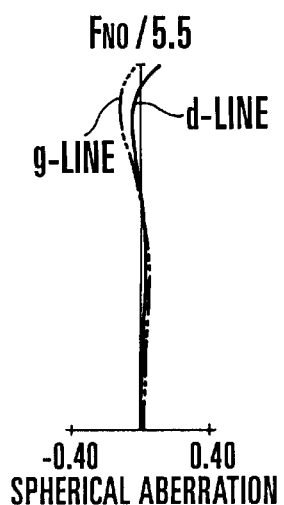
-0.40  0.40
SPHERICAL ABERRATION
FIG. 29(c)2
ω = 9.3°
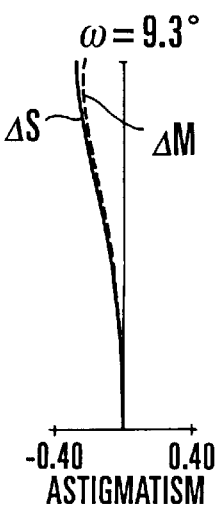
-0.40  0.40
ASTIGMATISM
FIG. 29(c)3
ω = 9.3°
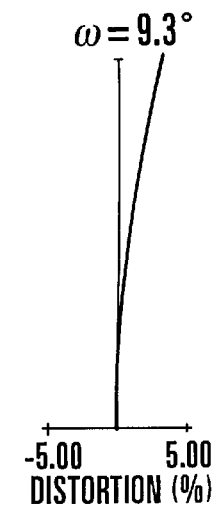
-5.00  5.00
DISTORTION (%)

FIG. 30(a)1 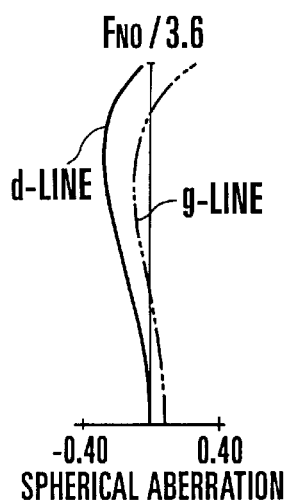
FIG. 30(a)2 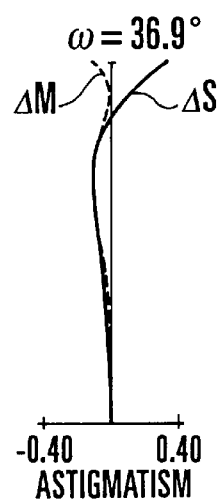
FIG. 30(a)3 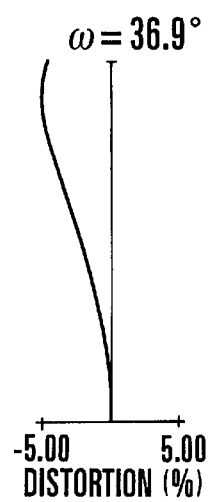
FIG. 30(b)1 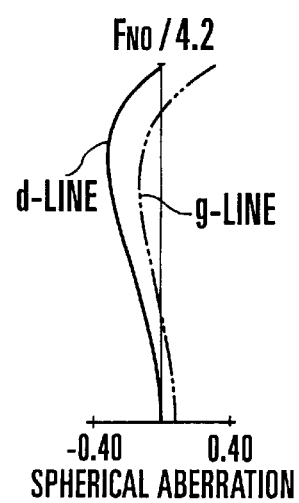
FIG. 30(b)2 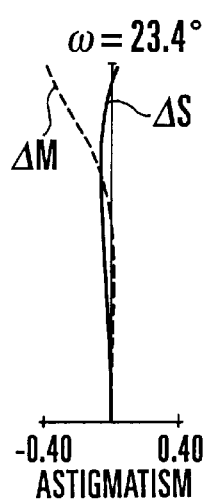
FIG. 30(b)3 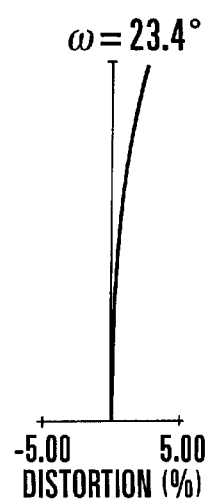
FIG. 30(c)1 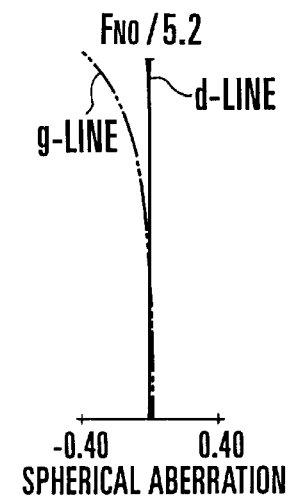
FIG. 30(c)2 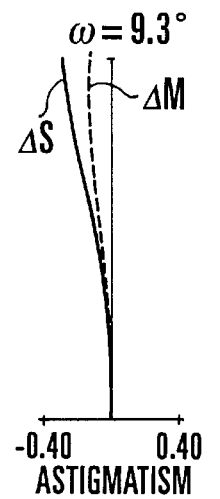
FIG. 30(c)3 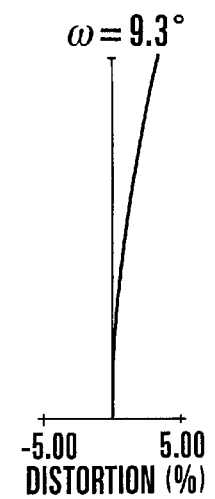

ZOOM LENS

BACKGROUND OF THE INVENTION

1. Field of the Invention

The present invention relates to zoom lenses for use in single-lens reflex cameras or the like and, more particularly, to zoom lenses having a high zoom ratio with inclusion of a focal length range from the wide-angle region and up to a middle-telephoto region. Still more particularly, the invention relates to such zoom lenses which are equipped with a mechanism responsive to accidental vibrations of the camera for compensating the shake of an image to be photographed, that is, which have the image stabilizing function.

2. Description of Related Art

Up to now, a great number of standard zoom lenses whose range covers both sides of the focal length equal to the diagonal length of the image frame have been proposed. In view of the zoom configuration alone, there are a wide variety of types beginning with the 2-unit one and extending to the 3-, 4- and 5-unit ones. Of these, although the 2- or 3-unit type is suitable to reduction of the size of the lens system to a compact form, a high range is difficult to realize. For the 4-unit type zoom lens, to increase the zoom ratio in such a manner as to keep a high optical performance, there are problems in that the total zooming movement of each lens unit has to be much longer and that each lens unit has to be made up from a somewhat greater number of lens members. So, in order to realize a zoom lens which has a range of covering the wide-angle region up to a middle-telephoto region, is constructed in a compact form, while still permitting a good optical performance to be achieved, the 5-unit type has been proposed. Such an increase of the number of movable lens units makes their air separations in appropriate ways to facilitate correction of all aberrations as produced during zooming. In the present state of art of zoom lenses, therefore, a much desired increase of the zoom ratio becomes possible to realize.

Conventional examples which employ the 5-unit type in constructing a zoom lens and succeed in giving it a high zoom ratio particularly in respect of the range of focal lengths of from the wide-angle region to a middle-telephoto region are disclosed in, for example, Japanese Laid-Open Patent Applications Nos. Sho 63-189819 and Sho 60-39613.

In the Japanese Laid-Open Patent Application No. Sho 63-189819 taken as a first conventional example, the zoom lens comprises, in order from an object side, a first lens unit having a positive refractive power, a second lens unit having a negative refractive power, a third lens unit having a positive refractive power and a fourth lens unit having a positive refractive power and a fifth lens unit having a negative refractive power, totalling five lens units, with the result mainly of a zoom ratio of a little less than 4.

In the Japanese Laid-Open Patent Application No. Sho 60-39613 taken as a second conventional example, the zoom lens comprises, in order from an object side, a first lens unit having a positive refractive power, a second lens unit having a negative refractive power, a third lens unit having a positive refractive power and a fourth lens unit having a negative refractive power and a fifth lens unit having a positive refractive power, totalling five lens units, with the result mainly of a zoom ratio of a little less than 5.

Meanwhile, as the camera vibrates accidentally, the zoom lens forms a shaking image. To take photographs of good quality, therefore, means must be provided for compensating the vibrations. In particular, a lens unit constituting a part of the optical system is moved in the nearly perpendicular directions to the optical axis, as disclosed in, for example, Japanese Laid-Open Patent Applications Nos. Hei 2-35406 and Hei 8-136862.

The Japanese Laid-Open Patent Application No. Hei 2-35406 as a third conventional example discloses a preferred embodiment suited for application mainly to leaf-shutter-type cameras. The disclosed zoom lens is of the 3-unit type, comprising, in order from an object side, a first lens unit having a negative refractive power, a second lens unit having a positive refractive power and a third lens unit having a negative refractive power. One of these lens units is made to move in the nearly perpendicular directions to the optical axis, thus compensating the shake of an image to be photographed.

The Japanese Laid-Open Patent Application No. Hei 8-136862 as a fourth conventional example discloses an embodiment suitable for application mainly to the standard zoom lenses for the single-lens reflex camera. The zoom lens is of the 4-unit type, comprising, in order from an object side, a first lens unit having a positive refractive power, a second lens unit having a negative refractive power, a third lens unit having a positive refractive power and a fourth lens unit having a positive refractive power. The second lens unit is made to move in the nearly perpendicular directions to the optical axis, thus compensating the shake of a image to be photographed.

The aforesaid first conventional example has realized a compact high-range zoom lens with the zoom ratio being about 4. However, there is a difficult problem of sufficiently shortening the focal length for the wide-angle end. In that case, as the zoom ratio increases to 4 or higher, the difficulty increases rapidly, producing another problem.

The second conventional example has realized a zoom lens which has as high a range as about 5. However, there is a very difficult problem of simultaneously fulfilling the requirement of keeping the compact form and of maintaining a good stability of optical performance at a high level throughout the entire zooming range. For the lens units, too, there is a problem in that the residual aberrations tend to increase. Therefore, as the lens units move, the sharp image plane of the entire lens system is caused to shift and the range of variation of aberrations increases greatly. To remedy these defects, on the other hand, the zoom lens cannot be manufactured economically.

Meanwhile, even in the above-described conventional examples of providing the zoom lens with the prior known means for stabilizing the image against vibrations, there are the following problems.

The third conventional example is advantageous for incorporating the image stabilizing mechanism in the mechanical mounting for that zoom lens which is adapted to be used mainly in the leaf-shutter-type camera. When the zoom lens configuration disclosed here is applied to the interchangeable lenses for the single-lens reflex camera, on the other hand, a problem arises in that the back focal distance is not long enough to create a space that allows the quick-return mirror to operate.

The fourth conventional example is adapted for application mainly to the standard zoom lenses for the single-lens reflex camera. Although the aim of the fourth conventional example is to incorporate the image stabilizing mechanism to such lenses, the use of the 4-unit type leads to a difficult problem of realizing the increase of the range, as described above. Based on the features of the image stabilizing zoom lens, a new optical system may be made up in combination with the second conventional example. Although such a measure seems to be one solution of the problems, a new problem arises in that the image stabilizing mechanism becomes difficult to coexist with the focusing mechanism. In more detail, suppose that the second conventional example has realized that the negative second lens unit moves in the directions nearly perpendicular to the optical axis to compensate the vibrations, then the adequate amplitude of vibrations can be compensated by a relatively small amount of that lens unit as is understandable from the description of the fourth conventional example. As far as the introduction of the means for compensating the vibrations is concerned, therefore, it becomes possible to form the mounting mechanism to a relatively small size.

However, in the zoom lens described in the second conventional example, if the focusing provision is made at the negative second lens unit, as disclosed in, for example, Japanese Laid-Open Patent Application No. Hei 5-119260, the minimum object distance can be shortened enough. As is also known, the variation of all aberrations can be corrected well. Another focusing method is known too, which axially moves both of the positive first and negative second lens units. In any case, for the zoom lens like that of the second conventional example, it is desirable to choose at least the second lens unit for the focusing purpose.

Therefore, when the vibration compensating mechanism of the fourth conventional example is applied to the type of zoom lens of the second conventional example, the negative second lens unit not only is associated with the mechanism for compensating the vibration but also has to be equipped with a focus adjusting mechanism. This leads to an obstacle in realizing an improved compact form of the mechanical mounting for the optical system. Also, in the zoom lens of the type of the second conventional example, the negative second lens unit tends to have a relatively large diameter. In this point, too, even any combinations of these conventional examples have hardly been able to realize a zoom lens having an improved compact form with a high zoom ratio and equipped with the mechanism for compensating the vibrations.

BRIEF SUMMARY OF THE INVENTION

A first object of the invention is to provide a zoom lens having a high range, while still maintaining a good stability of high optical performance throughout the entire extended zooming range.

Further, despite the use of a mechanism for compensating the vibrations (stabilizing an image), the invention makes it possible to reduce the size of the lens housing to a minimum. It is, therefore, a second object of the invention to provide a zoom lens which, even when compensating the vibrations, makes it possible to obtain an image of good quality.

Further, the invention is to sufficiently shorten the minimum object distance. A third object of the invention is, therefore, to provide a zoom lens which is corrected well for the ordinary aberrations, of course, and even when stabilizing the image, makes it possible to correct well aberrations throughout the extended focusing range.

In accordance with an aspect of the invention, there is provided a zoom lens comprising, in order from an object side, an object-side lens group having a plurality of lens units in which separations therebetween are varied during zooming and which have a positive refractive power as a whole, an intermediate lens unit having a negative refractive power and made movable in directions substantially perpendicular to an optical axis so as to compensate vibrations, and a rear lens unit having a positive refractive power, wherein besides the separations between the plurality of lens units which constitute the object-side lens group, at least a separation between the intermediate lens unit and the rear lens unit is varied to effect zooming.

In accordance with another aspect of the invention, there is provided a zoom lens comprising, in order from an object side, a first lens unit having a positive refractive power, a second lens unit having a negative refractive power, a third lens unit having a positive refractive power, a fourth lens unit having a positive refractive power, a fifth lens unit having a negative refractive power and a sixth lens unit having a positive refractive power, wherein, letting air separations at a wide-angle end and a telephoto end between the n-th lens unit and the (n+1)-th lens unit be denoted by $D_{nW}$ and $D_{nT}$, respectively, during zooming from the wide-angle end to the telephoto end, the air separations are varied to satisfy the following conditions:

$D_{1W} < D_{1T}$ $D_{2W} > D_{2T}$ $D_{4W} < D_{4T}$ $D_{5W} > D_{5T}$

In accordance with a further aspect of the invention, there is provided a zoom lens comprising, in order from an object side, a first lens unit having a positive refractive power, a second lens unit having a negative refractive power, a third lens unit having a positive refractive power, a fourth lens unit having a negative refractive power, a fifth lens unit having a negative refractive power and a sixth lens unit having a positive refractive power, wherein, letting air separations at a wide-angle end and a telephoto end between the i-th lens unit and the (i+1)-th lens unit be denoted by $D_{iW}$ and $D_{iT}$, respectively, during zooming from the wide-angle end to the telephoto end, the following conditions are satisfied:

$D_{1W} < D_{1T}$ $D_{2W} > D_{2T}$ $D_{3W} < D_{3T}$ $D_{4W} > D_{4T}$ $D_{5W} > D_{5T}$

These and further objects and features of the invention will become apparent from the following detailed description of the preferred embodiments thereof taken in conjunction with the accompanying drawings.

BRIEF DESCRIPTION OF THE SEVERAL VIEWS OF THE DRAWING

FIGS. 2(a)1 to 2(a)5, 2(b)1 to 2(b)5 and 2(c)1 to 2(c)5 are graphic representations of the various aberrations of the numerical example 1 in the normal state.

FIGS. 3(a)1 to 3(a)3, 3(b)1 to 3(b)3 and 3(c)1 to 3(c)3 are graphic representations of the various aberrations of the numerical example 1 when stabilizing the image.

FIGS. 5(a)1 to 5(a)5, 5(b)1 to 5(b)5 and 5(c)1 to 5(c)5 are graphic representations of the various aberrations of the numerical example 2 in the normal state.

FIGS. 6(a)1 to 6(a)3, 6(b)1 to 6(b)3 and 6(c)1 to 6(c)3 are graphic representations of the various aberrations of the numerical example 2 when stabilizing the image.

FIGS. 8(a)1 to 8(a)5, 8(b)1 to 8(b)5 and 8(c)1 to 8(c)5 are graphic representations of the various aberrations of the numerical example 3 in the normal state.

FIGS. 9(a)1 to 9(a)3, 9(b)1 to 9(b)3 and 9(c)1 to 9(c)3 are graphic representations of the various aberrations of the numerical example 3 when stabilizing the image.

FIGS. 10(a), 10(b) and 10(c) are longitudinal section views of a numerical example 4 of the zoom lens of the invention.

FIGS. 11(a)1 to 11(a)5, 11(b)1 to 11(b)5 and 11(c)1 to 11(c)5 are graphic representations of the various aberrations of the numerical example 4 in the normal state.

FIGS. 12(a)1 to 12(a)3, 12(b)1 to 12(b)3 and 12(c)1 to 12(c)3 are graphic representations of the various aberrations of the numerical example 4 when stabilizing the image.

FIG. 13 is a diagram taken to explain the decentering of a member of an optical system.

FIGS. 14(a), 14(b) and 14(c) are longitudinal section views of a numerical example 5 of the zoom lens of the invention.

FIGS. 15(a)1 to 15(a)3, 15(b)1 to 15(b)3 and 15(c)1 to 15(c)3 are graphic representations of the various aberrations of the numerical example 5.

FIGS. 17(a)1 to 17(a)3, 17(b)1 to 17(b)3 and 17(c)1 to 17(c)3 are graphic representations of the various aberrations of the numerical example 6.

FIGS. 19(a)1 to 19(a)3, 19(b)1 to 19(b)3 and 19(c)1 to 19(c)3 are graphic representations of the various aberrations of the numerical example 7.

FIGS. 20(a), 20(b) and 20(c) are longitudinal section views of a numerical example 8 of the zoom lens of the invention.

FIGS. 21(a)1 to 21(a)3, 21(b)1 to 21(b)3 and 21(c)1 to 21(c)3 are graphic representations of the various aberrations of the numerical example 8.

FIGS. 22(a), 22(b) and 22(c) are longitudinal section views of a numerical example 9 of the zoom lens of the invention.

FIGS. 23(a), 23(b) and 23(c) are longitudinal section views of a numerical example 10 of the zoom lens of the invention.

FIGS. 24(a), 24(b) and 24(c) are longitudinal section views of a numerical example 11 of the zoom lens of the invention.

FIGS. 25(a), 25(b) and 25(c) are longitudinal section views of a numerical example 12 of the zoom lens of the invention.

FIGS. 26(a), 26(b) and 26(c) are longitudinal section views of a numerical example 13 of the zoom lens of the invention.

FIGS. 27(a)1 to 27(a)3, 27(b)1 to 27(b)3 and 27(c)1 to 27(c)3 are graphic representations of the various aberrations of the numerical example 10.

FIGS. 28(a)1 to 28(a)3, 28(b)1 to 28(b)3 and 28(c)1 to 28(c)3 are graphic representations of the various aberrations of the numerical example 11.

FIGS. 29(a)1 to 29(a)3, 29(b)1 to 29(b)3 and 29(c)1 to 29(c)3 are graphic representations of the various aberrations of the numerical example 12.

FIGS. 30(a)1 to 30(a)3, 30(b)1 to 30(b)3 and 30(c)1 to 30(c)3 are graphic representations of the various aberrations of the numerical example 13.

DETAILED DESCRIPTION OF THE INVENTION

Hereinafter, preferred embodiments of the invention will be described in detail with reference to the drawings.

FIGS. 1(a), 1(b) and 1(c), FIGS. 4(a), 4(b) and 4(c), FIGS. 7(a), 7(b) and 7(c) and FIGS. 10(a), 10(b) and 10(c) are lens block diagrams of the numerical examples 1 to 4 of the invention, respectively. FIGS. 2(a)1 to 2(a)5, 2(b)1 to 2(b)5 and 2(c)1 to 2(c)5, FIGS. 5(a)1 to 5(a)5, 5(b)1 to 5(b)5 and 5(c)1 to 5(c)5, FIGS. 8(a)1 to 8(a)5, 8(b)1 to 8(b)5 and 8(c)1 to 8(c)5, and FIGS. 11(a)1 to 11(a)5, 11(b)1 to 11(b)5 and 11(c)1 to 11(c)5 show the various aberrations of the numerical examples 1 to 4, respectively, in the normal state. FIGS. 3(a)1 to 3(a)3, 3(b)1 to 3(b)3 and 3(c)1 to 3(c)3, FIGS. 6(a)1 to 6(a)3, 6(b)1 to 6(b)3 and 6(c)1 to 6(c)3, FIGS. 9(a)1 to 9(a)3, 9(b)1 to 9(b)3 and 9(c)1 to 9(c)3 and FIGS. 12(a)1 to 12(a)3, 12(b)1 to 12(b)3 and 12(c)1 to 12(c)3 show the aberrations of the numerical examples 1 to 4, respectively, in an image stabilized state against a tilting angle of 0.5°. It is to be noted that the figures whose numbers are suffixed (a), (b) or (c) are in the wide-angle end, a middle focal length position or the telephoto end, respectively.

In each lens block diagram, I represents a first lens unit having a positive refractive power, II represents a second lens unit having a negative refractive power, III represents a third lens unit having a positive refractive power, IV represents a fourth lens unit having a positive or negative refractive power, V represents a fifth lens unit having a negative refractive power, and VI represents a sixth lens unit having a positive refractive power. An aperture stop SP is, in the present embodiment, unified with the fourth lens unit IV.

In the present embodiment, during zooming from the wide-angle end to the telephoto end, all the separations between successive two of the lens units are made to vary. Incidentally, in the present embodiment, the first lens unit I to the fourth lens unit IV correspond to an object-side lens group in the invention. The fifth lens unit V corresponds to an intermediate lens unit. The sixth lens unit VI corresponds to a rear lens unit. The fifth lens unit V is arranged to move in the directions perpendicular to the optical axis when stabilizing the image.

Figure 1A:
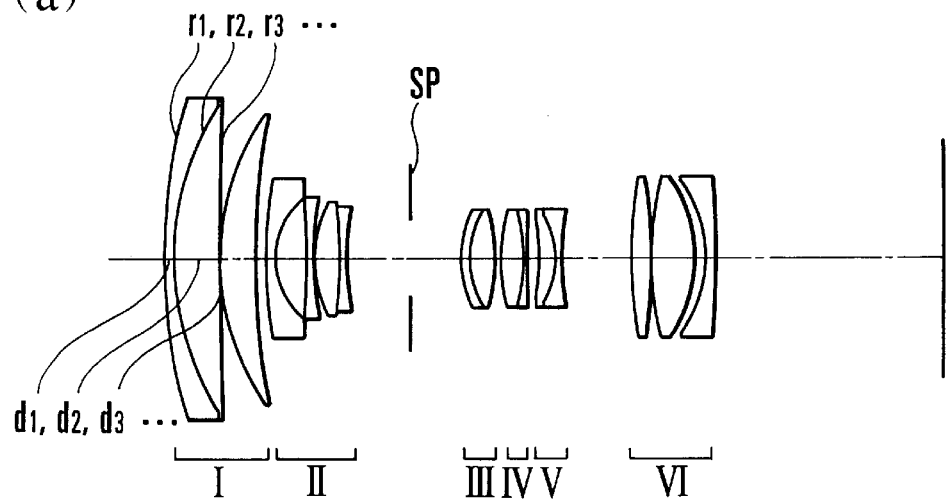
FIGS. 1(a), 1(b) and 1(c) are longitudinal section views of a numerical example 1 of the zoom lens of the invention.
Figure 1B:
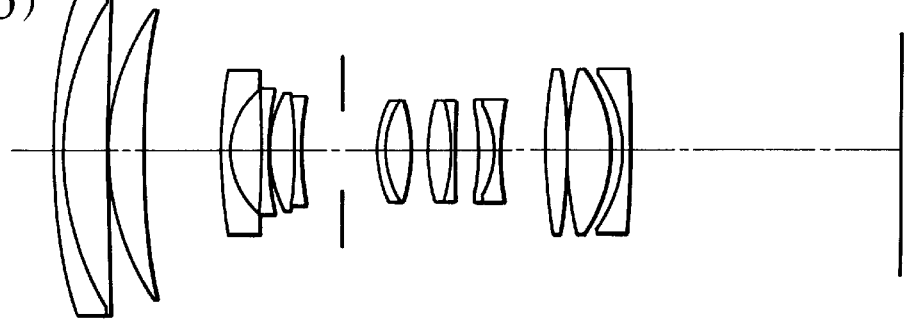
Figure 1C:
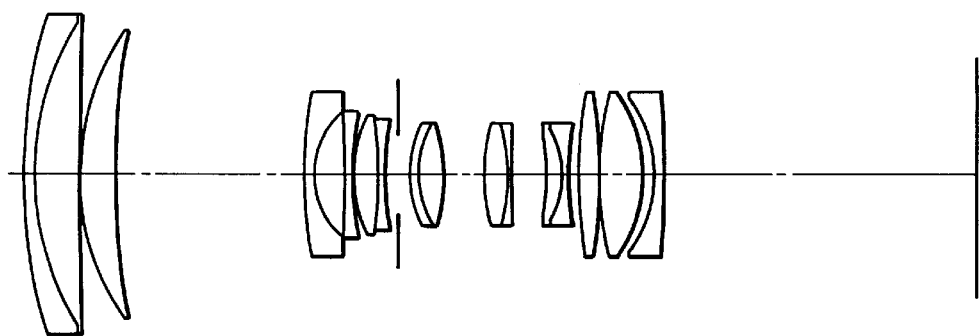
Figure 4A:
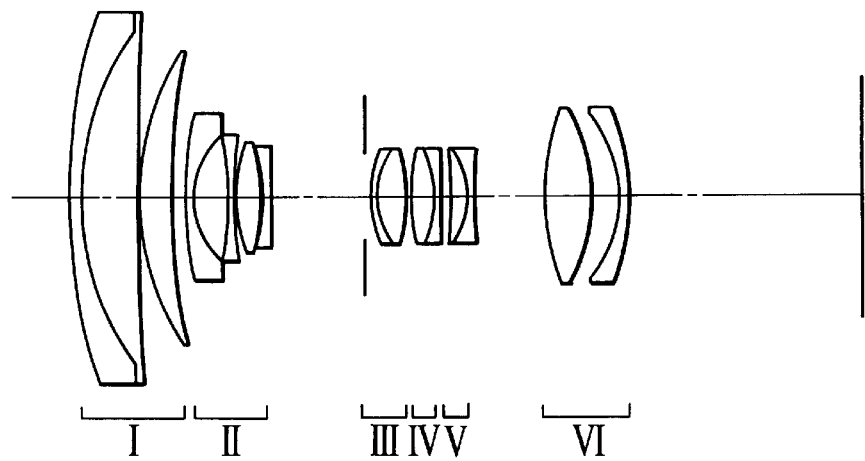
FIGS. 4(a), 4(b) and 4(c) are longitudinal section views of a numerical example 2 of the zoom lens of the invention.
Figure 4B:
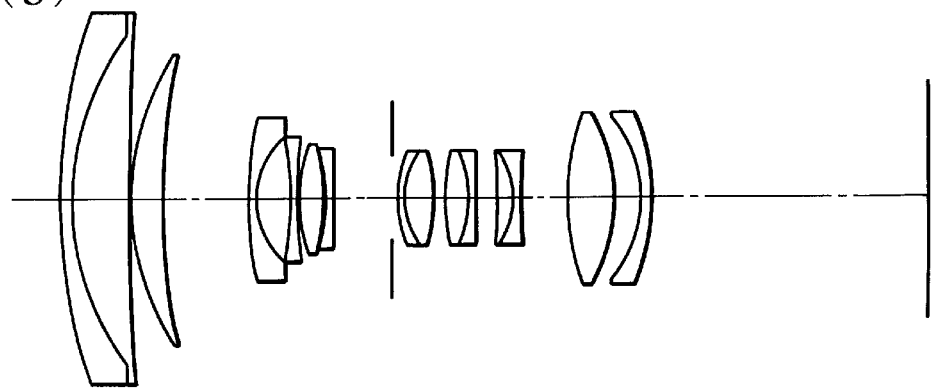
Figure 4C:
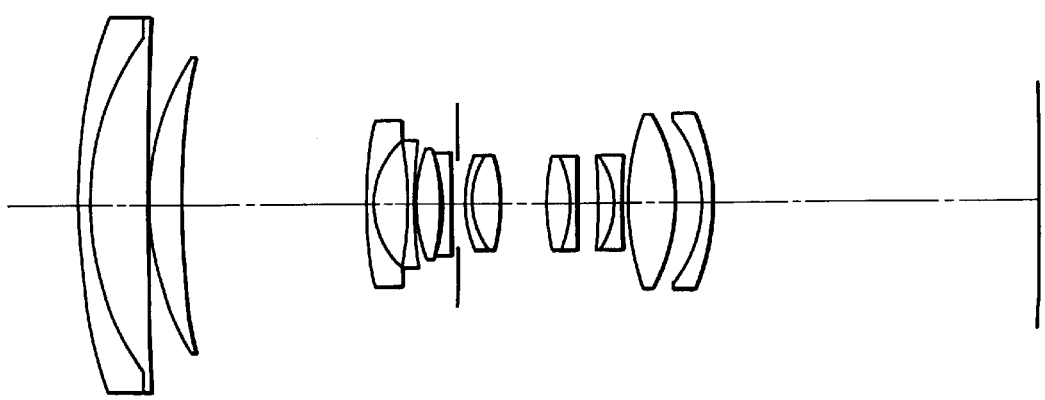
Figure 7A:
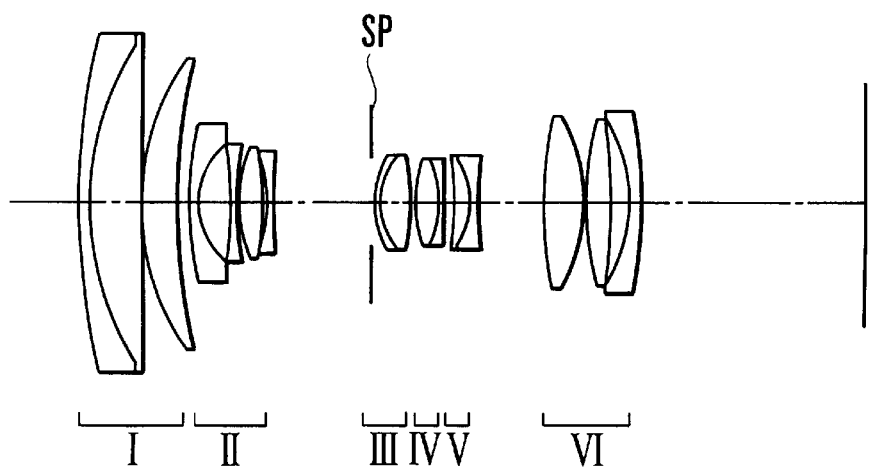
FIGS. 7(a), 7(b) and 7(c) are longitudinal section views of a numerical example 3 of the zoom lens of the invention.
Figure 7B:
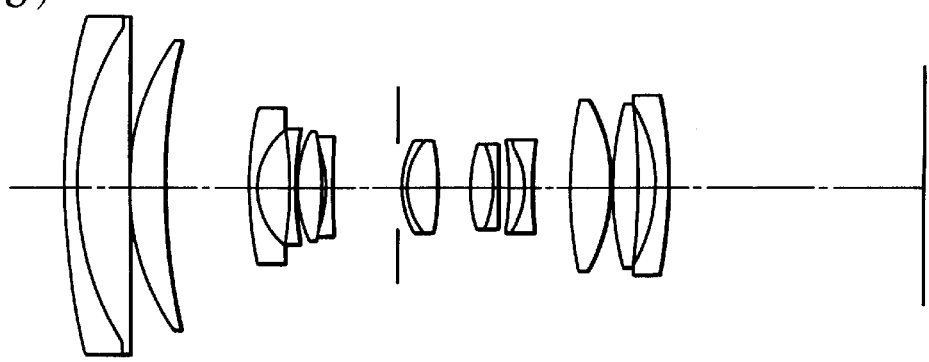
Figure 7C:
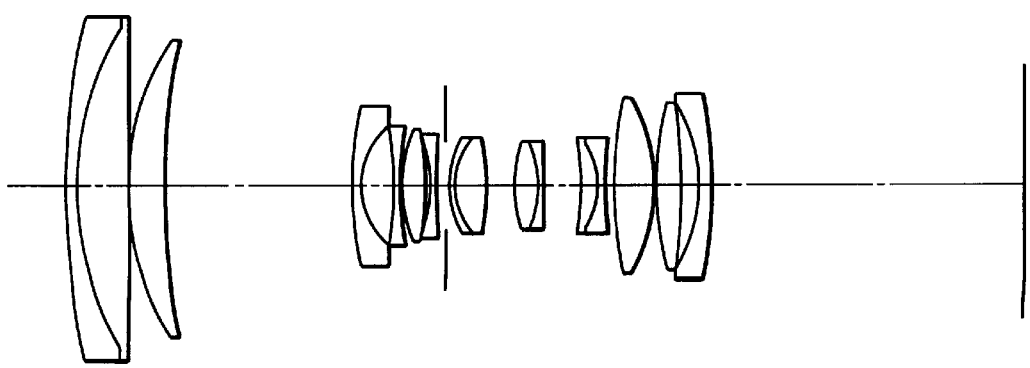
Figure 10:
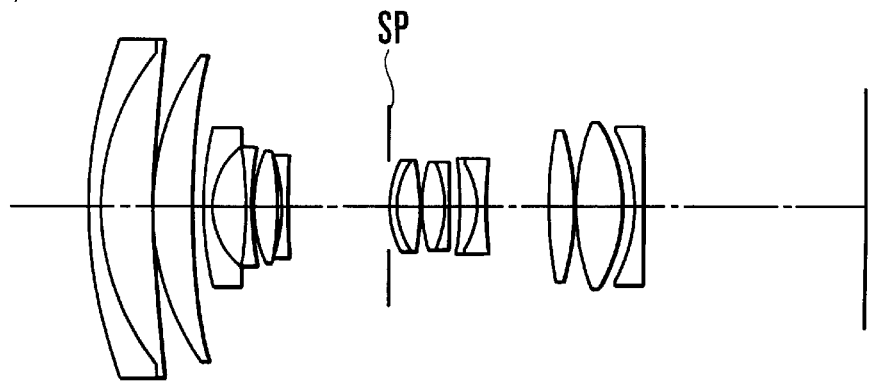
Figure 10:
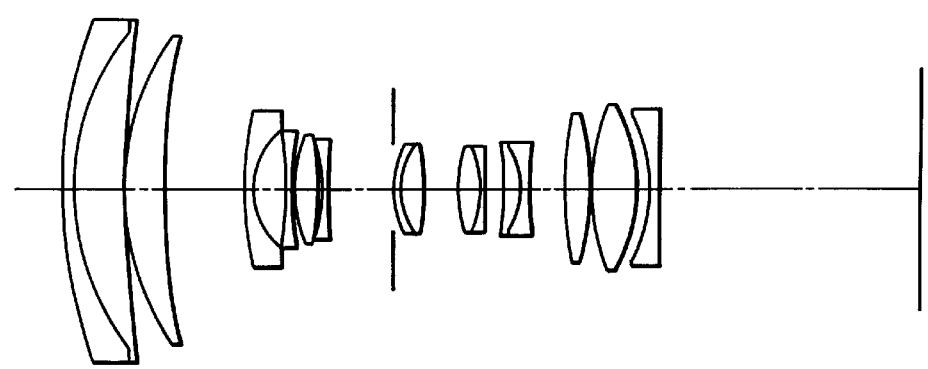
Figure 10:
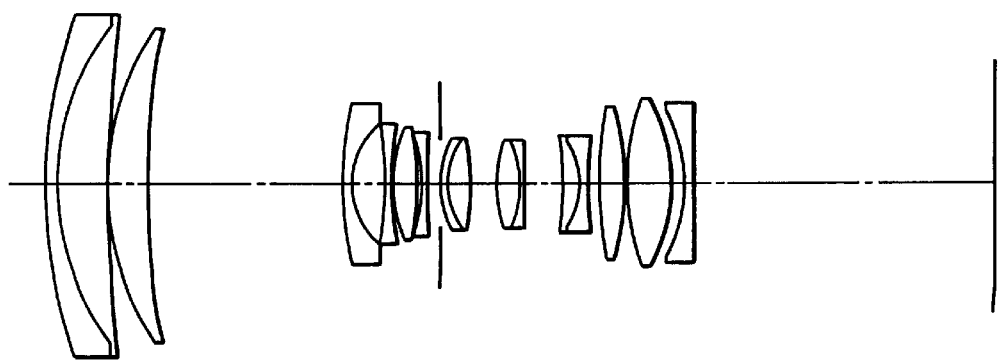
Figure 14:
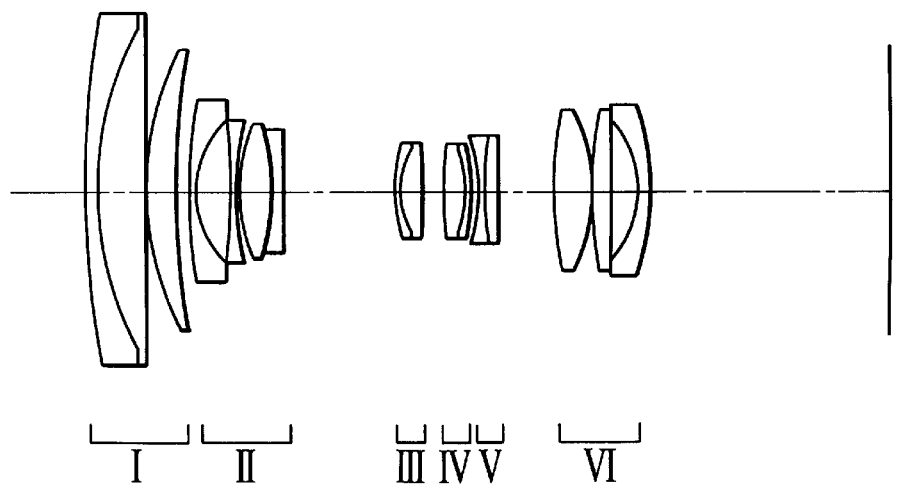
Figure 14:
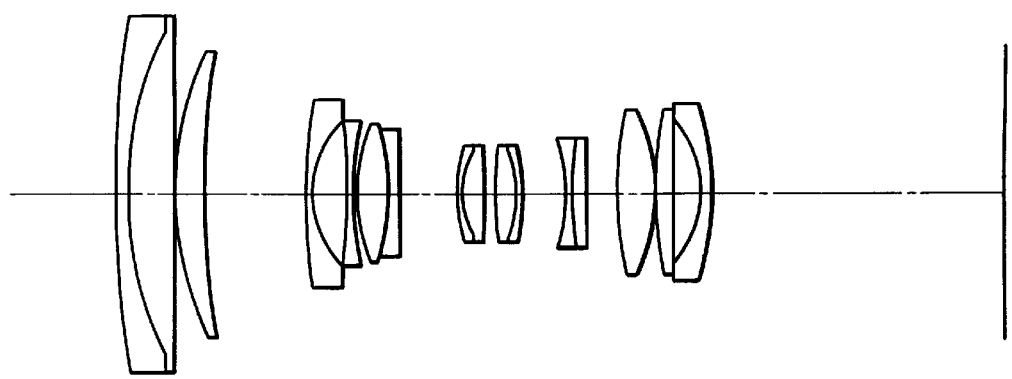
Figure 14:
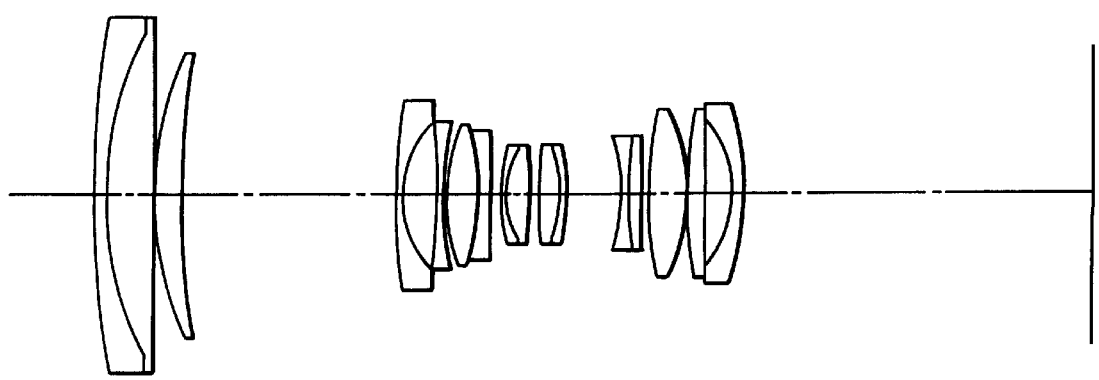

In the zoom lens according to the present embodiment, as the different optical arrangements are shown in FIG. 1(a) for the wide-angle end, FIG. 1(b) for the intermediate focal length position and FIG. 1(c) for the telephoto end, during zooming from the wide-angle end to the telephoto end, all the separations between the lens units are made to vary in appropriate way ruled by the conditions of the invention.

In particular, at least the first lens unit and the third lens unit are made to move toward the object side so that the axial air separation between the first lens unit and the second lens unit becomes progressively longer toward the telephoto end and the axial air separation between the second lens unit and the third lens unit becomes progressively shorter toward the telephoto end. Also, at least the sixth lens unit is made to move toward the object side so that the axial air separation between the fifth lens unit and the sixth lens unit becomes progressively shorter toward the telephoto end.

Another feature of the present embodiment is that the third lens unit III and the sixth lens unit VI are arranged to move in unison during zooming. By this arrangement, the moving mechanism is simplified in the structure of construction. Yet another feature is that one of the lens surfaces in the sixth lens unit IV is formed to an aspheric shape, thereby further improving the correction of aberrations.

It will be appreciated from the foregoing that the zoom lens in the present embodiment comprises, in order from an object side, an object-side lens group having a plurality of lens units in which separations therebetween are varied during zooming and which have a positive refractive power as a whole, an intermediate lens unit having a negative refractive power and made movable in directions substantially perpendicular to an optical axis to compensate vibrations, and a rear lens unit having a positive refractive power, wherein besides the separations between the plurality of lens units which constitute the object-side lens group, at least a separation between the intermediate lens unit and the rear lens unit is varied to effect zooming. An image stabilizing zoom lens which has solved the before-described subjects is thus realized.

The present embodiment may be considered to be applied to the type of zoom lens in which three of the lens units are axially moved in differential relation. Then, of these lens units, the rearmost one is made positive in refractive power. The second lens unit counting from the image side (or the intermediate lens unit) is made negative in refractive power. Preceding that second lens unit, the object-side lens group is made positive in the overall refractive power. Such a power arrangement makes appropriate the ways in which the separations between the lens units vary during zooming from the wide-angle end to the telephoto end. The thus-realized zoom lens is then provided with the means for compensating the vibrations by moving the second or negative lens unit counting from the image side in the directions nearly perpendicular to the optical axis. It is to be noted here that the rearmost lens unit is made positive in refractive power. The reason for this is that, particularly for the wide-angle end, this lens unit is positioned nearer to the image plane so that the back focal distance becomes long enough.

The feature that the second lens unit counting from the image side has the negative refractive power and the feature that the separation between this lens unit and the rearmost lens unit varies during zooming are combined to assist in sufficiently increasing the zoom ratio and, at the same time, contribute to a good correction of the variation of all aberrations during zooming. On the object side of these lens units, there is positioned a lens group which, as a whole, has a positive refractive power. So, another feature is that this lens group functions mainly as the variator, contributing to the full range of variation of the focal length. The use of such features in the zoom lens leads to a possibility of reducing the negative lens unit to a relatively small diameter as it is positioned on the second place counting from the image side. This feature gives an advantage that, for the purpose of compensating the vibrations, the perpendicular movement to the optical axis can be imparted into this lens unit, which hardly becomes an obstacle when the housing for the optical system is reduced to a relatively compact form. Another advantage is that, because this lens unit contributes a relatively small role to the range of variation of the focal length, its residual aberrations can be controlled adequately. By utilizing this feature in controlling the residual aberrations of the other lens units, it becomes possible to correct well all decentering aberrations produced by using this lens unit in stabilizing the image.

To provide the zoom lens with the function of compensating the vibrations, the present embodiment utilizes such features of the lens units in revising the prior known high-range zoom lens and the lens units constituting part of the zoom lens so as to attain improved results. An image stabilizing zoom lens which has solved the subjects described before is thus realized.

Further, the present embodiment selects at least one lens unit in the front lens group for use in focusing purposes. With this, despite a sufficient shortening of the minimum object distance, the range of variation of all aberrations with focusing can be made small enough. In addition, as the lens unit is decentered from the optical axis to compensate the vibrations, the decentering aberrations, too, can be sufficiently lessened throughout the entire extended focusing range. These features enable the entire lens housing to be prevented from increasing in bulk and size as far as possible.

Decentering aberrations are produced when one of the lens units constituting an optical system moves in the directions perpendicular to the optical axis to stabilize the image. In general, the produced amount of such aberrations depends on the angles at which the rays of light enter the decentered lens unit and exit therefrom and the residual aberrations of all the lens units. As these angles for the light rays vary, the decentering aberrations change too. The angles of incidence and emergence of the light rays vary depending usually on the focusing movement of the optical system. If a lens unit to be used in focusing lies on the object side of the decentering lens unit, the variation of the angles becomes small. Such a choice, therefore, brings out an outstanding advantage. Meanwhile, as described before, the second conventional example discloses a type of zoom lens including a wide-angle region. In this connection, it is known that, if at least the second lens unit of negative refractive power is used in focusing, a great advantage is produced. The present invention applies these principles in combination. On consideration of integrating even the focusing mechanism, it is thus made possible to achieve further improvements.

Also, despite the limitation of the decentering movement to a sufficiently small amount, the vibration has to be compensated over a wide range of tilting angles. To make this possible, while still permitting minimization of all decentering aberrations to be achieved throughout the entire range of tilting angles of the decentering lens unit, the present embodiment sets forth the following conditions:

$$0.7 < (f_{FT}/f_{FW})/(f_T/f_W) < 1.2 \tag{1}$$

$$0.2 < |f_C|/(f_W \cdot f_T)^{1/2} < 1.0 \tag{2}$$

where $f_W$ and $f_T$ are the focal lengths at the wide-angle end and the telephoto end of the entire lens system, respectively, $f_{FW}$ and $f_{FT}$ are the focal lengths at the wide-angle end and the telephoto end of the object-side lens group, respectively, and $f_C$ is the focal length of the intermediate lens unit.

The factor in the condition (1) is a formula for defining the zoom ratio of the object-side lens group relative to the zoom ratio of the entire lens system. Based on this formula, the indirect contribution of the lens unit which is to move in the directions nearly perpendicular to the optical axis to compensate the vibrations is determined. The factor in the second condition (2) represents the ratio of the focal length of the lens unit which is to move in the directions nearly perpendicular to the optical axis to compensate the vibrations to the multiplicative mean value of the shortest and longest focal lengths of the entire lens system. To achieve a sufficient increase of the maximum compensable amplitude of vibrations for image stabilization with the limitation of the decentering movement to a minimum, the decentering sensitivity (the ratio of the moved amount of the decentering lens unit to the shifted amount of the image) must be considered. This parameter is determined depending on the factor in the second condition. By satisfying the conditions (1) and (2), the invention makes it possible to minimize the amount of movement for the decentering lens unit, which in turn makes more compact the entirety of the lens housing.

A further feature of the present embodiment is that the object-side lens group is constructed with inclusion of at least three lens units, i.e., in order from the object side, a first lens unit having a positive refractive power, a second lens unit having a negative refractive power and a third lens unit having a positive refractive power. Letting the axial separations at the wide-angle end and the telephoto end between the n-th lens unit and the (n+1)-th lens unit be denoted by $D_{nW}$ and $D_{nT}$, respectively, the following conditions are satisfied to attain improved results:

$$D_{1W} < D_{1T} \tag{3}$$

$$D_{2W} > D_{2T} \tag{4}$$

The inequalities of conditions (3) and (4) regulate the variations of the separations between the first and second lens units and between the second and third lens units in appropriate ways during zooming from the wide-angle end to the telephoto end. In such a manner, the constituent lens units in the object-side lens group are arranged. The present embodiment thus specifies the sign of refractive power of every one of the lens units and the way of varying every one of the separations between successive two of the lens units so that the image stabilizing zoom lens is realized as improved over the second conventional example described before.

To enhance the advantages of the present embodiment, the entire lens system is constructed as comprising, in order from the object side, a first lens unit having a positive refractive power, a second lens unit having a negative refractive power, a third lens unit having a positive refractive power, a fourth lens unit having a positive or negative refractive power, a fifth lens unit having a negative refractive power (which corresponds to the intermediate lens unit described before) and a sixth lens unit having a positive refractive power, wherein at least four lens separations are made variable during zooming, or particularly all the lens separations may otherwise be varied, and the fifth lens unit is made movable in a direction almost perpendicular to the optical axis to compensate the vibrations. In addition, the conditions described above are satisfied.

Further, at least the second lens unit described above is axially moved to effect focusing. So, the aberrations are corrected well throughout the focusing range as can be seen from the graphic representations, although the illustrated ones are only for an infinitely distant object. In the lens design of the present embodiment, the second lens unit is assumed to move toward the object side when focusing onto an object at the minimum distance. Although not shown, the aberrations for closeup shots are corrected well too. In the present embodiment, the focusing lens lies before the image stabilizing lens unit. This means that, as the object distance changes, the angle of incidence of the light rays on the image stabilizing lens unit changes at a low rate. Therefore, the variation of aberrations with focusing can be lessened.

Another feature of the present embodiment is that at least five lens units are made axially movable for zooming and the following additional condition is set forth. By such a construction and arrangement, it becomes possible to realize a zoom lens which, in particular, is in a relatively compact form and has a high range including the wide-angle region and whose performance is excellent.

$$D_{5W} > D_{5T} \tag{5}$$

The inequality of condition (5) represents an appropriate variation with zooming of the separation between the fifth lens unit which is to move in the directions nearly perpendicular to the optical axis to compensate the variations and the sixth lens unit which is put in the rearmost position. Combined with the refractive power arrangement of the entire lens system, the inequality of condition (5) effects a better result. For the image stabilizing zoom lens of the present embodiment, the six lens units are used as a whole and the air separations between the lens units are varied in the relation determined by the inequalities of conditions (3), (4) and (5). In addition, the residual aberrations of each of the lens units are appropriately controlled to succeed in correcting well all aberrations throughout the entire zooming range not only in the normal state but also in the vibration compensated state by decentering the fifth lens unit.

Another feature of the present embodiment is that, as the focal length at the telephoto end of the entire lens system is normalized to "1", the spherical aberration coefficient $I_{CT}$ of the intermediate (or fifth) lens unit falls in the following range:

$$0.3 < I_{CT} < 5.0 \tag{6}$$

When this condition is satisfied, it becomes possible to correct well the decentering aberrations, particularly coma, which in turn prevents the image quality at or near the paraxial zone in the image frame from being deteriorated by the image stabilization.

For the image stabilizing zoom lens of the invention, the residual spherical aberration of the intermediate lens unit is made appropriate as determined by the inequalities of condition (6) to correct well the decentering coma which gives great influence to the deterioration of the image quality particularly at the telephoto end. As a rule, the spherical aberration coefficient must be reduced to zero over the entire lens system, so that the image spherical aberration is corrected small enough. So, the sum of the values of the spherical aberration coefficient which are assigned to the other lens units is determined automatically. Under this condition, the invention makes determination of the left value of the spherical aberration coefficient and of appropriate distribution of it between the object-side lens group and the rear lens unit by taking into account the magnitude relationship of the reduced angles at which the paraxial ray enters the intermediate lens unit and exits therefrom. As will be seen from the numerical examples to be described later, there are many examples of such distribution.

For the intermediate lens unit, when its spherical aberration coefficient satisfies the condition described above, it is needless to say that a wide variety of designs are available in the form and the construction and arrangement of the constituent lenses. However, the use of at least one negative lens and one positive lens makes it possible to correct well chromatic aberrations and spherical aberration. In the present embodiment, for the purpose of minimizing the driving power for the decentering lens unit, the constituent lenses employed are limited to this necessary minimum number or two. Moreover, these positive and negative lenses are in cemented form.

As is understandable from the foregoing, the present invention makes use of the type of having six lens units in total and, in view of the image stabilization, sets forth the above-described condition (6), thus succeeding in correcting well the decentering aberrations, particularly, the decentering coma, produced when the intermediate lens unit is moved in the directions nearly perpendicular to the optical axis.

When one lens unit constituting part of an optical system decenters in the direction perpendicular to the optical axis, decentering aberrations are produced. A theory about this is disclosed in the journal "Optics" Vol. 24, No. 12 (December in 1995).

Suppose the optical system laterally decanters from a reference axis to a distance E, the produced aberration components $\Delta Y(E)$ and $\Delta Z(E)$ on the image plane are expressed with an object point positioned to an image angle $\omega$ and a ray being incident on the entrance pupil at a point in the polar coordinates $(R,\phi)$ by the following equations:

$\Delta Y(E) = -(E/2\alpha')[(\Delta E) + \tan^2\omega\{3(VE1)-(VE2)\} + 2R\cos\phi\tan\omega\{3(IIIE)+(PE)\} + R^2(2+\cos 2\phi)(IIE)]$ $\Delta Z(E) = -(E/2\alpha')[2R\sin\phi\tan\omega\{3(IIIE)+(PE)\} + R^2\sin 2\phi(IIE)]$ The $\alpha'$ on the right side of these equations represents the value of the paraxial ray from the object in the image space of the optical system, and $(\Delta E)$, (VE1), (VE2), (IIIE), (PE) and (IIE) are the constants called the decentering aberration coefficients which are determined by the configuration of the optical system. These decentering aberration coefficients take values relevant to the decentering element in the optical system and those that follow. The parts before the decentering element are not related thereto at all. So, as shown in FIG. 13, assuming that a part of the optical system which decenters is called the element A, and a part behind the element A is called the element B, the values of the decentering aberration coefficients are expressed by using the values of paraxial ray tracing before and after the element A and the values of the third-order aberration coefficients of the elements A and B, as follows. It is to be noted that the paraxial ray tracing give the values $\alpha_A$, $\alpha'_A$, $\overline{\alpha}A$ and $\overline{\alpha}'A$ of the angles which the paraxial rays from the object and to the pupil make with the optical axis in the spaces before and after the decentering element, where the bar below the quantity indicates the paraxial ray to the pupil.

$(\Delta E) = -2(\alpha'_A - \alpha_A)$ $(VE1) = \{\alpha'_A V_B - \alpha_A(V_A + V_B)\} - \{\overline{\alpha}'_A III_B - \overline{\alpha}_A(III_A + III_B)\}$ $(VE2) = \alpha'_A P_B - \alpha_A(P_A + P_B)$ $(IIIE) = \{\alpha'_A III_B - \alpha_A(III_A + III_B)\} - \{\overline{\alpha}'_A II_B - \overline{\alpha}_A(II_A + II_B)\}$ $(PE) = \alpha'_A P_B - \alpha_A(P_A + P_B)$ $(IIE) = \{\alpha'_A II_B - \alpha_A(II_A + II_B)\} - \{\overline{\alpha}'_A I_B - \overline{\alpha}_A(I_A + I_B)\}$ where $(\Delta E)$ is the displacement of the original point, and (VE1) represents the decentering distortion coefficient, (VE2) the decentering distortion added aberration coefficient, (IIIE) the decentering astigmatism coefficient, (PE) the decentering field curvature coefficient and (IIE) the decentering coma coefficient.

In the image stabilizing zoom lens according to the invention, the above-described features are set forth to correct the thus-produced decentering aberrations to a sufficiently small amount. The invention has thus solved the subjects described before.

It will be appreciated from the foregoing that the present embodiment of the invention has solved the above-described subjects and provides a zoom lens of increased zoom ratio with the lens housing in compact form while still maintaining a high optical performance to be realized.

In four numerical examples to be described below, for the purpose of correcting well all aberrations, the zoom lens is constructed from six lens units in total and all the separations between successive two of the lens units are varied during zooming. To assure simplification of the structure of the lens mounting mechanism, some of the lens units, for example, the fourth lens unit IV and the fifth lens unit V, may otherwise be arranged to move in unison during zooming. For the object-side lens group in the invention, in order to better control the value of the spherical aberration coefficient $I_{CT}$ at the telephoto end of the intermediate (fifth) lens unit, the use of four lens units is disclosed in the numerical examples. If priority is given to a simpler form, it can be even considered to use, for example, three lens units, of which the first lens unit, when counted from the object side, has a positive refractive power, the second lens unit has a negative refractive power and the third lens unit has a positive refractive power. Besides these, an aspheric surface may be introduced into each of the lens units and the number of lens elements in any of the lens units may be increased or decreased as desired. These and many other variations may be made by applying the prior known methods of correcting the aberrations of the zoom lens.

The numerical examples 1 to 4 of the invention are shown below. Here, ri is the radius of curvature of the i-th lens surface, when counted from the object side, di is the i-th lens thickness or air separation, when counted from the object side, and ni and vi are respectively the refractive index and Abbe number of the i-th lens element, when counted from the object side. The aspheric surface is indicated by an asterisk.

The shape of an aspheric surface is expressed by the following equation:

$$X = \frac{(1/R)Y^2}{1+\sqrt{1-(Y/R)^2}} + BY^4 + CY^6 + DY^8 + EY^{10}$$

where R is the radius of the osculating sphere, and B, C, D and E are the aspheric coefficients.

NUMERICAL EXAMPLE 1

| f = 28.89 – 131.14 | Fno = 3.60 – 5.75 | | |
|---|---|---|---|
| r 1 = 111.994 | d 1 = 2.00 | n 1 = 1.84666 | ν 1 = 23.8 |
| r 2 = 53.844 | d 2 = 8.00 | n 2 = 1.69680 | ν 2 = 55.5 |
| r 3 = 459.765 | d 3 = 0.20 | | |
| r 4 = 47.062 | d 4 = 6.20 | n 3 = 1.71300 | ν 3 = 53.8 |
| r 5 = 123.091 | d 5 = Variable | | |
| r 6 = 96.212 | d 6 = 1.20 | n 4 = 1.83481 | ν 4 = 42.7 |
| r 7 = 14.259 | d 7 = 5.80 | | |
| r 8 = –68.032 | d 8 = 1.10 | n 5 = 1.80400 | ν 5 = 46.6 |
| r 9 = 52.671 | d 9 = 0.20 | | |
| r10 = 24.884 | d10 = 4.60 | n 6 = 1.84666 | ν 6 = 23.8 |
| r11 = –49.424 | d11 = 0.30 | | |
| r12 = –38.098 | d12 = 1.10 | n 7 = 1.83481 | ν 7 = 42.7 |
| r13 = 67.110 | d13 = Variable | | |
| r14 = Stop | d14 = Variable | | |
| r15 = 26.756 | d15 = 1.00 | n 8 = 1.84666 | ν 8 = 23.8 |

-continued

| | | | |
|---|---|---|---|
| r16 = 15.780 | d16 = 5.00 | n 9 = 1.60311 | ν 9 = 60.7 |
| r17 = −39.386 | d17 = Variable | | |
| r18 = 28.082 | d18 = 3.90 | n10 = 1.51742 | ν10 = 52.4 |
| r19 = −28.520 | d19 = 1.00 | n11 = 1.83481 | ν11 = 42.7 |
| r20 = 1182.852 | d20 = Variable | | |
| r21 = −51.345 | d21 = 3.20 | n12 = 1.80518 | ν12 = 25.4 |
| r22 = −15.219 | d22 = 1.00 | n13 = 1.70154 | ν13 = 41.2 |
| r23 = 50.487 | d23 = Variable | | |
| r24 = 101.396 | d24 = 3.50 | n14 = 1.72342 | ν14 = 38.0 |
| r25 = −118.885 | d25 = 0.20 | | |
| r26 = 57.922 | d26 = 7.80 | n15 = 1.58313 | ν15 = 59.4 |
| *r27 = −23.956 | d27 = 2.00 | | |
| r28 = −25.378 | d28 = 1.80 | n16 = 1.84666 | ν16 = 23.8 |
| r29 = −197.498 | | | |

| Variable | | Focal Length | |
|---|---|---|---|
| Separations | 28.89 | 50.00 | 131.14 |
| d 5 | 2.00 | 13.78 | 33.50 |
| d13 | 11.40 | 6.97 | 1.40 |
| d14 | 8.90 | 6.29 | 2.34 |
| d17 | 0.80 | 3.41 | 7.36 |
| d20 | 1.80 | 3.74 | 5.90 |
| d23 | 12.50 | 7.95 | 1.84 |

Aspheric Coefficients for r27

B=1.29656D-05 C=1.07517D-08
D=−3.30087D-11 E=8.80605D-14
$(f_{FT}/f_{FW})/(f_T/f_W)=0.965$ $|f_C/(f_W \cdot f_T)^{1/2}|=0.705$
$I_{FT}=0.916$ $I_{CT}=1.090$ $I_{RT}=-2.299$ where $I_{FT}$ is the spherical aberration coefficient at the telephoto end of the first to fourth lens units, and $I_{RT}$ is the spherical aberration coefficient of the sixth lens unit.

NUMERICAL EXAMPLE 2 f = 28.84 − 131.13    Fno = 3.60 − 5.25

| | | | |
|---|---|---|---|
| r 1 = 104.863 | d 1 = 2.00 | n 1 = 1.84666 | ν 1 = 23.8 |
| r 2 = 49.113 | d 2 = 10.30 | n 2 = 1.69680 | ν 2 = 55.5 |
| r 3 = 946.183 | d 3 = 0.20 | | |
| r 4 = 50.301 | d 4 = 6.00 | n 3 = 1.71300 | ν 3 = 53.8 |
| r 5 = 134.724 | d 5 = Variable | | |
| r 6 = 76.452 | d 6 = 1.20 | n 4 = 1.83481 | ν 4 = 42.7 |
| r 7 = 14.204 | d 7 = 6.20 | | |
| r 8 = −43.411 | d 8 = 1.10 | n 5 = 1.80400 | ν 5 = 46.6 |
| r 9 = 61.071 | d 9 = 0.20 | | |
| r10 = 28.872 | d10 = 4.60 | n 6 = 1.84666 | ν 6 = 23.8 |
| r11 = −32.787 | d11 = 0.60 | | |
| r12 = −25.389 | d12 = 1.10 | n 7 = 1.83481 | ν 7 = 42.7 |
| r13 = 198.265 | d13 = Variable | | |
| r14 = Stop | d14 = 1.00 | | |
| r15 = 24.886 | d15 = 1.00 | n 8 = 1.83400 | ν 8 = 37.2 |
| r16 = 16.119 | d16 = 5.00 | n 9 = 1.58313 | ν 9 = 59.4 |
| r17 = −37.542 | d17 = Variable | | |
| r18 = 40.877 | d18 = 4.20 | n10 = 1.57501 | ν10 = 41.5 |
| r19 = −17.973 | d19 = 1.00 | n11 = 1.80518 | ν11 = 25.4 |
| r20 = −331.286 | d20 = Variable | | |
| r21 = −55.783 | d21 = 3.00 | n12 = 1.80518 | ν12 = 25.4 |
| r22 = −14.687 | d22 = 1.00 | n13 = 1.72342 | ν13 = 38.0 |
| r23 = 53.447 | d23 = Variable | | |
| r24 = 43.806 | d24 = 8.40 | n14 = 1.67790 | ν14 = 55.3 |
| *r25 = −26.334 | d25 = 4.20 | | |
| r26 = −22.119 | d26 = 2.00 | n15 = 1.84666 | ν15 = 23.8 |
| r27 = −46.816 | | | |

| Variable | | Focal Length | |
|---|---|---|---|
| Separations | 28.84 | 50.00 | 131.13 |
| d 5 | 2.00 | 14.27 | 31.97 |
| d13 | 16.80 | 10.34 | 1.33 |

-continued

| | | | |
|---|---|---|---|
| d17 | 1.00 | 2.63 | 8.61 |
| d20 | 1.50 | 3.39 | 3.52 |
| d23 | 12.50 | 8.96 | 1.41 |

Aspheric Coefficients for r25

| | |
|---|---|
| B = 7.43018D − 06 | C = 1.00510D − 08 |
| D = −5.25021D − 11 | E = 7.39950D − 14 |
| $(f_{FT}/f_{FW})/(f_T/f_W) = 0.976$ | $|f_C|/(f_W \cdot f_T)^{1/2}= 0.717$ |
| $I_{FT} = 0.146$ | $I_{CT} = 0.964$   $I_{RT} = -1.061$ |

NUMERICAL EXAMPLE 3 f = 28.89 − 131.16    Fno = 3.60 − 5.31

| | | | |
|---|---|---|---|
| r 1 = 129.198 | d 1 = 2.00 | n 1 = 1.84666 | ν 1 = 23.8 |
| r 2 = 53.324 | d 2 = 8.70 | n 2 = 1.69680 | ν 2 = 55.5 |
| r 3 = 1022.702 | d 3 = 0.20 | | |
| r 4 = 45.811 | d 4 = 6.40 | n 3 = 1.71300 | ν 3 = 53.8 |
| r 5 = 125.428 | d 5 = Variable | | |
| r 6 = 46.368 | d 6 = 1.20 | n 4 = 1.83481 | ν 4 = 42.7 |
| r 7 = 13.936 | d 7 = 5.80 | | |
| r 8 = −46.740 | d 8 = 1.10 | n 5 = 1.80400 | ν 5 = 46.6 |
| r 9 = 56.139 | d 9 = 0.20 | | |
| r10 = 26.449 | d10 = 4.60 | n 6 = 1.84666 | ν 6 = 23.8 |
| r11 = −37.790 | d11 = 0.50 | | |
| r12 = −29.763 | d12 = 1.10 | n 7 = 1.83481 | ν 7 = 42.7 |
| r13 = 125.491 | d13 = Variable | | |
| r14 = Stop | d14 = 0.50 | | |
| r15 = 21.833 | d15 = 1.00 | n 8 = 1.83400 | ν 8 = 37.2 |
| r16 = 13.310 | d16 = 5.20 | n 9 = 1.58313 | ν 9 = 59.4 |
| *r17 = −34.660 | d17 = Variable | | |
| r18 = 28.732 | d18 = 3.80 | n10 = 1.48749 | ν 10 = 70.2 |
| r19 = −23.596 | d19 = 1.00 | n11 = 1.83400 | ν 11 = 37.2 |
| r20 = 174.342 | d20 = Variable | | |
| r21 = −46.268 | d21 = 3.10 | n12 = 1.83400 | ν12 = 37.2 |
| r22 = −14.972 | d22 = 1.00 | n13 = 1.71300 | ν13 = 53.8 |
| r23 = 57.180 | d23 = Variable | | |
| r24 = 61.205 | d24 = 7.60 | n14 = 1.67790 | ν 14 = 55.3 |
| *r25 = −29.212 | d25 = 0.20 | | |
| r26 = 93.781 | d26 = 3.50 | n15 = 1.48749 | ν 15 = 70.2 |
| r27 = −23.409 | d27 = 4.00 | | |
| r28 = −25.390 | d28 = 2.00 | n16 = 1.84666 | ν 16 = 23.8 |
| r29 = −73.217 | | | |

| Variable | | Focal Length | |
|---|---|---|---|
| Separations | 28.89 | 50.00 | 131.16 |
| d 5 | 2.00 | 15.26 | 32.49 |
| d13 | 17.00 | 11.52 | 1.99 |
| d17 | 1.00 | 3.24 | 5.03 |
| d20 | 1.80 | 3.98 | 6.81 |
| d23 | 11.50 | 7.08 | 1.75 |

Aspheric Coefficients

| | |
|---|---|
| For r17: B = 3.69694D − 06 | C = −1.18710D − 08 |
| D = 1.25888D − 12 | E = −1.74005D − 12 |
| For r25: B = 2.98300D − 06 | C = 1.26182D − 08 |
| D = −5.16713D − 11 | E = 8.75754D − 14 |
| $(f_{FT}/f_{FW})/(f_T/f_W) = 0.990$ | $|f_C|/(f_W \cdot f_T)^{1/2}= 0.718$ |
| $I_{FT} = -2.089$ | $I_{CT} = 1.481$   $I_{RT} = 0.592$ |

NUMERICAL EXAMPLE 4

| f = 28.95 – 131.81 | | Fno = 4.00 – 5.66 | |
|---|---|---|---|
| r 1 = 86.130 | d 1 = 2.00 | n 1 = 1.84666 | ν1 = 23.8 |
| r 2 = 47.978 | d 2 = 8.70 | n 2 = 1.62299 | ν 2 = 58.2 |
| r 3 = 224.073 | d 3 = 0.20 | | |
| r 4 = 45.524 | d 4 = 7.00 | n 3 = 1.71300 | ν 3 = 53.8 |
| r 5 = 133.141 | d 5 = Variable | | |
| r 6 = 76.162 | d 6 = 1.20 | n 4 = 1.83400 | ν 4 = 37.2 |
| r 7 = 13.607 | d 7 = 5.90 | | |
| r 8 = –59.519 | d 8 = 1.10 | n 5 = 1.80400 | ν 5 = 46.6 |
| r 9 = 46.879 | d 9 = 0.20 | | |
| r10 = 23.797 | d10 = 4.50 | n 6 = 1.84666 | ν 6 = 23.8 |
| r11 = –48.376 | d11 = 0.50 | | |
| r12 = –35.278 | d12 = 1.00 | n 7 = 1.77250 | ν 7 = 49.6 |
| r13 = 64.416 | d13 = Variable | | |
| r14 = Stop | d14 = 0.50 | | |
| r15 = 26.714 | d15 = 1.00 | n 8 = 1.84666 | ν 8 = 23.8 |
| r16 = 15.581 | d16 = 4.20 | n 9 = 1.60311 | ν 9 = 60.7 |
| r17 = –46.708 | d17 = Variable | | |
| r18 = 28.636 | d18 = 3.60 | n10 = 1.51742 | ν10 = 52.4 |
| r19 = –26.013 | d19 = 1.00 | n11 = 1.83481 | ν11 = 42.7 |
| r20 = –375.586 | d20 = Variable | | |
| r21 = –48.925 | d21 = 3.10 | n12 = 1.84666 | ν12 = 23.8 |
| r22 = –15.457 | d22 = 1.00 | n13 = 1.72342 | ν13 = 38.0 |
| r23 = 56.510 | d23 = Variable | | |
| r24 = 124.260 | d24 = 4.30 | n14 = 1.58313 | ν14 = 59.4 |
| *r25 = –35.522 | d25 = 0.20 | | |
| r26 = 43.139 | d26 = 8.00 | n15 = 1.51742 | ν15 = 52.4 |
| r27 = –26.719 | d27 = 2.40 | | |
| r28 = –25.599 | d28 = 1.40 | n16 = 1.80518 | ν16 = 25.4 |
| r29 = 224.920 | | | |

| Variable Separations | Focal Length | | |
|---|---|---|---|
| | 28.89 | 50.00 | 131.18 |
| d 5 | 2.00 | 13.23 | 33.51 |
| d13 | 17.50 | 11.67 | 2.54 |
| d17 | 1.00 | 6.08 | 4.45 |
| d20 | 1.50 | 3.78 | 7.04 |
| d23 | 11.50 | 6.13 | 2.51 |

Aspheric Coefficients for r25

| | |
|---|---|
| B = 8.12554D – 06 | C = 2.37589D – 08 |
| D = –4.61167D – 11 | E = 3.27083D – 13 |
| $(f_{FT}/f_{FW})/(f_T/f_W)$ = 0.968 | $|f_C|/(f_W \cdot f_T)^{1/2}$ = 0.726 |
| $I_{FT}$ = –0.155 | $I_{CT}$ = 1.661 | $I_{RT}$ = –1.524 |

As described above, the present embodiment has realized simultaneous fulfillment of the requirements of increasing the zoom ratio as including the wide-angle region to a middle-telephoto region and of maintaining good stability of optical performance throughout the entire zooming range. Moreover, even when compensating the vibrations, the image of good quality is obtained. Although the image stabilizing means is introduced, it is made possible to improve the compact form of the lens housing.

The present invention is next described in connection with another embodiment more suited to be applied to the zoom lens having the image stabilizing function in great detail with reference to FIGS. 14(a), 14(b) and 14(c) through FIGS. 22(a), 22(b) and 22(c).

The zoom lens according to the present embodiment comprises, in order from an object side, a first lens unit I having a positive refractive power, a second lens unit II having a negative refractive power, a third lens unit III having a positive refractive power, a fourth lens unit IV having a positive refractive power, a fifth lens unit V having a negative refractive power and a sixth lens unit VI having a positive refractive power. It should be noted here that, similarly to the foregoing embodiment, it is possible to obtain the image stabilizing function by decentering the fifth lens unit V.

FIGS. 14(a), 14(b) and 14(c) show the optical arrangements of a numerical example 5 of the zoom lens of the invention with FIG. 14(a) in the wide-angle end, FIG. 14(b) in an intermediate focal length position and FIG. 14(c) in the telephoto end.

During zooming from the wide-angle end to the telephoto end, while the second lens unit remains stationary, the first lens unit I, the third lens unit III, the fourth lens unit IV, the fifth lens unit V and the sixth lens unit VI axially move toward the object side. Another feature is that, during zooming, the third lens unit III and the sixth lens unit VI move in unison, assuring simplification of the structure of the moving mechanism. Further, in the numerical example 5, an aspheric surface is used in one of the surfaces in the sixth lens unit VI to correct aberrations well.

The aberrations of the numerical example 5 when focused on an object at infinity are shown in FIGS. 15(a)1 to 15(a)3, 15(b)1 to 15(b)3 and 15(c)1 to 15(c)3. The figures whose numbers are suffixed (a), (b) or (c) represents the aberrations in the wide-angle end, a middle focal length position or the telephoto end, respectively. Incidentally, g stands for the spectral g-line, d stands for the spectral d-line, ΔM stands for the meridional focus line, and ΔS stands for the sagittal focus line.

The zoom lens of the numerical example 5 has image angles of 75° or so in the wide-angle end and of 18° or so in the telephoto end. The zoom ratio is a little less than 5. Despite the realization of such a high range, it has succeeded in good correction of the various aberrations. Incidentally, the aberrations shown in FIGS. 15(a)1 to 15(c)3 are only for an infinitely distant object. However, in the numerical example 5, the design is made on the premise that the second lens unit II moves toward the object side to effect focusing. So, closeup photography can be performed with the image kept in good quality.

Figure 16A:
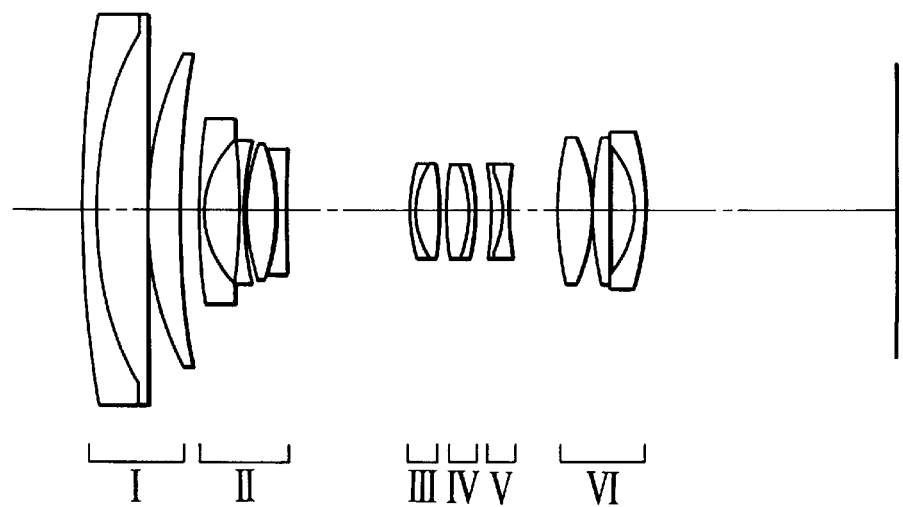
FIGS. 16(a), 16 (b) and 16 (c) are longitudinal section views of a numerical example 6 of the zoom lens of the invention.
Figure 16B:
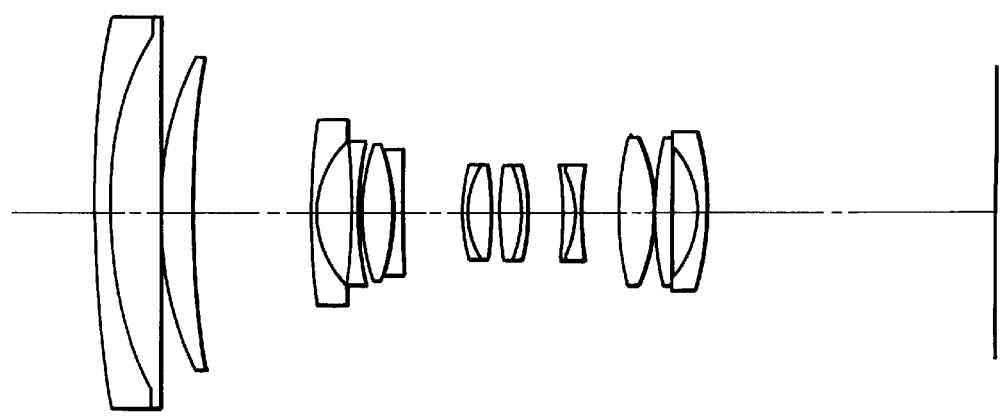
Figure 16C:
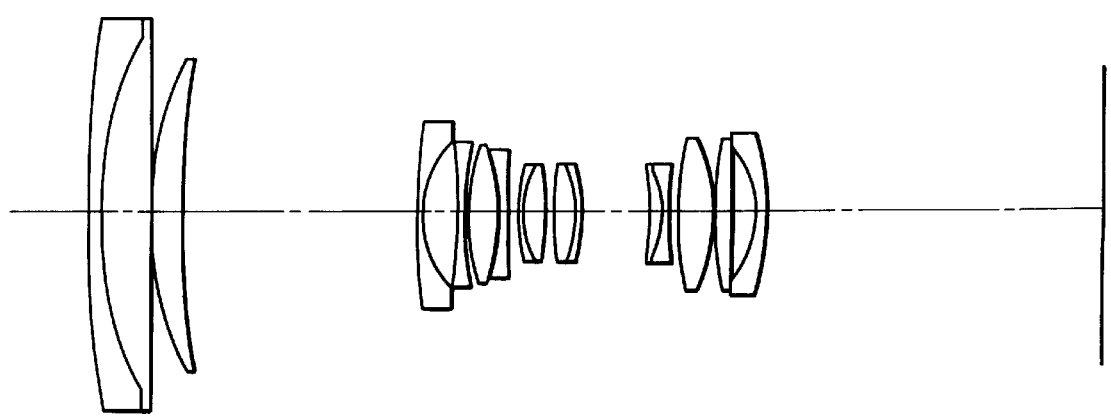

Another zoom lens for a numerical example 6 of the invention is shown in different operative positions in FIGS. 16(a), 16(b) and 16(c). The second lens unit II remains stationary during zooming. During zooming from the wide-angle end to the telephoto end, the fourth lens unit IV and the sixth lens unit VI move in unison, and this combined lens unit and the other lens units move toward the object side in differential relation. The aberrations of the numerical example 6 of the zoom lens are shown in FIGS. 17(a)1 to 17(a)3, 17(b)1 to 17(b)3 and 17(c)1 to 17(c)3.

Figure 18A:
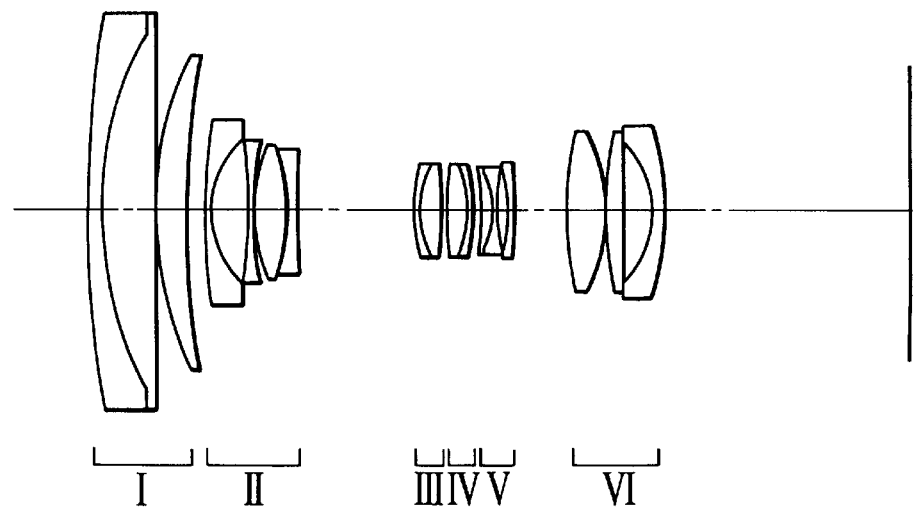
FIGS. 18(a), 18(b) and 18(c) are longitudinal section views of a numerical example 7 of the zoom lens of the invention.
Figure 18B:
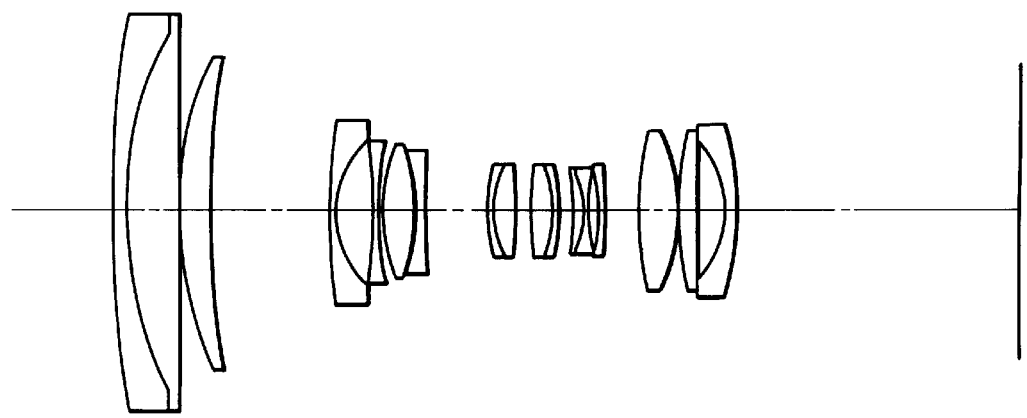
Figure 18C:
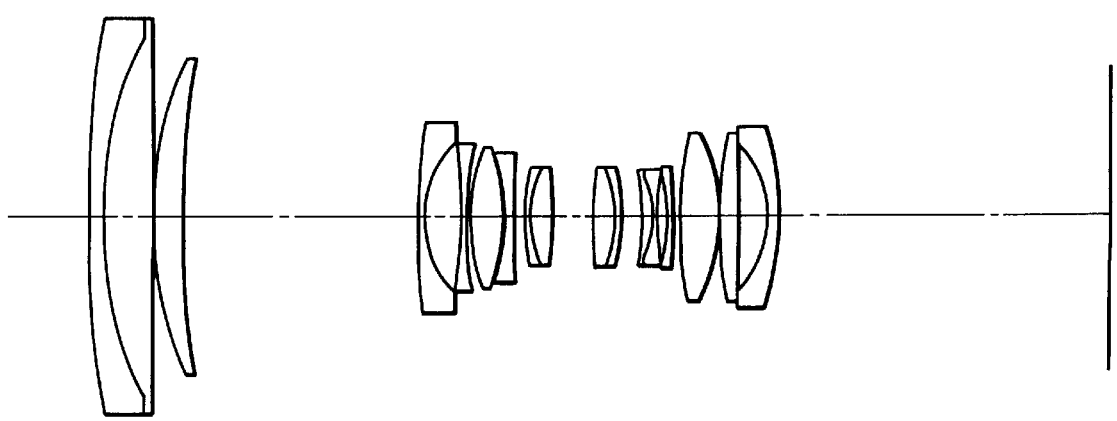

Another zoom lens for a numerical example 7 of the invention is shown in different operative positions in FIGS. 18(a), 18(b) and 18(c). Similarly to the numerical example 5, the second lens unit II remains stationary during zooming. During zooming from the wide-angle end to the telephoto end, the third lens unit III and the sixth lens unit VI move in unison, and this combined lens unit and the other lens units move toward the object side in differential relation. The aberrations of the numerical example 7 of the zoom lens are shown in FIGS. 19(a)1 to 19(a)3, 19(b)1 to 19(b)3 and 19(c)1 to 19(c)3.

Figure 20:
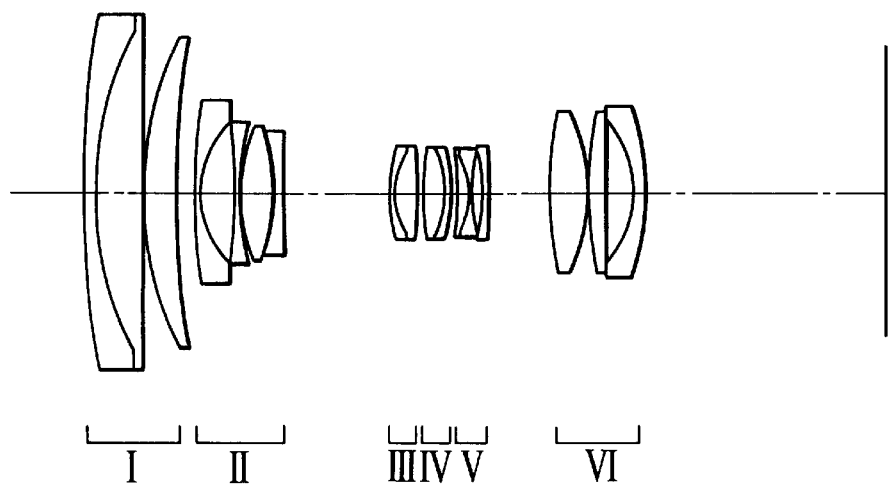
Figure 20:
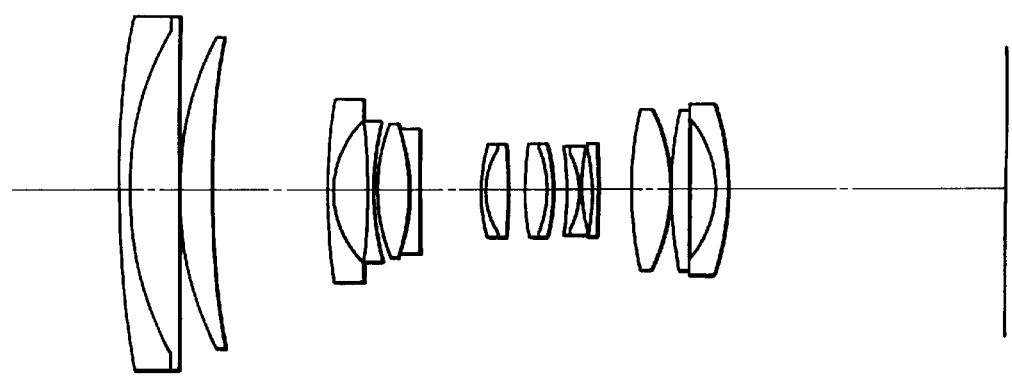
Figure 20:
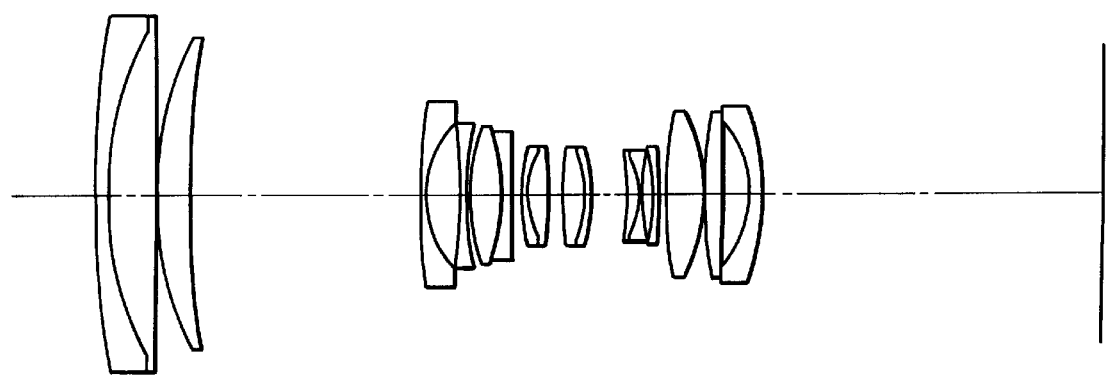
Figure 22:
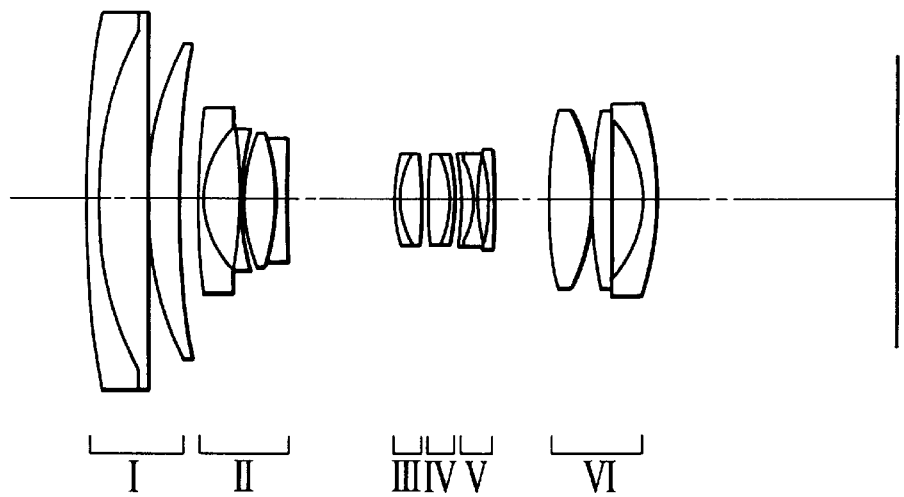
Figure 22:
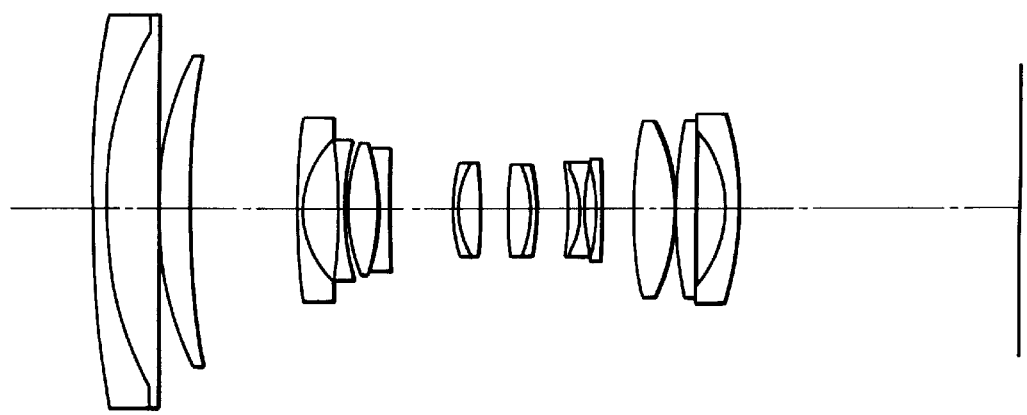
Figure 22:
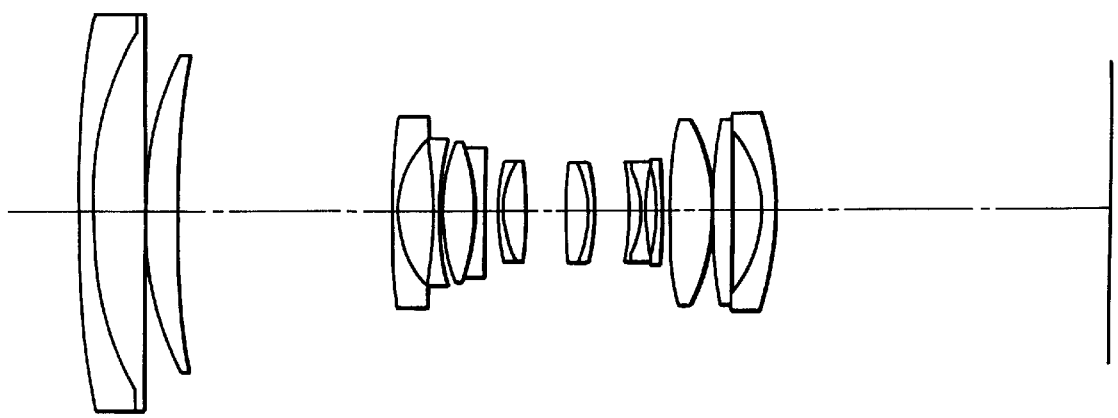
Figure 23:
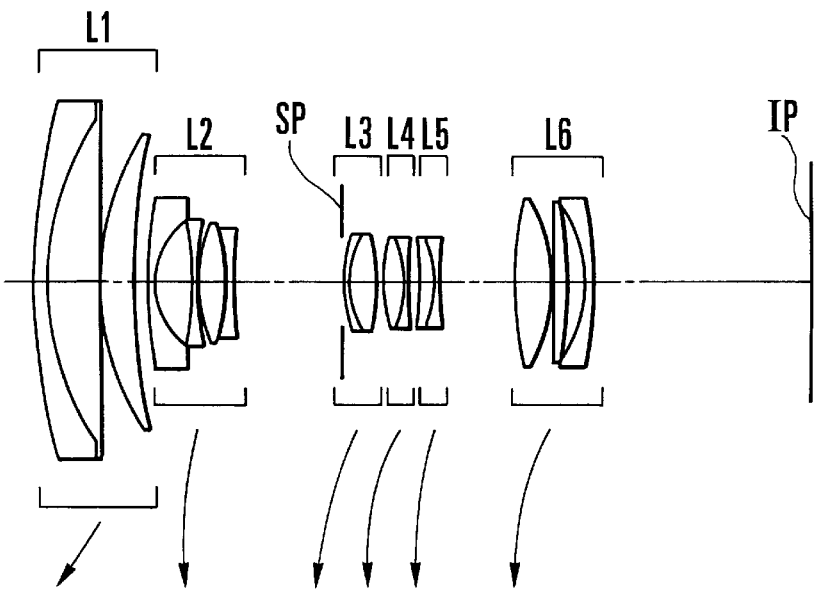
Figure 23:
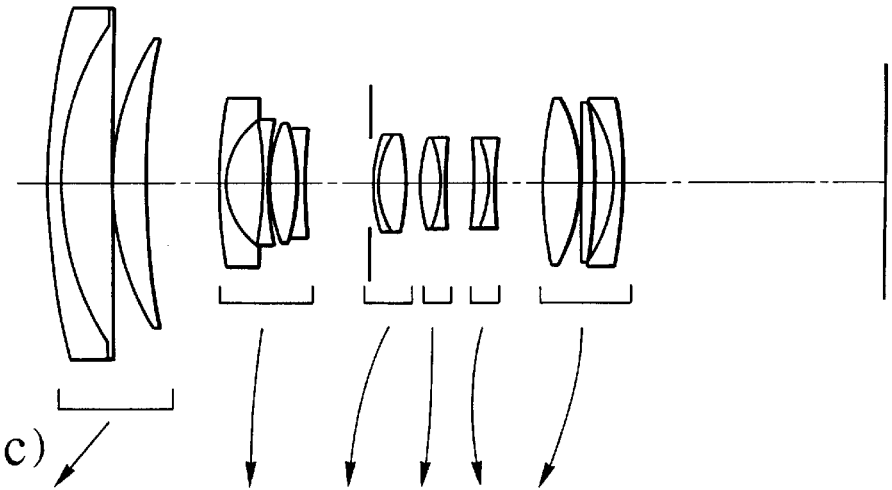
Figure 23:
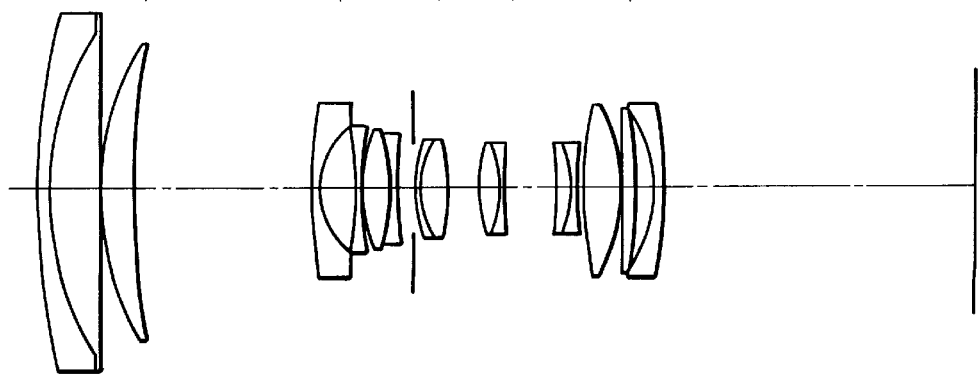
Figure 24:
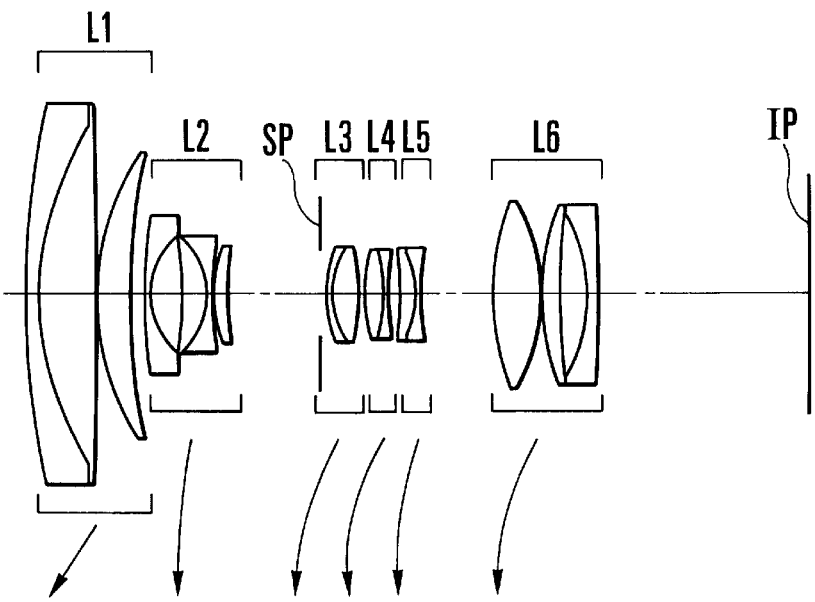
Figure 24:
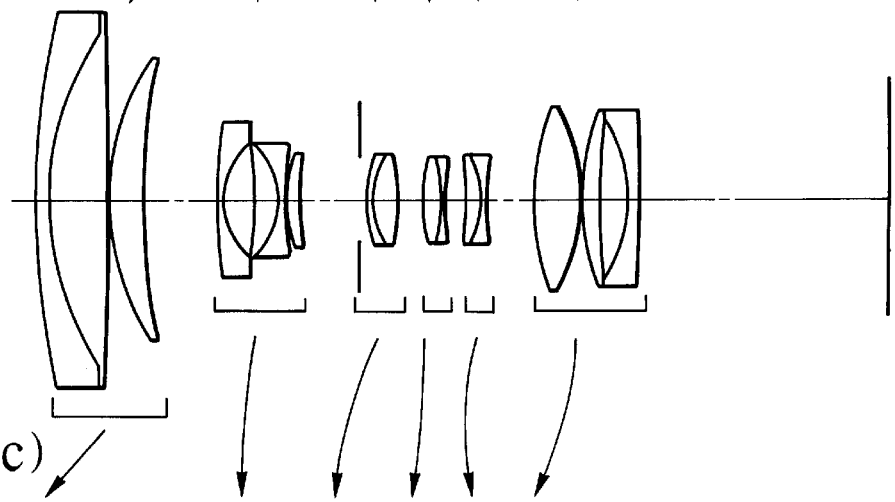
Figure 24:
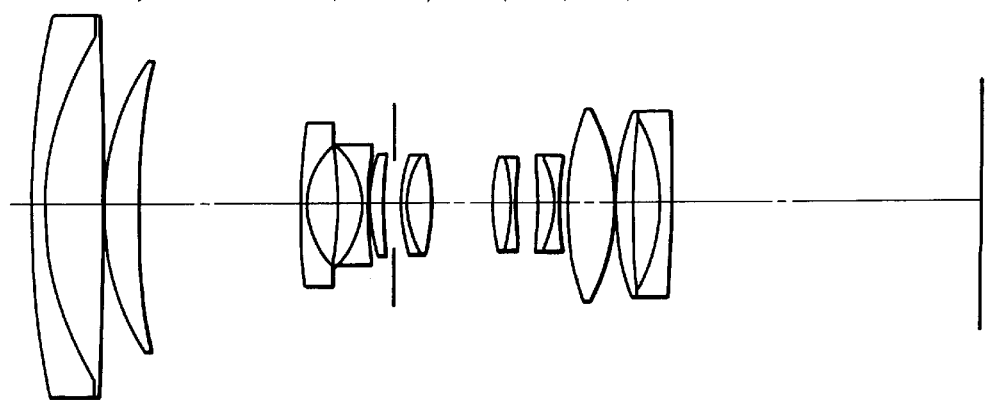
Figure 25:
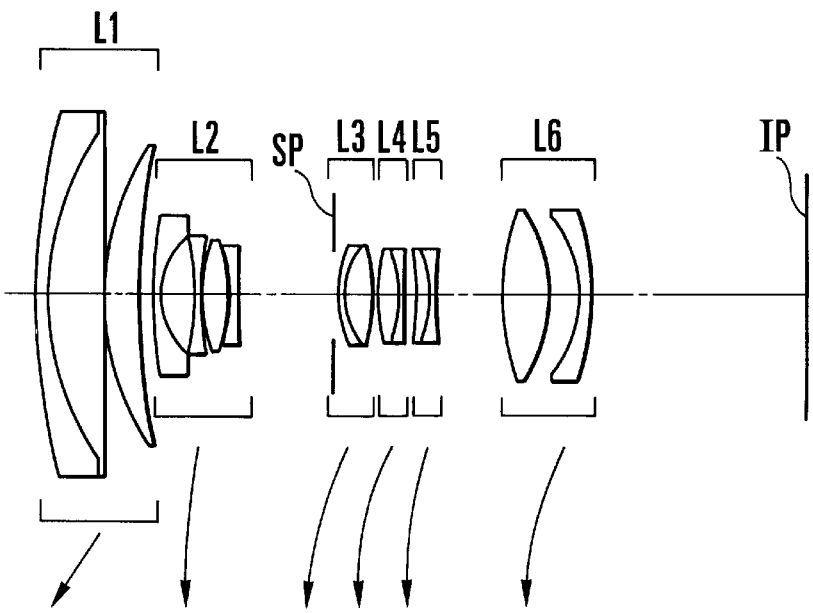
Figure 25:
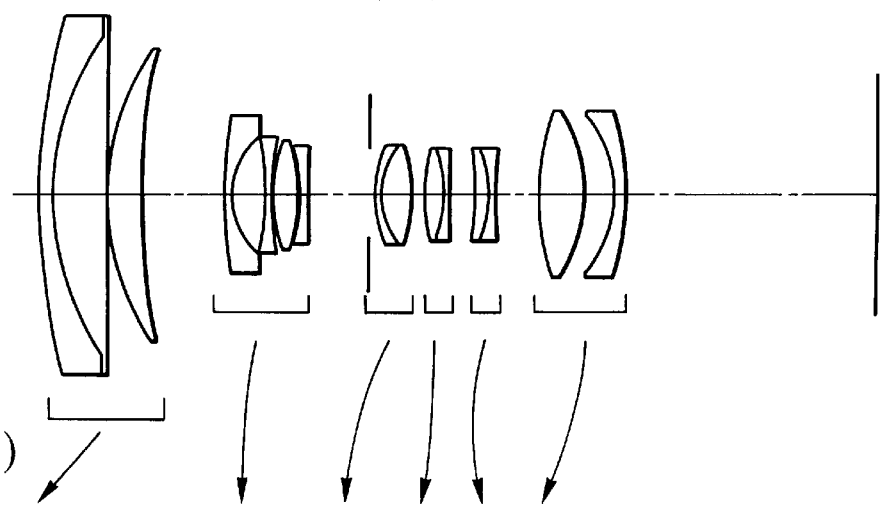
Figure 25:
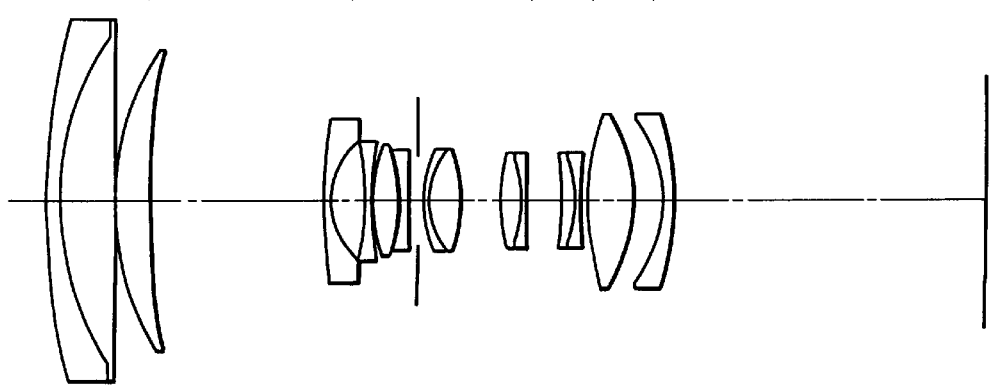
Figure 26:
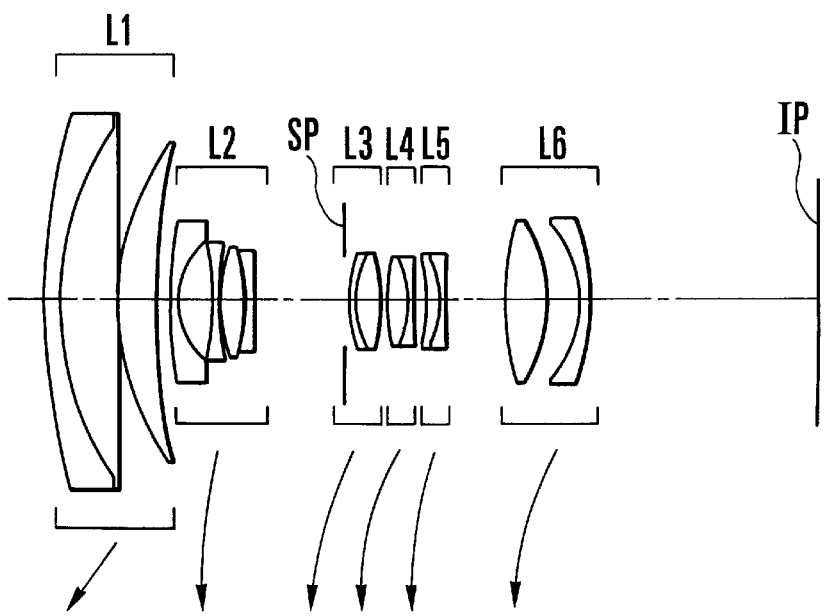
Figure 26:
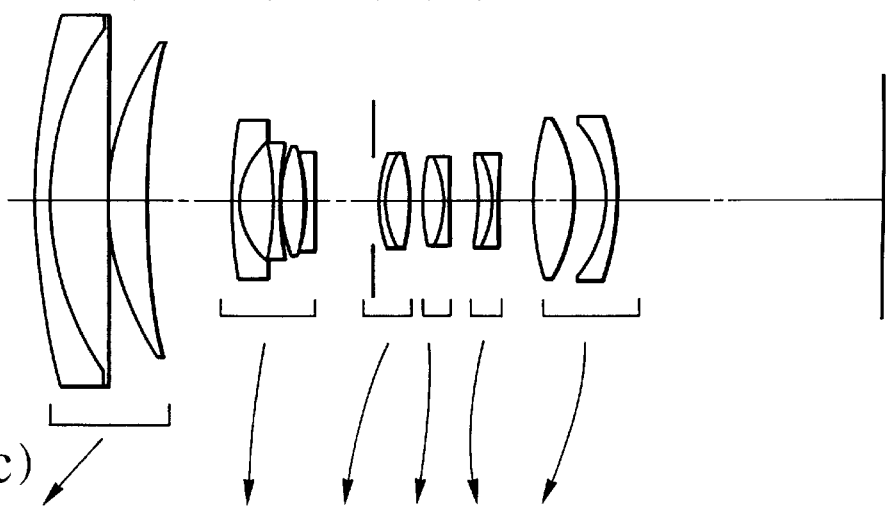
Figure 26:
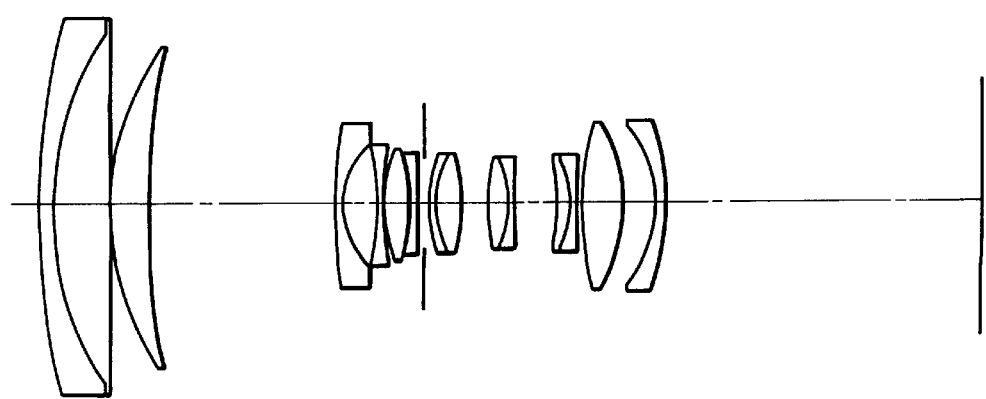

Another zoom lens for a numerical example 8 of the invention is shown in different operative positions in FIGS. 20(a), 20(b) and 20(c), being almost similar in arrangement to the numerical example 7 of the zoom lens. The aberrations of the numerical example 8 of the zoom lens are shown in FIGS. 21(a)1 to 21(a)3, 21(b)1 to 21(b)3 and 21(c)1 to 21(c)3.

Another zoom lens for a numerical example 9 of the invention is shown in different operative positions in FIGS.

22(a), 22(b) and 22(c). The fifth lens unit V remains stationary during zooming. During zooming from the wide-angle end to the telephoto end, the fourth lens unit IV and the sixth lens unit VI move in unison, and this combined lens unit and the other lens units move toward the object side in differential relation.

It is to be noted that the air separation between the third lens unit III and the fourth lens unit IV in the numerical example 5 is wider in the wide-angle end than in the telephoto end. In the other numerical examples 6 to 9, it is wider in the telephoto end than in the wide-angle end.

Here, letting the air separations at the wide-angle end and the telephoto end between the n-th lens unit and the (n+1)-th lens unit be denoted by $D_{nW}$ and $D_{nT}$, respectively, during zooming from the wide-angle end to the telephoto end, all the lens units move in such relation that the air separations satisfy the following conditions:

$$D_{1W} < D_{1T} \tag{7}$$

$$D_{2W} > D_{2T} \tag{8}$$

$$D_{4W} < D_{4T} \tag{9}$$

$$D_{5W} > D_{5T}. \tag{10}$$

The inequalities of conditions (7) to (10) regulate the variations of the air separations between the lens units during zooming from the wide-angle end to the telephoto end. Given the refractive powers of the lens units have signs as described before, the required amount of total zooming movement for the zoom ratio of each lens unit is made relatively short. Moreover, a good optical performance is maintained stable over the entire zooming range. For these purposes, the conditions described above are set forth. The air separation between the third lens unit III and the fourth lens unit IV not cited here may be varied in an appropriate way to take into account the residual aberrations of each lens unit. The condition for this air separation should be determined depending on the number of constituent lenses in each lens unit and the moving speed of each lens unit.

The present embodiment thus appropriately determines the refractive power arrangement of all the lens units and the ways of variation of the air separations. In addition, the air separation between the third lens unit III and the fourth lens unit IV is varied in the appropriate way. With the help of these features, a zoom lens is realized whose range is increased to about 5 as including the wide-angle region to the middle-telephoto region in such a manner that the variation with zooming of all aberrations, mainly spherical aberration and coma, is corrected well for high optical performance.

To realize further improvements of the zoom lens, letting the focal lengths at the wide-angle end and the telephoto end of the entire lens system be denoted by $f_W$ and $f_T$, respectively, and the focal length of the n-th lens unit be denoted by $f_n$, it is preferable to satisfy the following conditions:

$$0.3 < f_3 / (f_W \cdot f_T)^{1/2} < 1.3 \tag{11}$$

$$0.6 < f_4 / (f_W \cdot f_T)^{1/2} \tag{12}$$

$$(f_W \cdot f_T)^{1/2} < 10.0 \tag{13}$$

$$f_3 < f_4. \tag{14}$$

The inequalities of condition (11) and the inequalities of conditions (12) and (13) give ranges for the focal lengths of the third lens unit III and the fourth lens unit IV in terms of the shortest and longest focal lengths of the entire lens system and have an aim to not too much increase the numbers of constituent lenses in the third lens unit III and the fourth lens unit IV so that the entire lens system is reduced to a small size, while still keeping a good optical performance. Then, which of the third lens unit III and the fourth lens unit IV should take a shorter focal length than the other is determined by the condition (14).

When the focal length of the third lens unit III is too short as exceeding the lower limit of the condition (11), the third lens unit III tends to produce large spherical aberration. To correct this, the number of constituent lenses in the third lens unit III must be increased, or other countermeasures must be taken. In this case, the tolerance for inclination in the third lens unit III becomes severer, giving a problem on the manufacturing. Conversely, when the focal length of the third lens unit III is too long as exceeding the upper limit of the condition (11), the total length of the entire lens system tends to increase in the wide-angle end, being contradictory to the compact form.

When the focal length of the fourth lens unit IV is too short as exceeding the lower limit of the condition (12), the fourth lens unit IV weakens its function of reducing the spherical aberration and coma produced mainly in the third lens unit III. These aberrations become difficult to correct even in the entire lens system.

To further improve the compact form of the zoom lens, it is preferable to satisfy the condition (13). When the focal length of the fourth lens unit IV is too long as exceeding the upper limit of the condition (13), similarly to the excess of the focal length of the third lens unit III beyond the upper limit of the condition (11), the total length at the wide-angle end of the optical system tends to increase greatly, being contradictory to the improvement of the compact form.

The inequality of condition (14) determines which of the third lens unit III and the fourth lens unit IV should take a shorter focal length than the other. On the premise that the conditions (11) and (12) have been satisfied, the condition (14) is satisfied to thereby make it possible to correct these aberrations well.

The present embodiment is to realize a high-range, high-performance zoom lens. For this purpose, as described before, all of the six lens units are made to move on the optical axis. Because of this, it is not easy to install a mechanism of moving all the lens units within the lens housing or barrel of reduced size and operate the mechanism satisfactorily. So, to realize the invention in a better form, it is desirable to provide means for assuring simplification of the structure of the lens mounting mechanism and the operating mechanism.

On this account, among the six lens units, at least one pair of lens units are arranged to move in unison during zooming from the wide-angle end to the telephoto end, so that a better form of the lens mounting and operating mechanisms can be realized. Further, at least one of the six lens units may be made stationary on the optical axis during zooming from the wide-angle end to the telephoto end, so that an even better form of the lens mounting and operating mechanisms can be realized.

Besides these, to improve the correction of various aberrations without having to greatly increase the number of constituent lenses of the optical system, some lens surfaces may be formed to aspheric shapes as is well known. Even in the design of the zoom lens of the invention, an aspheric surface used in at least one of the lens surfaces in the third lens unit III or the fourth lens unit IV is effective in correcting mainly the spherical aberration well. Also, the use of another aspheric surface in at least one of the lens surfaces in the second lens unit II or the fifth lens unit V produces an advantage of correcting well mainly the astigmatism and distortion in the wide-angle end.

It should be noted that in the zoom lens of the invention, for focusing purposes, it is desired to axially move the second lens unit II toward the object side. Besides this, another focusing method of moving the first lens unit I toward the object side can be considered. Although the construction of the focusing mechanism becomes complex, the first lens unit I and the second lens unit II may be moved in unison toward the object side, or the second lens unit II and the fifth lens unit V may be moved in differential relation to each other. The use of any of the last two methods makes it possible particularly to obtain images of good quality even in closeup photography.

In such a manner, the present embodiment has solved the subjects and realized a zoom lens which has a high range and high performance with the entire lens system in a compact form.

Next, numerical examples 5 to 9 of the invention which satisfy all the above-described conditions are shown. Here, ri is the radius of curvature of the i-th lens surface, when counted from the object side, di is the i-th lens thickness or air separation, when counted from the object side, and ni and vi are respectively the refractive index and Abbe number of the material of the i-th lens element, when counted from the object side. The lens surface with an asterisk is made aspheric.

The shape of an aspheric surface is expressed by the following equation:

$$X = \frac{(1/R)Y^2}{1 + \sqrt{1 - (Y/R)^2}} + BY^4 + CY^6 + DY^8 + EY^{10}$$

where R is the radius of the osculating sphere, and B, C, D and E are the aspheric coefficients.

NUMERICAL EXAMPLE 5

| | | | |
|---|---|---|---|
| r 1 = 178.667 | d 1 = 2.50 | n 1 = 1.84666 | v 1 = 23.8 |
| r 2 = 66.799 | d 2 = 7.90 | n 2 = 1.69680 | v 2 = 55.5 |
| r 3 = −1252.647 | d 3 = 0.20 | | |
| r 4 = 57.131 | d 4 = 4.90 | n 3 = 1.71300 | v 3 = 53.8 |
| r 5 = 161.523 | d 5 = Variable | | |
| r 6 = 107.659 | d 6 = 1.20 | n 4 = 1.83481 | v 4 = 42.7 |
| r 7 = 17.598 | d 7 = 6.00 | | |
| r 8 = −81.764 | d 8 = 1.10 | n 5 = 1.80400 | v 5 = 46.6 |
| r 9 = 51.646 | d 9 = 0.20 | | |
| r10 = 29.190 | d10 = 5.20 | n 6 = 1.84666 | v 6 = 23.8 |
| r11 = −47.175 | d11 = 0.50 | | |
| r12 = −37.760 | d12 = 1.10 | n 7 = 1.83481 | v 7 = 42.7 |
| r13 = 83.100 | d13 = Variable | | |
| r14 = 28.965 | d14 = 1.00 | n 8 = 1.83400 | v 8 = 37.2 |
| r15 = 17.428 | d15 = 3.40 | n 9 = 1.60311 | v 9 = 60.7 |
| r16 = −171.007 | d16 = Variable | | |
| r17 = 34.368 | d17 = 3.30 | n10 = 1.51742 | v10 = 52.4 |
| r18 = −33.746 | d18 = 1.00 | n11 = 1.76182 | v11 = 26.5 |
| r19 = −122.933 | d19 = Variable | | |
| r20 = −34.287 | d20 = 1.00 | n12 = 1.71300 | v12 = 53.8 |
| r21 = 76.823 | d21 = 2.00 | n13 = 1.84666 | v13 = 23.8 |
| r22 = 200.236 | d22 = Variable | | |
| r23 = 92.111 | d23 = 6.70 | n14 = 1.69680 | v14 = 55.5 |
| *r24 = −26.395 | d24 = 0.20 | | |
| r25 = 74.996 | d25 = 2.80 | n15 = 1.60311 | v15 = 60.7 |
| r26 = 1649.375 | d26 = 4.80 | | |
| r27 = −21.970 | d27 = 2.00 | n16 = 1.84666 | v16 = 23.8 |
| r28 = −47.032 | | | |

| Variable | Focal Length | | |
|---|---|---|---|
| Separations | 28.25 | 59.29 | 131.98 |
| d 5 | 2.50 | 20.00 | 37.50 |
| d13 | 21.00 | 10.57 | 2.06 |
| d16 | 3.50 | 1.88 | 1.05 |
| d19 | 2.00 | 7.96 | 13.17 |
| d22 | 10.00 | 5.66 | 1.29 |

Aspheric Coefficients for r24

B = 2.64937D − 06        C = 7.58889D − 09
D = −3.57526D − 11       E = 6.66230D − 14
$(f_W \cdot f_T)^{1/2}$ = 61.061    $f_3$ = 52.338    $f_4$ = 71.349
$f_3/(f_W \cdot f_T)^{1/2}$ = 0.857    $f_4/(f_W \cdot f_T)^{1/2}$ = 1.168

NUMERICAL EXAMPLE 6

| | | | |
|---|---|---|---|
| r 1 = 181.129 | d 1 = 2.50 | n 1 = 1.84666 | v 1 = 23.8 |
| r 2 = 69.891 | d 2 = 9.00 | n 2 = 1.69680 | v 2 = 55.5 |
| r 3 = −1273.718 | d 3 = 0.20 | | |
| r 4 = 51.589 | d 4 = 6.00 | n 3 = 1.71300 | v 3 = 53.8 |
| r 5 = 116.063 | d 5 = Variable | | |
| r 6 = 81.082 | d 6 = 1.20 | n 4 = 1.83481 | v 4 = 42.7 |
| r 7 = 16.584 | d 7 = 7.20 | | |
| r 8 = −66.656 | d 8 = 1.10 | n 5 = 1.80400 | v 5 = 46.6 |
| r 9 = 83.144 | d 9 = 0.20 | | |
| r10 = 28.566 | d10 = 5.50 | n 6 = 1.84666 | v 6 = 23.8 |
| r11 = −46.460 | d11 = 0.60 | | |
| r12 = −36.702 | d12 = 1.10 | n 7 = 1.83481 | v 7 = 42.7 |
| r13 = 56.652 | d13 = Variable | | |
| r14 = 30.396 | d14 = 1.00 | n 8 = 1.83400 | v 8 = 37.2 |
| r15 = 18.492 | d15 = 3.80 | n 9 = 1.58313 | v 9 = 59.4 |
| *r16 = −61.692 | d16 = Variable | | |
| r17 = 27.503 | d17 = 3.90 | n10 = 1.51742 | v10 = 52.4 |
| r18 = −22.583 | d18 = 1.00 | n11 = 1.84666 | v11 = 23.8 |
| r19 = −70.882 | d19 = Variable | | |
| r20 = −35.318 | d20 = 2.60 | n12 = 1.84666 | v12 = 23.8 |
| r21 = −14.816 | d21 = 1.00 | n13 = 1.80610 | v13 = 41.0 |
| r22 = 77.541 | d22 = Variable | | |
| r23 = 84.977 | d23 = 6.20 | n14 = 1.69680 | v14 = 55.5 |
| *r24 = −25.721 | d24 = 0.20 | | |
| r25 = 72.612 | d25 = 2.80 | n15 = 1.60311 | v15 = 60.7 |
| r26 = −329.634 | d26 = 4.40 | | |
| r27 = −20.431 | d27 = 2.00 | n16 = 1.84666 | v16 = 23.8 |
| r28 = −46.594 | | | |

| Variable | Focal Length | | |
|---|---|---|---|
| Separations | 28.61 | 59.14 | 131.97 |
| d 5 | 2.50 | 20.00 | 37.50 |
| d13 | 20.50 | 10.53 | 1.98 |
| d16 | 1.00 | 1.86 | 2.96 |
| d19 | 2.00 | 5.75 | 9.51 |
| d22 | 9.00 | 5.25 | 1.49 |

Aspheric Coefficients

For r16: B = −5.80516D − 06    C = −1.37535D − 08
        D = −1.64741D − 10    E = 1.51766D − 12
For r24: B = 4.75500D − 07     C = 6.23518D − 09
        D = −6.87173D − 11    E = 1.30172D − 13

-continued

| | | | |
|---|---|---|---|
| $(f_W \cdot f_T)^{1/2} = 61.445$ | | $f_3 = 43.354$ | $f_4 = 61.446$ |
| $f_3/(f_W \cdot f_T)^{1/2} = 0.706$ | | $f_4/(f_W \cdot f_T)^{1/2} = 1.000$ | |

NUMERICAL EXAMPLE 7

| | | | |
|---|---|---|---|
| r 1 = 129.593 | d 1 = 2.50 | n 1 = 1.84666 | ν 1 = 23.8 |
| r 2 = 56.630 | d 2 = 9.50 | n 2 = 1.69680 | ν 2 = 55.5 |
| r 3 = 1371.407 | d 3 = 0.20 | | |
| r 4 = 50.865 | d 4 = 6.00 | n 3 = 1.71300 | ν 3 = 53.8 |
| r 5 = 109.492 | d 5 = Variable | | |
| r 6 = 90.502 | d 6 = 1.20 | n 4 = 1.83481 | ν 4 = 42.7 |
| r 7 = 17.091 | d 7 = 7.00 | | |
| r 8 = −73.462 | d 8 = 1.10 | n 5 = 1.80400 | ν 5 = 46.6 |
| r 9 = 50.889 | d 9 = 0.20 | | |
| r10 = 29.947 | d10 = 5.30 | n 6 = 1.84666 | ν 6 = 23.8 |
| r11 = −43.931 | d11 = 0.60 | | |
| r12 = −36.704 | d12 = 1.10 | n 7 = 1.83481 | ν 7 = 42.7 |
| r13 = 98.175 | d13 = Variable | | |
| r14 = 28.105 | d14 = 1.00 | n 8 = 1.83400 | ν 8 = 37.2 |
| r15 = 16.599 | d15 = 3.80 | n 9 = 1.65844 | ν 9 = 50.9 |
| r16 = −59.800 | d16 = Variable | | |
| r17 = 38.736 | d17 = 3.40 | n10 = 1.51742 | ν10 = 52.4 |
| r18 = −24.930 | d18 = 1.00 | n11 = 1.84666 | ν11 = 23.8 |
| r19 = −142.932 | d19 = Variable | | |
| r20 = −294.756 | d20 = 2.40 | n12 = 1.84666 | ν12 = 23.8 |
| r21 = −25.422 | d21 = 1.00 | n13 = 1.70154 | ν13 = 41.2 |
| r22 = 48.460 | d22 = 1.60 | | |
| r23 = −33.477 | d23 = 1.00 | n14 = 1.83400 | ν14 = 37.2 |
| r24 = −136.373 | d24 = Variable | | |
| r25 = 85.968 | d25 = 6.70 | n15 = 1.69680 | ν15 = 55.5 |
| *r26 = −28.583 | d26 = 0.20 | | |
| r27 = 83.803 | d27 = 3.50 | n16 = 1.60311 | ν16 = 60.7 |
| r28 = −145.838 | d28 = 4.00 | | |
| r29 = −25.532 | d29 = 2.00 | n17 = 1.84666 | ν17 = 23.8 |
| r30 = −59.361 | | | |

| Variable | Focal Length | | |
|---|---|---|---|
| Separation | 28.74 | 59.52 | 131.98 |
| d 5 | 2.50 | 19.50 | 36.50 |
| d13 | 21.00 | 10.46 | 1.99 |
| d16 | 1.00 | 3.06 | 6.94 |
| d19 | 1.00 | 3.04 | 3.71 |
| d24 | 10.00 | 5.90 | 1.35 |

Aspheric Coefficients

| | |
|---|---|
| For r26: B = 3.21542D − 06 | C = 4.12827D − 09 |
| D = −1.20735D − 11 | E = 1.62197D − 14 |
| $(f_W \cdot f_T)^{1/2} = 61.588$ $f_3 = 33.766$ | $f_4 = 158.966$ |
| $f_3/(f_W \cdot f_T)^{1/2} = 0.548$ | $f_4/(f_W \cdot f_T)^{1/2} = 2.581$ |

NUMERICAL EXAMPLE 8

| | | | |
|---|---|---|---|
| r 1 = 149.235 | d 1 = 2.50 | n 1 = 1.84666 | ν 1 = 23.8 |
| r 2 = 60.975 | d 2 = 8.60 | n 2 = 1.69680 | ν 2 = 55.5 |
| r 3 = 877.867 | d 3 = 0.20 | | |
| r 4 = 50.490 | d 4 = 6.80 | n 3 = 1.71300 | ν 3 = 53.8 |
| r 5 = 135.038 | d 5 = Variable | | |
| r 6 = 81.950 | d 6 = 1.20 | n 4 = 1.83481 | ν 4 = 42.7 |
| r 7 = 15.777 | d 7 = 6.50 | | |
| r 8 = −70.847 | d 8 = 1.10 | n 5 = 1.80400 | ν 5 = 46.6 |
| r 9 = 38.187 | d 9 = 0.20 | | |
| r10 = 26.169 | d10 = 5.30 | n 6 = 1.84666 | ν 6 = 23.8 |
| r11 = −37.598 | d11 = 0.50 | | |
| r12 = −31.906 | d12 = 1.10 | n 7 = 1.83481 | ν 7 = 42.7 |
| r13 = 121.151 | d13 = Variable | | |
| r14 = 25.727 | d14 = 1.00 | n 8 = 1.83400 | ν 8 = 37.2 |
| r15 = 15.091 | d15 = 4.00 | n 9 = 1.65844 | ν 9 = 50.9 |
| r16 = −54.842 | d16 = Variable | | |
| r17 = 35.066 | d17 = 3.40 | n10 = 1.51742 | ν10 = 52.4 |
| r18 = −22.390 | d18 = 1.00 | n11 = 1.84666 | ν11 = 23.8 |
| r19 = −218.578 | d19 = Variable | | |
| r20 = −133.804 | d20 = 2.20 | n12 = 1.84666 | ν12 = 23.8 |
| r21 = −25.600 | d21 = 1.00 | n13 = 1.70154 | ν13 = 41.2 |
| r22 = 36.651 | d22 = 1.70 | | |
| r23 = −36.411 | d23 = 1.00 | n14 = 1.83400 | ν14 = 37.2 |
| r24 = −79.180 | d24 = Variable | | |
| r25 = 70.535 | d25 = 7.20 | n15 = 1.69680 | ν15 = 55.5 |
| *r26 = −27.390 | d26 = 0.20 | | |
| r27 = 103.445 | d27 = 2.70 | n16 = 1.60311 | ν16 = 60.7 |
| r28 = −491.553 | d28 = 5.10 | | |
| r29 = −23.133 | d29 = 2.00 | n17 = 1.84666 | ν17 = 23.8 |
| r30 = −40.203 | | | |

| Variable | Focal Length | | |
|---|---|---|---|
| Separations | 28.82 | 56.77 | 131.94 |
| d 5 | 2.50 | 19.50 | 36.50 |
| d13 | 18.50 | 10.70 | 1.90 |
| d16 | 1.00 | 2.96 | 3.38 |
| d19 | 1.00 | 3.35 | 6.87 |
| d24 | 9.50 | 5.18 | 1.25 |

Aspheric Coefficients

| | |
|---|---|
| For r26: B = 3.59281D − 06 | C = 7.08994D − 09 |
| D = −2.19861D − 11 | E = 2.18379D − 14 |
| $(f_W \cdot f_T)^{1/2} = 61.662$ $f_3 = 31.079$ | $f_4 = 233.596$ |
| $f_3/(f_W \cdot f_T)^{1/2} = 0.504$ | $f_4/(f_W \cdot f_T)^{1/2} = 3.788$ |

NUMERICAL EXAMPLE 9

| | | | |
|---|---|---|---|
| r 1 = 147.764 | d 1 = 2.50 | n 1 = 1.84666 | ν 1 = 23.8 |
| r 2 = 59.497 | d 2 = 9.20 | n 2 = 1.69680 | ν 2 = 55.5 |
| r 3 = −4592.122 | d 3 = 0.20 | | |
| r 4 = 46.818 | d 4 = 6.00 | n 3 = 1.71300 | ν 3 = 53.8 |
| r 5 = 102.324 | d 5 = Variable | | |
| r 6 = 72.354 | d 6 = 1.20 | n 4 = 1.83481 | ν 4 = 42.7 |
| r 7 = 14.889 | d 7 = 6.90 | | |
| r 8 = −61.033 | d 8 = 1.10 | n 5 = 1.80400 | ν 5 = 46.6 |
| r 9 = 45.050 | d 9 = 0.20 | | |
| r10 = 26.913 | d10 = 5.20 | n 6 = 1.84666 | ν 6 = 23.8 |
| r11 = −35.623 | d11 = 0.60 | | |
| r12 = −28.762 | d12 = 1.10 | n 7 = 1.83481 | ν 7 = 42.7 |
| r13 = 170.557 | d13 = Variable | | |
| r14 = 28.352 | d14 = 1.00 | n 8 = 1.83400 | ν 8 = 37.2 |
| r15 = 17.403 | d15 = 4.00 | n 9 = 1.58313 | ν 9 = 59.4 |
| *r16 = −39.675 | d16 = Variable | | |
| r17 = 34.251 | d17 = 3.80 | n10 = 1.51633 | ν10 = 64.2 |
| r18 = −19.229 | d18 = 1.00 | n11 = 1.84666 | ν11 = 23.8 |
| r19 = −69.648 | d19 = Variable | | |
| r20 = −722.481 | d20 = 2.50 | n12 = 1.84666 | ν12 = 23.8 |
| r21 = −27.376 | d21 = 1.00 | n13 = 1.65160 | ν13 = 58.5 |
| r22 = 28.441 | d22 = 2.40 | | |
| r23 = −29.261 | d23 = 1.00 | n14 = 1.83400 | ν14 = 37.2 |
| r24 = −105.646 | d24 = Variable | | |
| r25 = 66.231 | d25 = 8.20 | n15 = 1.69680 | ν15 = 55.5 |
| *r26 = −28.677 | d26 = 0.20 | | |
| r27 = 108.469 | d27 = 3.90 | n16 = 1.60311 | ν16 = 60.7 |
| r28 = −102.777 | d28 = 3.80 | | |
| r29 = −27.600 | d29 = 2.00 | n17 = 1.84666 | ν17 = 23.8 |
| r30 = −69.072 | | | |

-continued

| Variable | Focal Length | | |
|---|---|---|---|
| Separations | 28.78 | 56.36 | 131.95 |
| d 5 | 2.50 | 17.48 | 34.67 |
| d13 | 18.50 | 10.78 | 1.93 |
| d16 | 1.00 | 5.28 | 8.67 |
| d19 | 1.00 | 5.47 | 9.74 |
| d24 | 10.00 | 5.53 | 1.26 |

Aspheric Coefficients

| For r16: | B = −3.16969D − 06 | C = 1.00679D − 08 |
|---|---|---|
| | D = −4.12180D − 10 | E = 3.59446D − 12 |
| For r26: | B = 3.60688D − 06 | C = 4.08260D − 09 |
| | D = −6.90124D − 12 | E = 7.59334D − 15 |
| $(f_W \cdot f_T)^{1/2}$ = 61.620 | $f_3$ = 34.332 | $f_4$ = 97.540 |
| $f_3/(f_W \cdot f_T)^{1/2}$ = 0.557 | $f_4/(f_W \cdot f_T)^{1/2}$ = 1.582 | |

Next, another embodiment of the zoom lens is described, in which the zoom lens comprises, in order from an object side, a first lens unit having a positive refractive power, a second lens unit having a negative refractive power, a third lens unit having a positive refractive power, a fourth lens unit having a negative refractive power, a fifth lens unit having a negative refractive power, and a sixth lens unit having a positive refractive power, wherein during zooming from a wide-angle end to a telephoto end, the air separations $D_{iW}$ and $D_{iT}$ at the wide-angle end and the telephoto end between the i-th lens unit and the (i+1)-th lens unit, respectively, vary in such ways as to satisfy the following conditions (15):

$D_{1W} < D_{1T}$ $D_{2W} > D_{2T}$ $D_{3W} < D_{3T}$ $D_{4W} < D_{4T}$ $D_{5W} > D_{5T}$.

Numerical examples 10 to 13 of the zoom lens of the invention are shown in FIGS. 23(a), 23(b) and 23(c) through FIGS. 26(a), 26(b) and 26(c), respectively. The various aberrations of the numerical examples 10 to 13 of the invention are shown in FIGS. 27(a)1 to 27(a)3, 27(b)1 to 27(b)3 and 27(c)1 to 27(c)3 through FIGS. 30(a)1 to 30(a)3, 30(b)1 to 30(b)3 and 30(c)1 to 30(c)3, respectively.

In these figures, L1 represents a first lens unit of positive refractive power, L2 represents a second lens unit of negative refractive power, L3 represents a third lens unit of positive refractive power, L4 represents a fourth lens unit of negative refractive power, L5 represents a fifth lens unit of negative refractive power, and L6 represents a sixth lens unit of positive refractive power. SP stands for an aperture stop, and IP stands for an image plane. The arrows indicate the loci of motion of the lens units during zooming from the wide-angle end to the telephoto end.

In the present embodiment, during zooming from the wide-angle end to the telephoto end, the predetermined lens units are moved so as to satisfy the conditions (15) described above. In more detail, the separation between the first and second lens units increases, the separation between the second and third lens units decreases, the separation between the third and fourth lens units increases, the separation between the fourth and fifth lens units increases, and the separation between the fifth and sixth lens units decreases.

The inequalities of condition (15) regulate the ways of variation of the air separations between the lens units during zooming from the wide-angle end to the telephoto end. Given the refractive powers of the lens units having signs as described before, the required amount of total zooming movement for the zoom ratio of each lens unit is made relatively short. Moreover, a good optical performance is maintained stable over the entire zooming range.

In the present embodiment, the refractive power arrangement of all the lens units is appropriately determined as described before, and the air separations are made to vary in such appropriate ways to correct well the variation with zooming of all aberrations, mainly spherical aberration and coma. This leads to realize a zoom lens which has a range of about 5 as including the wide-angle region to the middle-telephoto region with high optical performance.

To further improve the stability of good correction of the aberrations throughout the entire zooming range and obtain a high optical performance throughout the entire area of the image frame, letting the focal lengths at the wide-angle end and the telephoto end of the entire lens system be denoted by $f_W$ and $f_T$, respectively, and the focal length of the i-th lens unit be denoted by $f_i$, the following conditions are satisfied:

$$0.2 < f_3 / \sqrt{f_W \cdot f_T} < 1.2 \qquad (16)$$

$$0.8 < |f_4| / \sqrt{f_W \cdot f_T} \qquad (17)$$

$$|f_3| < |f_4|. \qquad (18)$$

The inequalities of condition (16) and the inequality of condition (17) give ranges for the focal lengths of the third lens unit and the fourth lens unit in terms of the shortest and longest focal lengths of the entire lens system and have an aim to not too much increase the numbers of constituent lenses in the third lens unit and the fourth lens unit so that the entire optical system is reduced to a small size, while still keeping a good optical performance.

Then, which of the third lens unit and the fourth lens unit should take a shorter focal length than the other is determined by the condition (18).

When the focal length of the third lens unit is too short as exceeding the lower limit of the condition (16), the third lens unit tends to produce large spherical aberration. To correct this, the number of constituent lenses in the third lens unit must be increased, or other countermeasures must be taken. In this case, the tolerance for inclination in the third lens unit becomes severer, giving a problem in the manufacturing. Conversely, when the focal length of the third lens unit is too long as exceeding the upper limit of the condition (16), the total length of the optical system tends to increase in the wide-angle end, being contradictory to the improvement of the compact form.

When the absolute value of the focal length of the fourth lens unit is too small as exceeding the lower limit of the condition (17), the overall focal length of the lens units that follow the fourth lens unit, i.e., the fifth and sixth lens units, must be made short. Therefore, the number of constituent lenses must be increased, being contradictory to the improvement of the compact form. In this case, if the numbers of constituent lenses in the fifth and sixth lens units are reduced, the coma produced mainly in these lens units becomes difficult to correct.

The inequality of condition (18) determines which of the third and fourth lens units which leave the spherical aberration and coma should take a shorter focal length than that of the other. On the premise that the conditions (16) and (17) have been satisfied, the condition (18) is satisfied to thereby lessen the shift of the image plane and the variation of aberrations with variation of the positions of these lens units. All the aberrations are thus corrected well.

In the present embodiment, it is more preferable to alter particularly the conditions (16) and (17) as follows, so that a better optical performance is obtained:

$$0.3 < f_3 / \sqrt{f_W \cdot f_T} < 0.8 \tag{16a}$$

$$1 < |f_4| / \sqrt{f_W \cdot f_T}. \tag{17a}$$

The present embodiment is to realize a high-range, high-performance zoom lens. For this purpose, as described before, the six lens units in total are made to move on the optical axis. To facilitate incorporation of a mechanism for moving all the lens units within the lens housing or barrel of reduced size and operate the mechanism satisfactorily, the structure of the lens mounting mechanism and the operating mechanism is simplified.

Specifically speaking, among the six lens units, at least one pair of lens units are arranged to move in unison during zooming from the wide-angle end to the telephoto end, so that a better form of the lens mounting and operating mechanisms can be realized.

Further, at least one of the six lens units may be made stationary on the optical axis during zooming from the wide-angle end to the telephoto end, so that an even better form of the lens mounting and operating mechanisms can be realized.

Besides these, to improve the correction of various aberrations without having to greatly increase the number of constituent lenses of the optical system, some lens surfaces may be formed to aspheric shapes. In the configuration of the zoom lens of the invention, it is preferable to use an aspheric surface in at least one of the lens surfaces in the third lens unit or the fourth lens unit. This configuration corrects mainly the spherical aberration well. Also, it is preferable to use an aspheric surface in at least one of the lens surfaces in the second lens unit or the fifth lens unit. This configuration makes it easier to correct well mainly the astigmatism and distortion in the wide-angle end.

It should be noted that, in the zoom lens of the invention, it is preferable to axially move the second lens unit toward the object side as focusing is effected from an infinitely distant object to an object at the minimum distance. Besides this, the first lens unit may otherwise be moved toward the object side. If another focusing method of moving the first and second lens units in unison toward the object side or of moving the second and fifth lens units in differential relation to each other is employed, images of good quality can be obtained even in closeup photography.

In the present embodiment, during zooming, the third lens unit L3 and the sixth lens unit L6 move in unison, thereby simplifying the structure of the moving mechanism. Also, in the present embodiment, an aspheric surface is used in one of the lens surfaces in the sixth lens unit L6 to correct well the aberrations.

The zoom lens in the present embodiment has image angles of 75° or so in the wide-angle end and of 18° or so in the telephoto end. The zoom ratio is a little less than 5. Despite the realization of such a high range, the zoom lens has succeeded in good correction of the various aberrations. Incidentally, the aberrations are shown only for an infinitely distant object. In the present embodiment, the second lens unit L2 is moved toward the object side to effect focusing from an infinitely distant object to an object at the minimum distance, and closeup photography can be performed with the image kept in good quality.

Further, to maintain a good stability of high optical performance throughout the entire zooming range, it is preferable to construct the second lens unit L2 as comprising, in order from an object side, a negative lens of meniscus form concave toward the image side, a negative lens of bi-concave form, a positive lens of bi-convex form and a negative lens having a concave surface facing the image side. Otherwise, the second lens unit L2 comprises a negative lens of meniscus form concave toward the image side, a cemented lens composed of a positive lens and a negative lens, and a positive lens of meniscus form convex toward the object side.

For the third, fourth and fifth lens units, it is recommended to construct each lens unit from a cemented lens composed of a positive lens and a negative lens. The sixth lens unit is constructed either from a positive lens of bi-convex form, a positive lens and a negative lens of meniscus form convex toward the image side, or from a positive lens of bi-convex form and a negative lens of meniscus form convex toward the image side.

Next, numerical examples 10 to 13 of the invention are shown. In the numerical data for the examples 10 to 13, ri is the radius of curvature of the i-th lens surface, when counted from the object side, di is the i-th lens thickness or air separation, when counted from the object side, and ni and vi are respectively the refractive index and Abbe number of the glass of the i-th lens element, when counted from the object side. The values of the factors in the above-described conditions (16) to (18) for the numerical examples 10 to 13 are listed in Table-1.

NUMERICAL EXAMPLE 10

| | | | |
|---|---|---|---|
| f = 28.8 – 131.93 | Fno = 1.36 – 5.6 | 2ω = 73.8° – 18.6° | |
| r 1 = 121.808 | d 1 = 2.50 | n 1 = 1.84666 | ν 1 = 23.8 |
| r 2 = 52.442 | d 2 = 9.10 | n 2 = 1.69680 | ν 2 = 55.5 |
| r 3 = 801.035 | d 3 = 0.20 | | |
| r 4 = 49.438 | d 4 = 6.20 | n 3 = 1.71300 | ν 3 = 53.8 |
| r 5 = 137.568 | d 5 = Variable | | |
| r 6 = 102.819 | d 6 = 1.20 | n 4 = 1.83481 | ν 4 = 42.7 |
| r 7 = 14.866 | d 7 = 6.50 | | |
| r 8 = –58.176 | d 8 = 1.10 | n 5 = 1.80400 | ν 5 = 46.6 |
| r 9 = 64.334 | d 9 = 0.20 | | |
| r10 = 28.590 | d10 = 4.80 | n 6 = 1.84666 | ν 6 = 23.8 |
| r11 = –38.797 | d11 = 0 50 | | |
| r12 = –32.027 | d12 = 1.10 | n 7 = 1.83481 | ν 7 = 42.7 |
| r13 = 93.312 | d13 = Variable | | |
| r14 = Stop | d14 = 0.50 | | |
| r15 = 25.310 | d15 = 1.00 | n 8 = 1.83400 | ν 8 = 37.2 |
| r16 = 16.451 | d16 = 5.20 | n 9 = 1.58313 | ν 9 = 59.4 |
| r17 = –34.043 | d17 = Variable | | |
| r18 = 28.451 | d18 = 3.80 | n10 = 1.48749 | ν10 = 70.2 |
| r19 = –22.563 | d19 = 1.00 | n11 = 1.83400 | ν11 = 37.2 |
| r20 = 269.968 | d20 = Variable | | |
| r21 = –60.629 | d21 = 2.80 | n12 = 1.83400 | ν12 = 37.2 |
| r22 = –20.123 | d22 = 1.00 | n13 = 1.71300 | ν13 = 53.8 |
| r23 = 52.558 | d23 = Variable | | |
| r24 = 65.802 | d24 = 6.70 | n14 = 1.77250 | ν14 = 49.6 |
| *r25 = –31.379 | d25 = 0.20 | | |
| r26 = 553.542 | d26 = 2.50 | n15 = 1.48749 | ν15 = 70.2 |
| r27 = –97.279 | d27 = 3.50 | | |
| r28 = –24.536 | d28 = 2.00 | n16 = 1.84666 | ν16 = 23.8 |
| r29 = –73.115 | | | |

-continued

| Variable Separations | Focal Length | | |
|---|---|---|---|
| | 28.80 | 50.00 | 131.93 |
| d 5 | 2.50 | 13.09 | 32.22 |
| d13 | 20.00 | 12.28 | 2.88 |
| d17 | 1.00 | 2.40 | 5.66 |
| d20 | 1.80 | 5.11 | 9.39 |
| d23 | 13.50 | 8.79 | 1.25 |

Aspheric Coefficients

| For r25: | B = 2.47251D − 06 | C = 3.28752D − 09 |
|---|---|---|
| | D = −1.64652D − 11 | E = 1.48001D − 14 |

NUMERICAL EXAMPLE 11 f = 28.89 − 131.94    Fno = 1.36 − 5.7    2ω = 73.6° − 18.6°

| r 1 = 151.951 | d 1 = 2.50 | n 1 = 1.84666 | ν 1 = 23.8 |
|---|---|---|---|
| r 2 = 53.697 | d 2 = 10.50 | n 2 = 1.69680 | ν 2 = 55.5 |
| r 3 = −803.847 | d 3 = 0.20 | | |
| r 4 = 44.709 | d 4 = 6.40 | n 3 = 1.71300 | ν 3 = 53.8 |
| r 5 = 119.803 | d 5 = Variable | | |
| r 6 = 99.801 | d 6 = 1.20 | n 4 = 1.80400 | ν 4 = 46.6 |
| r 7 = 14.059 | d 7 = 5.40 | | |
| r 8 = −77.595 | d 8 = 4.80 | n 5 = 1.80518 | ν 5 = 25.4 |
| r 9 = −13.978 | d 9 = 1.10 | n 6 = 1.88300 | ν 6 = 40.8 |
| r10 = 68.567 | d10 = 0.20 | | |
| r11 = 29.045 | d11 = 2.40 | n 7 = 1.84666 | ν 7 = 23.8 |
| r12 = 68.892 | d12 = Variable | | |
| r13 = Stop | d13 = 1.00 | | |
| r14 = 22.799 | d14 = 1.00 | n 8 = 1.83400 | ν 8 = 37.2 |
| r15 = 13.953 | d15 = 4.80 | n 9 = 1.58313 | ν 9 = 59.4 |
| *r16 = −42.539 | d16 = Variable | | |
| r17 = 27.755 | d17 = 3.50 | n10 = 1.48749 | ν10 = 70.2 |
| r18 = −26.819 | d18 = 1.00 | n11 = 1.83400 | ν11 = 37.2 |
| r19 = 113.291 | d19 = Variable | | |
| r20 = −72.900 | d20 = 2.80 | n12 = 1.83400 | ν12 = 37.2 |
| r21 = −17.376 | d21 = 1.00 | n13 = 1.71300 | ν13 = 53.8 |
| r22 = 42.619 | d22 = Variable | | |
| r23 = 45.913 | d23 = 8.40 | n14 = 1.67790 | ν14 = 55.3 |
| *r24 = −31.886 | d24 = 0.20 | | |
| r25 = 47.606 | d25 = 3.40 | n15 = 1.60311 | ν15 = 60.7 |
| r26 = 205.550 | d26 = 4.60 | | |
| r27 = −31.133 | d27 = 2.00 | n16 = 1.84666 | ν16 = 23.8 |
| r28 = 350.969 | | | |

| Variable Separations | Focal Length | | |
|---|---|---|---|
| | 28.89 | 50.00 | 131.94 |
| d 5 | 2.50 | 13.83 | 29.74 |
| d12 | 16.50 | 10.81 | 2.03 |
| d16 | 1.00 | 4.03 | 10.50 |
| d19 | 2.00 | 3.32 | 3.76 |
| d22 | 13.00 | 8.66 | 1.74 |

Aspheric Coefficients

| For r16: | B = 8.22122D − 07 | C = 3.22173D − 09 |
|---|---|---|
| | D = −1.83017D − 10 | E = 6.07218D − 13 |
| For r24: | B = 4.57122D − 06 | C = 7.68462D − 09 |
| | D = −1.86727D − 11 | E = 2.48319D − 14 |

NUMERICAL EXAMPLE 12 f = 28.87 − 131.94    Fno = 1.36 − 5.5    2ω = 73.6° − 18.6°

| r 1 = 120.296 | d 1 = 2.50 | n 1 = 1.84666 | ν 1 = 23.8 |
|---|---|---|---|
| r 2 = 49.918 | d 2 = 9.50 | n 2 = 1.69680 | ν 2 = 55.5 |
| r 3 = 1941.636 | d 3 = 0.20 | | |
| r 4 = 47.211 | d 4 = 6.20 | n 3 = 1.71300 | ν 3 = 53.8 |
| r 5 = 129.698 | d 5 = Variable | | |
| r 6 = 95.591 | d 6 = 1.20 | n 4 = 1.83481 | ν 4 = 42.7 |
| r 7 = 13.960 | d 7 = 6.00 | | |
| r 8 = −42.557 | d 8 = 1.10 | n 5 = 1.80400 | ν 5 = 46.6 |
| r 9 = 58.139 | d 9 = 0.20 | | |
| r10 = 29.092 | d10 = 4.40 | n 6 = 1.84666 | ν 6 = 23.8 |
| r11 = −30.489 | d11 = 0.60 | | |
| r12 = −24.444 | d12 = 1.10 | n 7 = 1.83481 | ν 7 = 42.7 |
| r13 = 301.716 | d13 = Variable | | |
| r14 = Stop | d14 = 1.00 | | |
| r15 = 21.944 | d15 = 1.00 | n 8 = 1.83400 | ν 8 = 37.2 |
| r16 = 13.493 | d16 = 5.50 | n 9 = 1.58313 | ν 9 = 59.4 |
| *r17 = −30.326 | d17 = Variable | | |
| r18 = 32.932 | d18 = 3.80 | n10 = 1.48749 | ν10 = 70.2 |
| r19 = −22.873 | d19 = 1.00 | n11 = 1.83400 | ν11 = 37.2 |
| r20 = 811.355 | d20 = Variable | | |
| r21 = −45.754 | d21 = 2.50 | n12 = 1.83400 | ν12 = 37.2 |
| r22 = −21.435 | d22 = 1.00 | n13 = 1.69680 | ν13 = 55.5 |
| r23 = 62.478 | d23 = Variable | | |
| r24 = 46.360 | d24 = 8.20 | n14 = 1.67790 | ν14 = 55.3 |
| *r25 = −24.945 | d25 = 5.20 | | |
| r26 = −21.927 | d26 = 2.00 | n15 = 1.84666 | ν15 = 23.8 |
| r27 = −51.716 | | | |

| Variable Separations | Focal Length | | |
|---|---|---|---|
| | 28.87 | 50.00 | 131.94 |
| d 5 | 2.50 | 14.41 | 30.90 |
| d13 | 16.80 | 10.70 | 1.69 |
| d17 | 1.00 | 2.43 | 7.06 |
| d20 | 2.00 | 4.71 | 6.66 |
| d23 | 12.00 | 7.86 | 1.28 |

Aspheric Coefficients

| For r17: | B = 3.70111D − 06 | C = −2.1367D − 08 |
|---|---|---|
| | D = 8.88519D − 11 | E = −1.07141D − 12 |
| For r25: | B = 8.60798D − 06 | C = 1.86716D − 08 |
| | D = −6.45018D − 11 | E = 1.13224D − 13 |

NUMERICAL EXAMPLE 13 f = 28.86 − 131.9    Fno = 1.3.6 − 5.2    2ω = 73.8° − 18.6°

| r 1 = 121.291 | d 1 = 2.50 | n 1 = 1.84666 | ν 1 = 23.8 |
|---|---|---|---|
| r 2 = 53.171 | d 2 = 10.00 | n 2 = 1.69680 | ν 2 = 55.5 |
| r 3 = 1523.742 | d 3 = 0.20 | | |
| r 4 = 47.600 | d 4 = 6.80 | n 3 = 1.71300 | ν 3 = 53.8 |
| r 5 = 130.456 | d 5 = Variable | | |
| r 6 = 98.163 | d 6 = 1.20 | n 4 = 1.83481 | ν 4 = 42.7 |
| r 7 = 13.993 | d 7 = 5.90 | | |
| r 8 = −44.331 | d 8 = 1.10 | n 5 = 1.80400 | ν 5 = 46.6 |
| r 9 = 45.290 | d 9 = 0.20 | | |
| r10 = 27.739 | d10 = 4.40 | n 6 = 1.84666 | ν 6 = 23.8 |
| r11 = −32.383 | d11 = 0.60 | | |
| r12 = −25.029 | d12 = 1.10 | n 7 = 1.83481 | ν 7 = 42.7 |
| r13 = −2106.474 | d13 = Variable | | |
| r14 = Stop | d14 = 1.00 | | |
| r15 = 24.077 | d15 = 1.00 | n 8 = 1.83400 | ν 8 = 37.2 |
| r16 = 15.158 | d16 = 5.00 | n 9 = 1.60311 | ν 9 = 60.7 |
| r17 = −31.892 | d17 = Variable | | |
| r18 = 35.950 | d18 = 3.80 | n10 = 1.48749 | ν10 = 70.2 |
| r19 = −18.576 | d19 = 1.00 | n11 = 1.83400 | ν11 = 37.2 |
| r20 = 279.240 | d20 = Variable | | |

-continued

| | | | |
|---|---|---|---|
| r21 = −42.747 | d21 = 2.50 | n12 = 1.83400 | ν12 = 37.2 |
| r22 = −18.105 | d22 = 1.00 | n13 = 1.69680 | ν13 = 55.5 |
| r23 = 171.448 | d23 = Variable | | |
| r24 = 52.960 | d24 = 7.30 | n14 = 1.67790 | ν14 = 55.3 |
| *r25 = −24.156 | d25 = 5.40 | | |
| r26 = −20.920 | d26 = 2.00 | n15 = 1.84666 | ν15 = 23.8 |
| r27 = −42.987 | | | |

| Variable | Focal Length | | |
|---|---|---|---|
| Separations | 28.86 | 50.00 | 131.90 |
| d 5 | 2.50 | 14.77 | 32.49 |
| d13 | 16.40 | 10.49 | 0.96 |
| d17 | 1.00 | 2.17 | 4.62 |
| d20 | 2.00 | 5.25 | 7.85 |
| d23 | 10.70 | 6.28 | 1.23 |

Aspheric Coefficients

| For r25: | B | = | 8.60798D-06 | C | = | 1.86716D-08 |
|---|---|---|---|---|---|---|
| | D | = | −6.45018D-11 | E | = | 1.13224D-13 |

TABLE 1

| | Numerical Example | | | |
|---|---|---|---|---|
| Condition | 10 | 11 | 12 | 13 |
| (16) $f_3/\sqrt{f_W \cdot f_T}$ | 0.480 | 0.512 | 0.434 | 0.437 |
| (17) $|f_4|/\sqrt{f_W \cdot f_T}$ | 32.419 | 8.715 | 21.238 | 2.209 |
| (18) $|f_3|$ | 29.599 | 31.639 | 26.805 | 26.963 |
| $|f_3'|$ | −1998.199 | −538.069 | −1310.875 | −136.275 |
| $\sqrt{f_W \cdot f_T}$ | 61.638 | 61.741 | 61.723 | 61.697 |

In addition, although in the above-described embodiments of the invention all of the separations between lens units are varied during zooming, the separation between the fourth lens unit and the fifth lens unit may be arranged to be unvaried.

According to the invention, as described above, to construct a zoom lens, six lens units having predetermined refractive powers are used in total and rules of design for the zooming movements of all these lens units and others are set forth to thereby reduce the number of constituent lenses, which in turn shortens the total length of the entire lens system. Despite this, a high optical performance is maintained throughout the entire zooming range, when the range is extended to 4 or 5. Also, it becomes possible to provide a zoom lens which, when stabilizing the image against accidental vibrations, is corrected well for aberrations.

I claim:

1. A zoom lens comprising, in order from an object side, an object-side lens group having a plurality of lens units in which separations therebetween are varied during zooming and which have a positive refractive power as a whole, an intermediate lens unit having a negative refractive power and arranged to move in directions substantially perpendicular to an optical axis so as to compensate unexpected vibrations, and a rear lens unit having a positive refractive power, wherein besides the separations between said plurality of lens units of said object-side lens group, at least a separation between said intermediate lens unit and said rear lens unit is varied to effect zooming, and wherein at least one lens unit included in said object-side lens group is moved along the optical axis to effect focusing, and a lens unit of said plurality of lens units of said object-side lens group which is closest an object has a positive refractive power.

2. A zoom lens according to claim 1, satisfying the following conditions:

$$0.7<(f_{FT}/f_{FW})/(f_T/f_W)<1.2$$

$$0.2<|f_C|/(f_W \cdot f_T)^{1/2}<1.0$$

where $f_{FW}$ and $f_{FT}$ are focal lengths at a wide-angle end and a telephoto end of said object-side lens group, respectively, $f_W$ and $f_T$ are focal lengths at the wide-angle end and the telephoto end of said zoom lens, respectively, and $f_C$ is a focal length of said intermediate lens unit.

3. A zoom lens according to claim 1, wherein said object-side lens group comprises at least, in order from the object side, a first lens unit having a positive refractive power, a second lens unit having a negative refractive power and a third lens unit having a positive refractive power, and wherein letting separations on the optical axis at the wide-angle end and the telephoto end between the n-th lens unit and the (n+1)-th lens unit of said object-side lens group be denoted by $D_{nW}$ and $D_{nT}$, respectively, the following conditions are satisfied:

$$D_{1W}<D_{1T}$$

$$D_{2W}>D_{2T}.$$

4. A zoom lens according to claim 1, wherein, when a focal length at a telephoto end of said zoom lens is normalized to "1", letting a spherical aberration coefficient at the telephoto end of said intermediate lens unit be denoted by $I_{CT}$, the following condition is satisfied:

$$0.3<I_{CT}<5.0.$$

5. A zoom lens comprising, in order from an object side, a first lens unit having a positive refractive power, a second lens unit having a negative refractive power, a third lens unit having a positive refractive power, a fourth lens unit having a positive or negative refractive power, a fifth lens unit having a negative refractive power, and a sixth lens unit having a positive refractive power, wherein at least four of separations between successive two of said lens units are varied to effect zooming, and said fifth lens unit is arranged to move in directions substantially perpendicular to an optical axis so as to compensate unexpected vibrations.

6. A zoom lens according to claim 5, wherein at least said second lens unit is moved along the optical axis to effect focusing.

7. A zoom lens according to claim 5, satisfying the following conditions:

$$0.7<(f_{FT}/f_{FW})/(f_T/f_W)<1.2$$

$$0.2<|f_C|/(f_W \cdot f_T)^{1/2}<1.0$$

where $f_{FW}$ and $f_{FT}$ are focal lengths at a wide-angle end and a telephoto end of the entirety of said first lens unit to said fourth lens unit, respectively, $f_W$ and $f_T$ are focal lengths at the wide-angle end and the telephoto end of said zoom lens, respectively, and $f_C$ is a focal length of said fifth lens unit.

8. A zoom lens according to claim 5, satisfying the following conditions:

$D_{1W} < D_{1T}$ $D_{2W} > D_{2T}$ where $D_{1W}$ and $D_{2W}$ are separations on the optical axis at a wide-angle end between said first lens unit and said second lens unit and between said second lens unit and said third lens unit, respectively, and $D_{1T}$ and $D_{2T}$ are separations on the optical axis at a telephoto end between said first lens unit and said second lens unit and between said second lens unit and said third lens unit, respectively.

9. A zoom lens according to claim 5, satisfying the following condition:

$D_{5W} > D_{5T}$ where $D_{5W}$ and $D_{5T}$ are separations on the optical axis at a wide-angle end and a telephoto end between said fifth lens unit and said sixth lens unit, respectively.

10. A zoom lens according to claim 5, wherein, when a focal length at a telephoto end of said zoom lens is normalized to "1", letting a spherical aberration coefficient at the telephoto end of said fifth lens unit be denoted by $I_{CT}$, the following condition is satisfied:

$0.3 < I_{CT} < 5.0$.

11. A zoom lens comprising, in order from an object side, a first lens unit having a positive refractive power, a second lens unit having a negative refractive power, a third lens unit having a positive refractive power, a fourth lens unit having a positive refractive power, a fifth lens unit having a negative refractive power, and a sixth lens unit having a positive refractive power, wherein, letting air separations at a wide-angle end and a telephoto end between the n-th lens unit and the (n+1)-th lens unit be denoted by $D_{nW}$ and $D_{nT}$, respectively, during zooming from the wide-angle end to the telephoto end, said air separations are varied so as to satisfy the following conditions:

$D_{1W} < D_{1T}$ $D_{2W} > D_{2T}$ $D_{4W} < D_{4T}$ $D_{5W} > D_{5T}$.

12. A zoom lens according to claim 11, wherein, letting focal lengths at the wide-angle end and the telephoto end of said zoom lens be denoted by $f_W$ and $f_T$, respectively, and a focal length of the n-th lens unit be denoted by $f_n$, the following conditions are satisfied:

$0.3 < f_3/(f_W \cdot f_T)^{1/2} < 1.3$ $0.6 < f_4/(f_W \cdot f_T)^{1/2}$ $f_3 < f_4$.

13. A zoom lens according to claim 11, wherein at least one pair of lens units of said first to sixth lens units are arranged to move in unison during zooming from the wide-angle end to the telephoto end.

14. A zoom lens according to claim 11, wherein at least one lens unit of said first to sixth lens units is arranged to be stationary on the optical axis during zooming from the wide-angle end to the telephoto end.

15. A zoom lens comprising, in order from an object side, a first lens unit of positive refractive power, a second lens unit of negative refractive power, a third lens unit of positive refractive power, a fourth lens unit of negative refractive power, a fifth lens unit of negative refractive power and a sixth lens unit of positive refractive power, wherein, during zooming from a wide-angle end to a telephoto end, letting air separations at the wide-angle end and the telephoto end between the i-th lens unit and the (i+1)-th lens unit be denoted by $D_{iW}$ and $D_{iT}$, respectively, the following conditions are satisfied:

$D_{1W} < D_{1T}$ $D_{2W} > D_{2T}$ $D_{3W} < D_{3T}$ $D_{4W} < D_{4T}$ $D_{5W} > D_{5T}$.

16. A zoom lens according to claim 15, wherein letting focal lengths at the wide-angle end and the telephoto end of said zoom lens be denoted by $f_W$ and $f_T$, respectively, and a focal length of the i-th lens unit be denoted by $f_i$, the following conditions are satisfied:

$0.2 < f_3 / \sqrt{f_W \cdot f_T} < 1.2$ $0.8 < |f_4| / \sqrt{f_W \cdot f_T}$ $|f_3| < |f_4|$.

17. A zoom lens comprising, in order from an object side:

an object-side lens group having a plurality of lens units in which separations therebetween are varied during zooming and which have a positive refractive power as a whole;

an intermediate lens unit having a negative refractive power and arranged to move in directions substantially perpendicular to an optical axis so as to compensate unexpected vibrations; and a rear lens unit having a positive refractive power, wherein besides the separations between said plurality of lens units of said object-side lens group, at least a separation between said intermediate lens unit and said rear lens unit is varied to effect zooming, and wherein said rear lens unit is disposed closest to the image side, and a lens unit of said plurality of lens units of said object-side lens group which is closest an object has a positive refractive power.

18. A zoom lens according to claim 17, wherein at least one lens unit included in said object-side lens group is moved along the optical axis to effect focusing.

19. A zoom lens according to claim 17, satisfying the following conditions:

$0.7 < (f_{FT}/f_{FW})/(f_T/f_W) < 1.2$ $0.2 < |f_C|/(f_W \cdot f_T)^{1/2} < 1.0$ where $f_{FW}$ and $f_{FT}$ are focal lengths at a wide-angle end and a telephoto end of said object-side lens group, respectively, $f_W$ and $f_T$ are focal lengths at the wide-angle end and the telephoto end of said zoom lens, respectively, and $f_C$ is a focal length of said intermediate lens unit.

20. A zoom lens according to claim 17, wherein said object-side lens group comprises at least, in order from the object side, a first lens unit having a positive refractive power, a second lens unit having a negative refractive power and a third lens unit having a positive refractive power, and wherein letting separations on the optical axis at the wide-angle end and the telephoto end between the n-th lens unit and the (n+1)-th lens unit of said object-side lens group be denoted by $D_{nW}$ and $D_{nT}$, respectively, the following conditions are satisfied:

$$D_{1W} < D_{1T}$$

$$D_{2W} > D_{2T}.$$

21. A zoom lens according to claim 17, wherein, when a focal length at a telephoto end of said zoom lens is normalized to "1", letting a spherical aberration coefficient at the telephoto end of said intermediate lens unit be denoted by $I_{CT}$, the following condition is satisfied:

$$0.3 < I_{CT} < 5.0.$$

* * * * *

UNITED STATES PATENT AND TRADEMARK OFFICE
CERTIFICATE OF CORRECTION

PATENT NO. : 6,061,180
DATED : May 9, 2000
INVENTOR(S) : Shingo HAYAKAWA

It is certified that error appears in the above-identified patent and that said Letters Patent is hereby corrected as shown below:

ON THE COVER PAGE, AT [57], IN THE ABSTRACT::

Line 7, "and a sixth lens unit having a" should be deleted.
Line 8, "positive refractive power," should be deleted.

COLUMN 13:

Line 29, "$|f_c/$" should read --$|f_c|/$--.

COLUMN 18:

Line 16, "on" should read --in-- .

UNITED STATES PATENT AND TRADEMARK OFFICE
CERTIFICATE OF CORRECTION

PATENT NO. : 6,061,180

DATED : May 9, 2000

INVENTOR(S) : Shingo HAYAKAWA

It is certified that error appears in the above-identified patent and that said Letters Patent is hereby corrected as shown below:

COLUMN 27:

Line 48, "r28=350.969" should read --r28= -350.969--.

COLUMN 28:

Line 40, "C=-2.1367D-08" should read --C=-2.13676D-08--.

COLUMN 29:

Lines 37 and 38, "$|f_3|$
$|f_3|$" should read

--$|f_3|$
$|f_4|$--.

UNITED STATES PATENT AND TRADEMARK OFFICE
CERTIFICATE OF CORRECTION

PATENT NO.  : 6,061,180

DATED       : May 9, 2000

INVENTOR(S) : Shingo HAYAKAWA

It is certified that error appears in the above-identified patent and that said Letters Patent is hereby corrected as shown below:

COLUMN 32:

Line 53, "closest" should read --closest to--.

Signed and Sealed this

Eighth Day of May, 2001

*Attest:*

NICHOLAS P. GODICI

*Attesting Officer*     Acting Director of the United States Patent and Trademark Office